(12) United States Patent
Tabuchi

(10) Patent No.: US 12,437,477 B2
(45) Date of Patent: Oct. 7, 2025

(54) REVERSE ENGINEERING SUPPORT APPARATUS

(71) Applicant: Keyence Corporation, Osaka (JP)

(72) Inventor: Jun Tabuchi, Osaka (JP)

(73) Assignee: KEYENCE CORPORATION, Osaka (JP)

( * ) Notice: Subject to any disclaimer, the term of this patent is extended or adjusted under 35 U.S.C. 154(b) by 251 days.

(21) Appl. No.: 18/221,900

(22) Filed: Jul. 14, 2023

(65) Prior Publication Data

US 2024/0054726 A1    Feb. 15, 2024

(30) Foreign Application Priority Data

Aug. 9, 2022  (JP) ................. 2022-127101

(51) Int. Cl.
*G06T 17/20*    (2006.01)

(52) U.S. Cl.
CPC .................. *G06T 17/20* (2013.01)

(58) Field of Classification Search
CPC ......... G06T 17/20; G06T 17/30; G06F 30/10; G06F 30/12; G06V 2201/06; G06V 10/242

See application file for complete search history.

(56) References Cited

U.S. PATENT DOCUMENTS

| | | | |
|---|---|---|---|
| 10,262,431 B2 | 4/2019 | Tabuchi et al. | |
| 10,323,933 B2 | 6/2019 | Fujiwara et al. | |
| 10,415,958 B2 | 9/2019 | Nakatsukasa | |
| 10,508,902 B2 | 12/2019 | Tabuchi et al. | |
| 10,739,130 B2 | 8/2020 | Murakami et al. | |
| 2007/0265727 A1* | 11/2007 | Bae ..................... | G06T 17/20 700/98 |
| 2007/0285425 A1* | 12/2007 | Bae ..................... | G06F 30/00 345/441 |
| 2008/0036755 A1* | 2/2008 | Bae ..................... | G06F 30/00 345/418 |

(Continued)

FOREIGN PATENT DOCUMENTS

WO    WO-2022046085 A1 *   3/2022

OTHER PUBLICATIONS

Jordan Smith, https://web.archive.org/web/20200506054544/https://people.eecs.berkeley.edu/~ug/slide/pipeline/assignments/backfacecull.shtml#newell (Year: 2020).*

(Continued)

*Primary Examiner* — Kee M Tung
*Assistant Examiner* — Xiaoming We
(74) *Attorney, Agent, or Firm* — Kilyk & Bowersox, P.L.L.C.

(57) ABSTRACT

A free curved surface and an analytic curved surface can be generated as intended by a user with a simple operation. A reverse engineering support apparatus includes: a shape attribute setting unit that sets a shape attribute to a polygon included in mesh data; a region specifying unit that specifies a region included in the mesh data based on a shape attribute; a data conversion unit that converts a polygon included in the specified region into surface data based on the shape attribute and converts a polygon not included in the region into surface data of a free curved surface; and an output unit that outputs pieces of the surface data created by the data conversion unit as CAD data.

14 Claims, 62 Drawing Sheets

(56) References Cited

U.S. PATENT DOCUMENTS

2008/0040080 A1* 2/2008 Bae .................. G06T 17/20
703/1

OTHER PUBLICATIONS

Osculating Circles for Curves in a Plane https://web.archive.org/web/20220322135306/https://old.nationalcurvebank.org/osculating/osculating.htm (Year: 2022).*
Mesh2surface Help https://web.archive.org/web/20220408074548/https://mesh2surface.com/help/Helpfile.pdf (Year: 2022).*
U.S. Appl. No. 18/221,899, filed Jul. 14, 2023 (190 pages).
U.S. Appl. No. 18/222,489, filed Jul. 17, 2023 (74 pages).
U.S. Appl. No. 18/223,038, filed Jul. 18, 2023 (77 pages).
U.S. Appl. No. 18/222,490, filed Jul. 17, 2023 (123 pages).
Eck et al., "Automatic Reconstruction of B-Spline Surfaces of Arbitrary Topological Type," Proceedings of the 23rd annual conference on Computer graphics and interactive techniques, 1996, pp. 325-334 (10 pages).

* cited by examiner

FIG. 10

| MAGNIFICATION | CURVATURE SEARCH RADIUS | FILTER STRENGTH | REDUCED HOLE DETERMINATION SIZE | FILLET DETECTION RADIUS |
|---|---|---|---|---|
| LOW MAGNIFICATION | 3.0 | 5.0 | 0.2 | 1.0 |
| HIGH MAGNIFICATION | 1.0 | 2.0 | 0.08 | 0.5 |

| FIELD OF VIEW | THINNING DISTANCE | MAXIMUM SEGMENT LENGTH | SHAPE DETECTION RATIO |
|---|---|---|---|
| SINGLE FIELD OF VIEW | 0.1 | 60 | 1.0 |
| WIDE FIELD OF VIEW (LINKAGE) | 0.2 | 150 | 2.0 |

FIG. 11

(SHAPE INFORMATION)

(ADDITIONAL DATA FOR EACH VERTEX OR POLYGON)

| | | | |
|---|---|---|---|
| VERTEX INFORMATION | pt1 COORDINATE(x,y,z), | NORMAL(nx,ny,nz), | RELIABILITY(r1,r2,⋯), VALID FLAG(f1,f2⋯), TEXTURE INFORMATION(id1,u1,v1, id2,u2,v2,⋯) |
| | pt2 COORDINATE(x,y,z), | NORMAL(nx,ny,nz), | RELIABILITY(r1,r2,⋯), VALID FLAG(f1,f2⋯), TEXTURE INFORMATION(id1,u1,v1, id2,u2,v2,⋯) |
| | pt3 COORDINATE(x,y,z), | NORMAL(nx,ny,nz), | RELIABILITY(r1,r2,⋯), VALID FLAG(f1,f2⋯), TEXTURE INFORMATION(id1,u1,v1, id2,u2,v2,⋯) |
| | ⋮ | ⋮ | ⋮ |
| | ptn COORDINATE(x,y,z), | NORMAL(nx,ny,nz), | RELIABILITY(r1,r2,⋯), VALID FLAG(f1,f2⋯), TEXTURE INFORMATION(id1,u1,v1, id2,u2,v2,⋯) |
| POLYGON INFORMATION | fc1 VERTEX set(ptA,ptB,ptC), | NORMAL(nx,ny,nz), | RELIABILITY(r1,r2,⋯), VALID FLAG(f1,f2⋯), SURFACE COLOR(r,g,b), |
| | fc2 VERTEX set(ptA,ptB,ptC), | NORMAL(nx,ny,nz), | RELIABILITY(r1,r2,⋯), VALID FLAG(f1,f2⋯), SURFACE COLOR(r,g,b), |
| | fc3 VERTEX set(ptA,ptB,ptC), | NORMAL(nx,ny,nz), | RELIABILITY(r1,r2,⋯), VALID FLAG(f1,f2⋯), SURFACE COLOR(r,g,b), |
| | ⋮ | ⋮ | ⋮ |
| | fcm VERTEX set(ptA,ptB,ptC), | NORMAL(nx,ny,nz), | RELIABILITY(r1,r2,⋯), VALID FLAG(f1,f2⋯), SURFACE COLOR(r,g,b), |

(MEASUREMENT CONDITION)

| | |
|---|---|
| MEASUREMENT MODE | LOW MAGNIFICATION |
| FIELD OF VIEW | WIDE FIELD OF VIEW (LINKAGE) |
| RESOLUTION | HIGH-RESOLUTION MODE |
| MEASURING INSTRUMENT ID | PRODUCT A |
| COLOR | PRESENCE |

(Raw DATA)

CAPTURED IMAGE

| ⦿ REFERENCE SURFACE | MACHINING SURFACE ▽ |
| DESIGNATED SURFACE | XY PLANE ▽ |
| | ☐ SET ANOTHER ORIENTATION |

| ○ REFERENCE AXIS | CROSS-SECTIONAL REFERENCE SURFACE, NORMAL ▽ |
| DESIGNATION DIRECTION | X AXIS+ ▽ |

○ ORIGIN   SHAFT HOLDER, STARTING POINT ▽

⦿ SET POINT OBTAINED BY PROJECTING THIS POINT ON REFERENCE SURFACE AS ORIGIN
○ SET POINT OBTAINED BY PROJECTING THIS POINT ON REFERENCE AXIS AS ORIGIN
○ SET THIS POINT AS ORIGIN

○ SET THIS POINT TO DESIGNATED COORDINATE
   X COORDINATE    0.000 ⇳ mm
   Y COORDINATE    0.000 ⇳ mm
   Z COORDINATE    0.000 ⇳ mm

REVERSE ENGINEERING SUPPORT APPARATUS

CROSS-REFERENCE TO RELATED APPLICATIONS

The present application claims foreign priority based on Japanese Patent Application No. 2022-127101, filed Aug. 9, 2022, the contents of which are incorporated herein by reference.

BACKGROUND OF THE INVENTION

1. Field of the Invention

The present disclosure relates to a reverse engineering support apparatus that supports reverse engineering in which a shape of a real object is acquired, converted into design data, and utilized for manufacturing.

2. Description of Related Art

In recent years, reverse engineering has been used in various fields of manufacturing.

For example, the reverse engineering is used for an application in which a shape of an existing product is scanned and converted into CAD data to perform development of a next model and shape analysis on CAD and/or CAE, an application in which a shape of a model or a mock-up in a product design is scanned and converted into CAD data to be reflected in the product design, an application in which a shape of a mating component to be fitted is scanned and converted into CAD data to design a product to be a fitting source, and an application in which a shape of a prototype is scanned and converted into CAD data to be connected to an improved design, and such applications tend to expand.

To specify a surface from point sets when an existing shape is scanned with a laser distance scanner and dense point sets produced by the scanner are converted into a geometric model is disclosed in p. 325 to 334 of "Automatic reconstruction of B-spline surfaces of arbitrary topological type", written by Matthias Eck and Hugues Hoppe, in Proceedings of the 23rd annual conference on Computer graphics and interactive techniques in 1996.

Meanwhile, conventional software that enables the reverse engineering has only a unit that performs modeling by manually combining a function (automatic surface) of generating a surface including only a free curved surface and a function (primitive generation) of generating a simple analytic curved surface, such as a cylinder or a rectangular parallelepiped, based on mesh data obtained by measuring a shape of a product.

In the automatic surface described above, the free curved surface includes a plurality of curved surface patches, and shapes of the respective curved surface patches are generated automatically or substantially automatically, and thus, tends to deviate from a design intention.

Further, in the conventional software, all curved surfaces are free curved surfaces, but there is a problem that it is difficult to treat the free curved surface as a reference shape, such as a reference surface of a sketch or an axis of rotation on CAD. Further, in CAD software, it is sometimes difficult to edit a free curved surface, or a user needs to newly memorize an editing operation even if the editing is successful.

Further, the primitive generation described above enables only conversion into a simple shape, which results in a difference from the original shape obtained by measurement. Furthermore, there is also a problem that it is difficult to convert a shape that cannot be matched by the primitive generation into CAD data.

SUMMARY OF THE INVENTION

The present disclosure has been made in view of such points, and is aimed at enabling generation of a free curved surface and an analytic curved surface as intended by a user with a simple operation.

In order to achieve the above aim, according to one embodiment, it is possible to assume a reverse engineering support apparatus that converts mesh data into surface data and outputs the surface data. A reverse engineering support apparatus includes: a data acquisition unit that acquires mesh data including a plurality of polygons; a shape attribute setting unit that sets a shape attribute to a polygon included in the mesh data acquired by the data acquisition unit and having the shape attribute set by the shape attribute setting unit; a region specifying unit that specifies a region included in the mesh data acquired by the data acquisition unit and having the shape attribute set by the shape attribute setting unit; a data conversion unit that converts a polygon included in the region specified by the region specifying unit among the polygons included in mesh data acquired by the data acquisition unit into surface data based on the shape attribute, and converts a polygon excluding the polygon included in the region specified by the region specifying unit among the polygons included in mesh data acquired by the data acquisition unit into surface data of a free curved surface; and an output unit that outputs the surface data converted based on the shape attribute by the data conversion unit and the surface data of the free curved surface converted by the data conversion unit as CAD data.

According to this configuration, when a geometric shape such as a plane or a cylinder is set as the shape attribute, for example, a polygon included in a region specified by a user is converted into surface data based on the shape attribute set by the user. On the other hand, a polygon not included in the region specified by the user is converted into surface data of a free curved surface. After the conversion, the surface data of the free curved surface and the surface data based on the shape attribute are output as CAD data.

It is also possible to perform conversion into surface data of an analytic curved surface based on the shape attribute. In this case, data including the surface data of the analytic curved surface and the surface data of the free curved surface together may be output as CAD data.

According to another embodiment, the region included in the mesh data may be specified based on an operation by the user, or may be automatically specified by the reverse engineering support apparatus. In a case where the region is specified based on the operation by the user, the region can be specified based on the operation after receiving the operation by the user. Examples of the operation by the user include an operation of an operation unit such as a mouse.

Further, in a case where the user has performed an operation of designating a desired point, the region can be specified based on, for example, information such as a normal or a curvature as information indicating a feature of a surface including the point.

Further, in a case where the user inputs the shape attribute, the region can be specified based on designation of a point received by an input reception unit and the shape attribute.

Further, in a case where the user has performed an operation of designating a specific area, the specific area designated by the user can be specified as the region, and thus, surface data can be generated as intended by the user.

Further, the region specifying unit can also calculate an approximate plane based on a plurality of polygons included in the specific area. In this case, whether or not the specific area can be approximated as a plane may be determined based on the calculated normal of the approximate plane and positions and normals of the polygons included in the specific area.

Further, the shape attribute setting unit can also calculate curvature radii of the polygons. In this case, it is possible to calculate center points of curvature circles of the polygons based on the calculated curvature radii of the polygons and orientations of normals of the polygons, and set the shape attribute to the polygons included in the mesh data acquired by the data acquisition unit based on a positional relationship between the center points of the curvature circles calculated for the plurality of polygons forming the mesh data. As a result, areas having similar curvatures can be set as one region.

Further, the shape attribute of the region specified by the region specifying unit and the polygon included in the region can be stored in the storage unit in association with each other. In this case, a plurality of polygons assigned with one shape attribute may be specified from the mesh data acquired by the data acquisition unit based on the association data, and the plurality of specified polygons may be converted into one surface data based on the shape attribute associated with the polygons.

The mesh data acquired by the data acquisition unit can also be divided into a plurality of segments. In this case, the mesh data can be segmented such that a geometric element corresponding to the shape attribute is extracted, and a plurality of polygons associated with no shape attribute can be segmented into a plurality of segments based on geometric feature values of the respective polygons, and each of the segments can be converted into surface data.

Further, the region specifying unit can sequentially specify a first region and a second region. In this case, the association unit associates a first shape attribute with a polygon included in the first region. When an overlapping area exists between the first region and the second region, the first shape attribute already associated with the overlapping area can be changed to a second shape attribute by associating the second shape attribute with the overlapping area. Further, when the overlapping area exists between the first region and the second region, the second shape attribute may be associated with an area other than the overlapping area in the second area to hold the first shape attribute already associated with the overlapping area.

Further, a coordinate system may be settable as a display condition when the mesh data is to be displayed on the display unit. In this case, the display control unit can reproduce a display state for newly acquired mesh data by specifying a coordinate system when the mesh data is to be displayed on the display unit based on the display condition.

As described above, the polygon included in the region specified by the user can be converted into the surface data based on the shape attribute, and the other polygon can be converted into the surface data of the free curved surface, and thus, the free curved surface and the analytic curved surface can be generated as intended by the user with a simple operation.

BRIEF DESCRIPTION OF THE DRAWINGS

FIG. 10 is a view illustrating an example of a parameter table used when processing parameters are set;

FIG. 11 is a view illustrating an example of a data structure of a data set;

FIGS. 53A to 53C are views illustrating screens for setting a reference plane, a reference axis, and an origin, respectively;

DETAILED DESCRIPTION OF PREFERRED EMBODIMENTS

Hereinafter, embodiments of the present aspect will be described in detail with reference to the drawings. Note that the following description of the preferred embodiments is merely an example in essence, and is not intended to limit the present aspect, its application, or its use.

Figure 1:
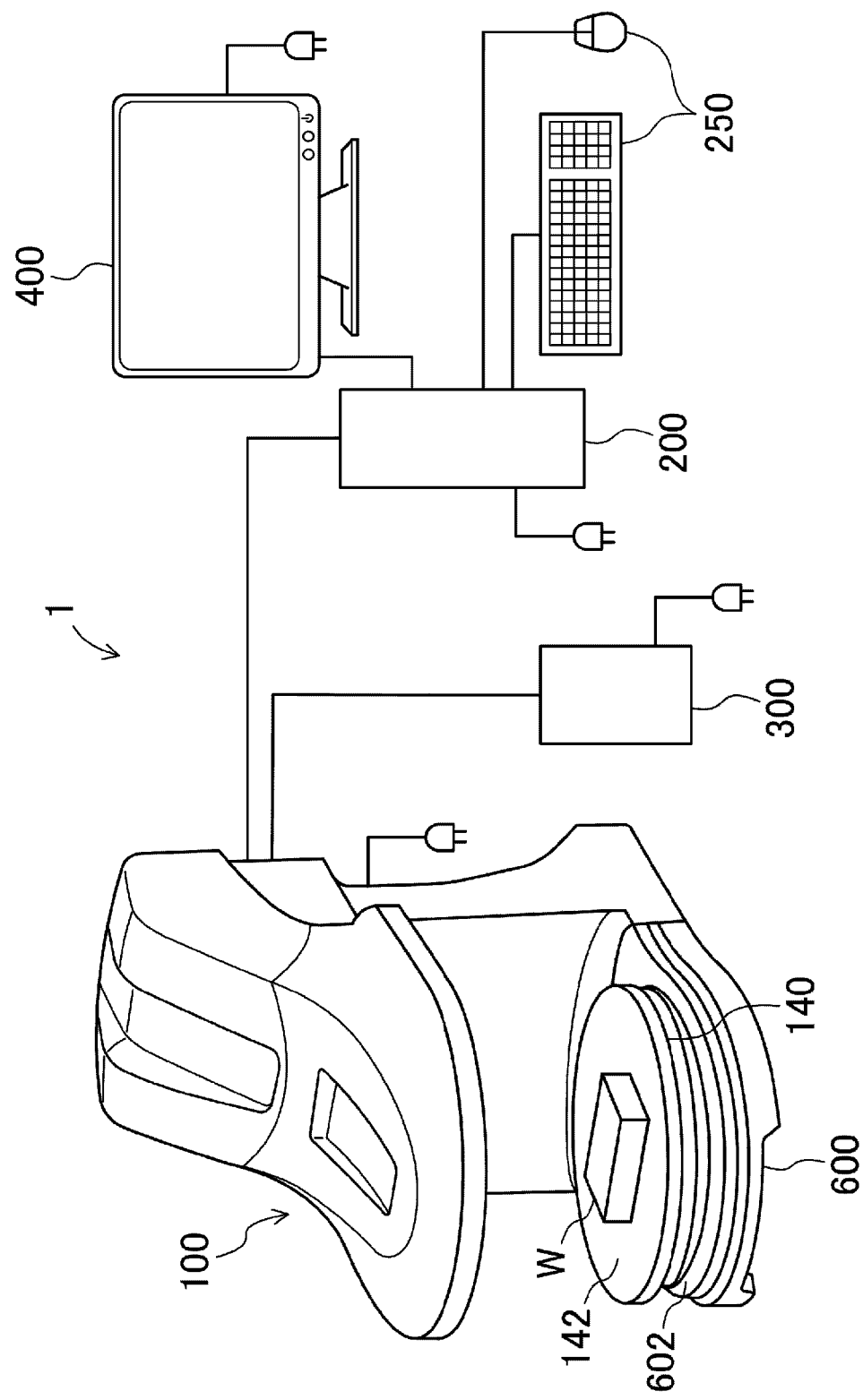
FIG. 1 is a diagram illustrating an overall configuration of a reverse engineering system according to an embodiment of the invention.

FIG. 1 is a diagram illustrating an overall configuration of a reverse engineering system 1 according to an embodiment of the invention. The reverse engineering system 1 is a system that converts mesh data of a workpiece (measurement target object) W acquired by measuring a shape of the workpiece W into CAD data and outputs the CAD data. The reverse engineering system 1 is used, for example, in a case where CAD data of an existing product is acquired to perform next-generation model development and shape analysis on CAD and/or CAE, a case where a shape of a model or a mock-up in a product design is reflected in the product design, a case where a product to be a fitting source is designed based on a shape of a mating component to be fitted, a case where an improved design is made based on a shape of a prototype, or the like. Therefore, the workpiece W is, for example, an existing product, a model, a mock-up, a prototype, or the like.

Further, the reverse engineering system 1 is an apparatus capable of converting mesh data of the workpiece W into surface data and outputting the surface data. Since a reverse engineering process and reverse engineering work of a user can be supported by converting the mesh data of the workpiece W into the surface data and outputting the surface data, the reverse engineering system 1 can also be referred to as a reverse engineering support apparatus 1.

In the following description, when a shape of the workpiece W is measured, the workpiece W is irradiated with measurement light of a predetermined pattern, and coordinate information is acquired using a signal obtained from reflection light reflected by the surface of the workpiece W in acquiring the coordinate information of a surface of the workpiece W. For example, it is possible to use a measurement method using triangulation in which structured illumination is used to project the workpiece W as the measurement light of the predetermined pattern and a fringe projection image obtained from reflection light thereof is used. In the invention, however, the principle and configurations for acquiring the coordinate information of the workpiece W are not limited thereto, and other methods can also be applied.

The reverse engineering system 1 includes a measurement unit 100, a pedestal 600, a controller 200, a light source unit 300, and a display unit 400. The reverse engineering system 1 can perform the structured illumination on the workpiece W by the light source unit 300, capture the fringe projection image to generate a depth image having the coordinate information, and can measure three-dimensional dimensions and shape of the workpiece W based on the depth image. The measurement using such fringe projection has an advantage that measurement time can be shortened since three-dimensional measurement can be performed without moving the workpiece W or an optical system such as a lens in a Z direction (height direction).

Figure 2:
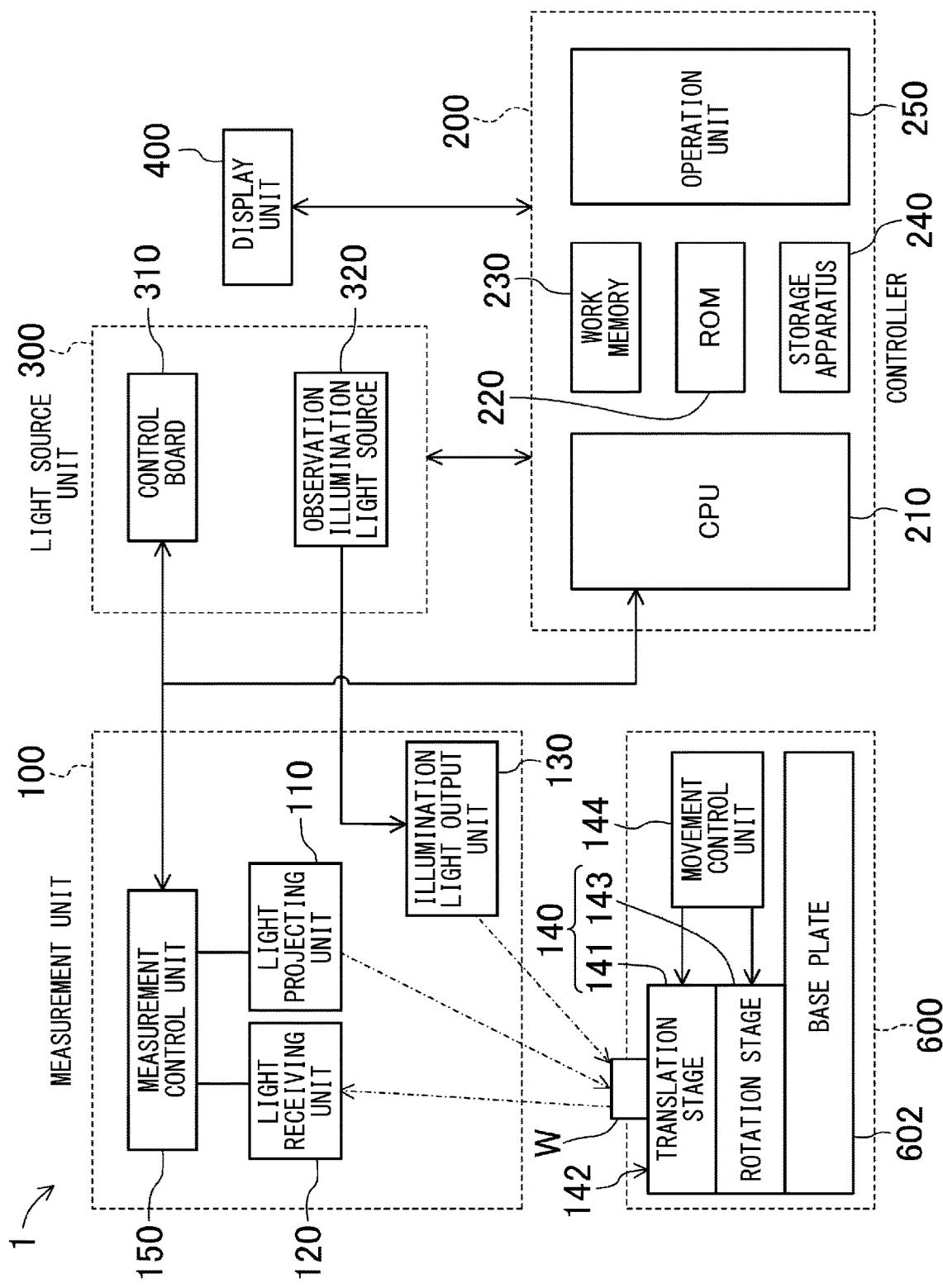
FIG. 2 is a block diagram of the reverse engineering system.
Figure 3:
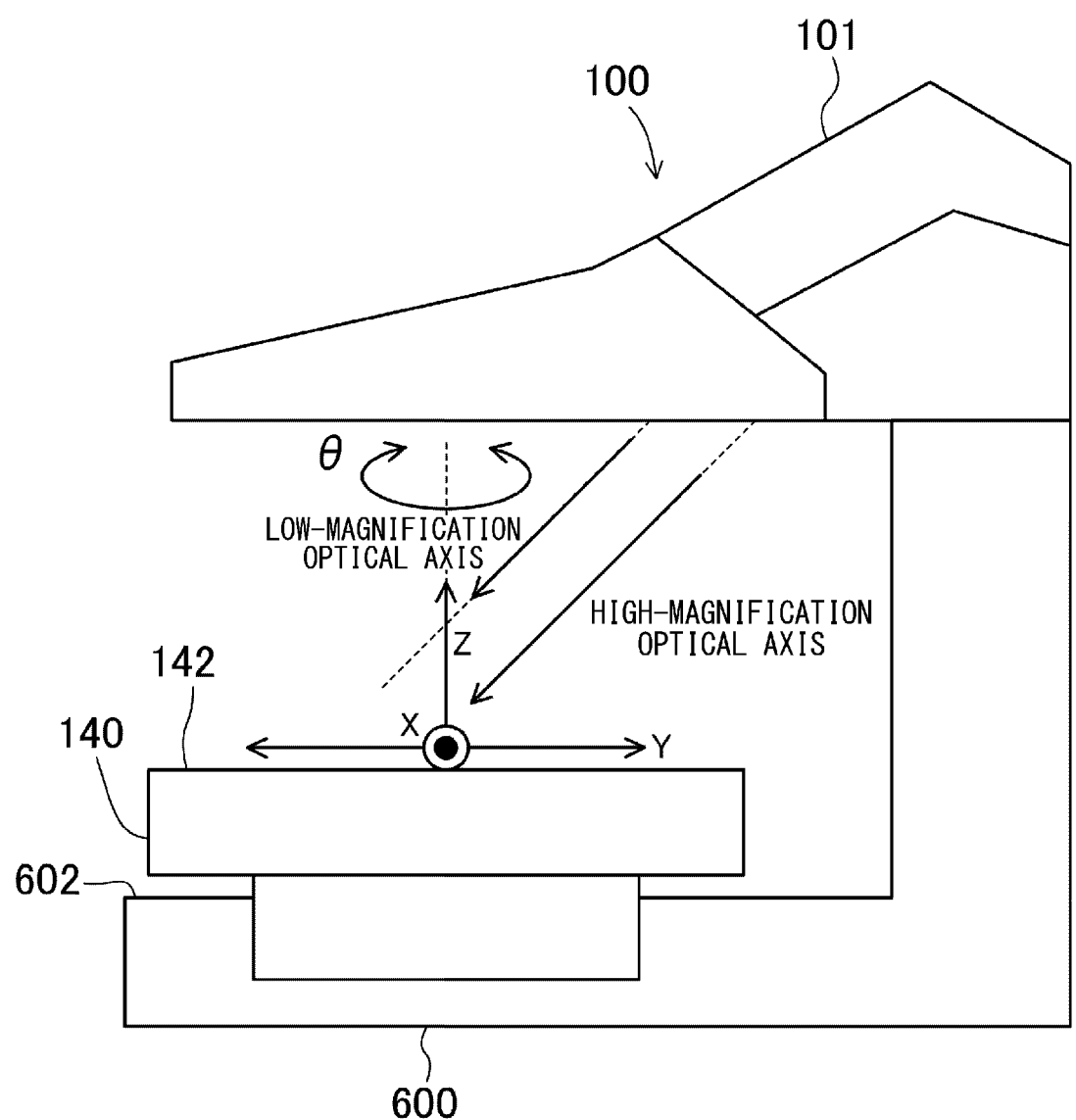
FIG. 3 is a side view of a measurement unit and a pedestal.

FIG. 2 illustrates a block diagram of the reverse engineering system 1 according to the embodiment of the invention. As illustrated in this drawing, the measurement unit 100 includes a light projecting unit 110, a light receiving unit 120, a measurement control unit 150, and an illumination light output unit 130. The light projecting unit 110 is a part that irradiates the workpiece W placed on a placement unit 140, which will be described later, with the measurement light having the predetermined pattern. The light receiving unit 120 is fixed in an attitude inclined with respect to a placement surface 142 which will be described later. The light receiving unit 120 receives the measurement light that has been emitted from the light projecting unit 110 and reflected by the workpiece W. When receiving the reflection light from the workpiece W, the light receiving unit 120 outputs a light reception signal indicating an amount of received light. The light receiving unit 120 can generate an observation image for observing the entire shape of the workpiece W by capturing an image of the workpiece W placed on the placement unit 140.

The light receiving unit 120 according to the embodiment includes a high-magnification light receiving unit and a low-magnification light receiving unit. The high-magnification light receiving unit is a part capable of capturing an image of the workpiece W in an enlarged manner as compared with the low-magnification light receiving unit. On the other hand, the low-magnification light receiving unit is a light receiving unit having a wider field of-view range than the high-magnification light receiving unit.

The pedestal 600 includes a base plate 602, the placement unit 140, and a movement control unit 144. The placement unit 140 is supported on the base plate 602 of the pedestal 600. The movement control unit 144 is a member that moves the placement unit 140. The movement control unit 144 may be provided on the controller 200 side, other than being provided on the pedestal 600 side.

The light source unit 300 is connected to the measurement unit 100. The light source unit 300 is a part that generates the measurement light and supplies the measurement light to the measurement unit 100. The controller 200 is a part that controls the measurement unit 100 and the like. The display unit 400 is connected to the controller 200, and is configured to display an image generated by the measurement unit 100 and to perform necessary setting, input, selection, and the like.

Figure 4:
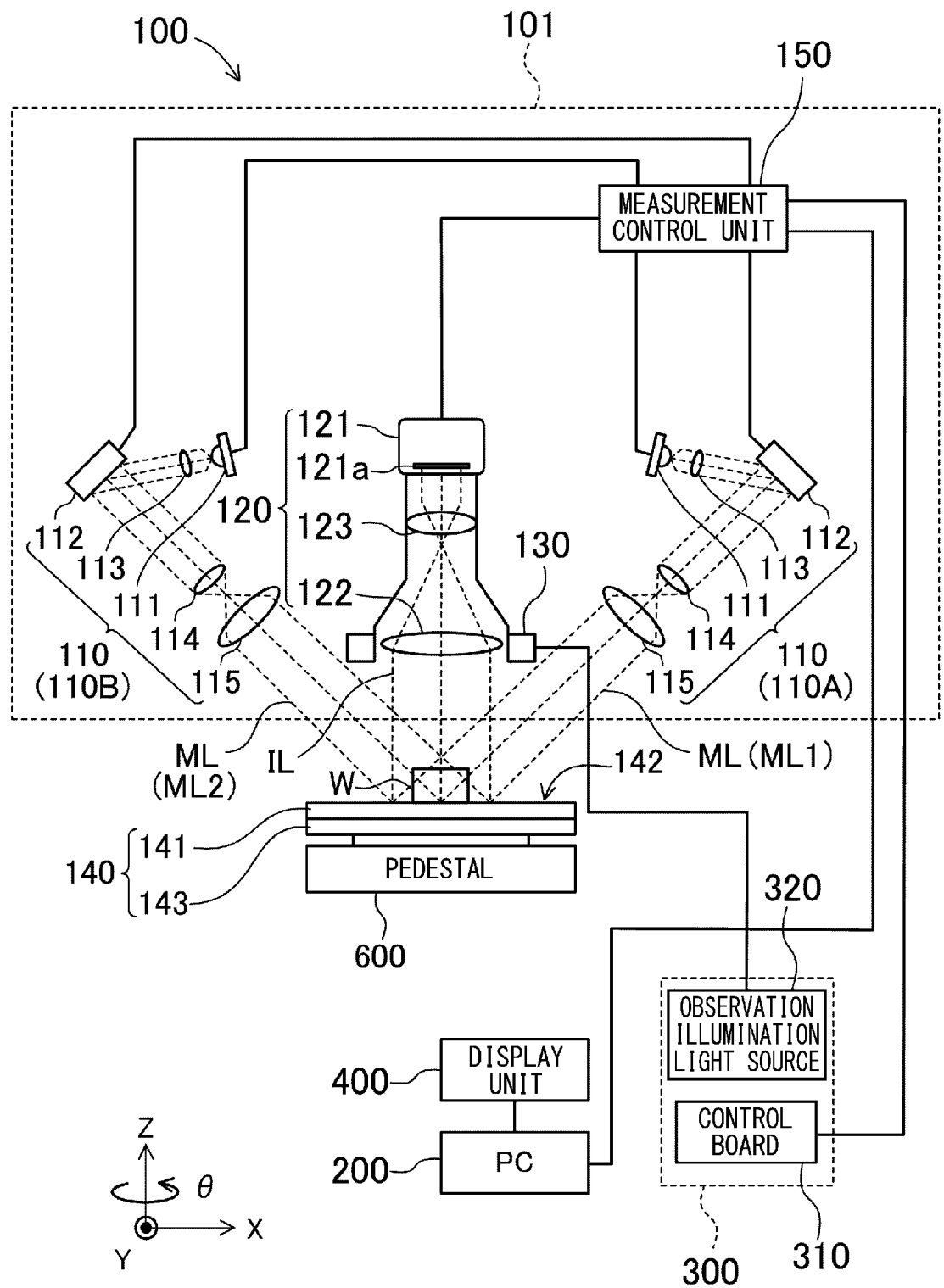
FIG. 4 is a block diagram of the measurement unit.

The placement unit 140 has the placement surface 142 on which the workpiece W is placed. As illustrated in FIG. 4, two directions orthogonal to each other in the placement surface 142 are defined as an X direction and a Y direction, and are indicated by arrows X and Y, respectively. A direction orthogonal to the placement surface 142 of the placement unit 140 is defined as the Z direction, and is indicated by an arrow Z. A direction of rotation about an axis parallel to the Z direction is defined as a θ direction, and is indicated by an arrow θ.

The placement unit 140 includes a rotation stage 143 that rotates the placement surface 142 about the axis extending in the Z direction, and a translation stage 141 that moves the placement surface 142 in the horizontal direction (X direction and Y direction). The translation stage 141 includes an X-direction movement mechanism and a Y-direction movement mechanism. The rotation stage 143 has a θ-direction rotation mechanism. The placement unit 140 may include a fixing member (clamp) that fixes the workpiece W to the placement surface 142. Furthermore, the placement unit 140 may include a tilt stage having a mechanism rotatable about an axis parallel to the placement surface 142.

The movement control unit 144 controls rotational movement of the rotation stage 143 and parallel movement of the translation stage 141 according to measurement conditions set by the measurement condition setting unit 261 which will be described later. Further, the movement control unit 144 controls a movement operation of the placement unit 140 performed by a placement movement unit based on a measurement area set by the measurement condition setting unit 261 which will be described later.

The controller 200 includes a central processing unit (CPU) 210, a read only memory (ROM) 220, a work memory 230, a storage apparatus (storage unit) 240, an operation unit 250, and the like. The controller 200 can be configured using a personal computer (PC) or the like.

A configuration of the measurement unit 100 is illustrated in a block diagram of FIG. 4. The measurement unit 100 includes the light projecting units 110, the light receiving unit 120, the illumination light output unit 130, the measurement control unit 150, and a main body case 101 housing these. The light projecting unit 110 includes a measurement light source 111, a pattern generation unit 112, and a plurality of lenses 113, 114, and 115. The light receiving unit 120 includes a camera 121 and a plurality of lenses 122 and 123. When measurement is performed at different magnifications by providing a plurality of light receiving units, a light receiving unit 120a including a low-magnification camera 121 and a low-magnification lens, and a light receiving unit 120b including a high-magnification camera 121 and a high-magnification lens may be mounted. Note that the invention is not limited to this configuration, and the magnification may be made variable by switching a plurality of lenses for one camera 121, or the magnification may be made variable by providing a zoom lens for one camera 121.

The light projecting unit 110 is disposed obliquely above the placement unit 140. Although the measurement unit 100 includes the two light projecting units 110 in the example illustrated in FIG. 4, the measurement unit 100 may include a plurality of the light projecting units 110. Here, a first measurement light projecting unit 110A (on the right side in FIG. 4) capable of irradiating a measurement target object WK with first measurement light ML1 from a first direction and a second measurement light projecting unit 110B (on the left side in FIG. 4) capable of irradiating the measurement target object WK with second measurement light ML2 from a second direction different from the first direction are provided. The first measurement light projecting unit 110A and the second measurement light projecting unit 110B are disposed symmetrically with respect to an optical axis of the light receiving unit 120. Although not illustrated, it is also possible to project light to the workpiece W in different illumination directions by providing three or more light projecting units 110 or relatively moving the light projecting unit 110 and the placement unit 140 while using the common light projecting unit 110. Although the above example employs the configuration in which the plurality of light projecting units 110 are prepared and light is received by the common light receiving unit 120, conversely, a plurality of the light receiving units 120 may be prepared to receive light for the common light projecting unit 110. Furthermore, an irradiation angle of illumination light projected by the light projecting unit 110 with respect to the Z direction is fixed in this example, but this can also be made variable.

The first measurement light projecting unit 110A and the second measurement light projecting unit 110B include a first measurement light source and a second measurement light source, respectively, as the measurement light sources 111. These measurement light sources 111 are, for example, halogen lamps emitting white light. The measurement light source 111 may be a light source that emits monochromatic light, for example, another light source such as a blue light-emitting diode (LED) emitting blue light or an organic electroluminescence (EL). The light (hereinafter, referred to as "measurement light") emitted from the measurement light source 111 is appropriately collected by the lens 113, and then, incident on the pattern generation unit 112.

A relative positional relationship among the light receiving unit 120, the light projecting units 110A and 110B, and the placement unit 140 is defined such that central axes of the light projecting units 110A and 110B and a central axis of the light receiving unit 120 intersect each other at a position where the disposition of the workpiece W on the placement unit 140 and depths of field of the light projecting units 110 and the light receiving unit 120 are appropriate. Further, a center of a rotation axis in the θ direction coincides with the central axis of the light receiving unit 120, and thus, when the placement unit 140 rotates in the θ direction, the workpiece W rotates in a field of view about the rotation axis without deviating from the field of view.

The pattern generation unit 112 reflects the light that has been emitted from the measurement light source 111 to be projected onto the workpiece W. The measurement light incident on the pattern generation unit 112 is converted into a preset pattern with a preset intensity (brightness) and emitted. The measurement light that has been emitted by the pattern generation unit 112 is converted into light having a diameter larger than an observable and measurable field of view of the light receiving unit 120 by the plurality of lenses 114 and 115, and then, is emitted to the workpiece W on the placement unit 140.

The pattern generation unit 112 is a member capable of switching between a light projection state in which the measurement light is projected to the workpiece W and a non-light projection state in which the measurement light is not projected to the workpiece W. Such a pattern generation unit 112 can be configured using, for example, a digital micromirror device (DMD) or the like. The pattern generation unit 112 using the DMD can be controlled by the measurement control unit 150 to be capable of switching between a reflection state in which the measurement light is reflected on an optical path as the light projection state and a light shielding state in which the measurement light is shielded as the non-light projection state.

The DMD is an element in which a large number of micromirrors (micro mirror surfaces) are arrayed on a plane. Each of the micromirrors can be individually switched between an ON state and an OFF state by the measurement control unit 150, and thus, a desired projection pattern can be configured by combining the ON states and the OFF states of the large number of micromirrors. As a result, it is possible to generate a pattern necessary for triangulation and measure a shape of the workpiece W. In this manner, the DMD functions as a projection pattern optical system that projects a periodic projection pattern for measurement onto the workpiece W during measurement. Further, the DMD is also excellent in response speed, and has an advantage of being operable at a higher speed than a shutter or the like.

Note that the example in which the DMD is used for the pattern generation unit 112 has been described in the above example, but the pattern generation unit 112 is not limited to the DMD, and other members can also be used in the invention. For example, a liquid crystal on silicon (LCOS) may be used as the pattern generation unit 112. Alternatively, a transmission amount of measurement light may be adjusted using a transmissive member instead of a reflective member. In this case, the pattern generation unit 112 is disposed on an optical path of the measurement light to switch between the light projection state in which the measurement light is transmitted and the light shielding state in which the measurement light is shielded. Such a pattern generation unit 112 can be configured using a liquid crystal display (LCD). Alternatively, the pattern generation unit 112 may be configured by a projection method using a plurality of line LEDs, a projection method using a plurality of optical paths, an optical scanner method including a laser and a galvanometer mirror, an accordion fringe interferometry (AFI) method using interference fringes generated by superimposing beams divided by a beam splitter, a projection method using gratings formed with a piezo stage, an encoder with high resolving power, and the like and a movement mechanism, or the like.

The light receiving unit 120 is disposed above the placement unit 140. The measurement light reflected upward of the placement unit 140 by the workpiece W is collected to form an image by the plurality of lenses 122 and 123 of the light receiving unit 120, and then received by the camera 121.

The camera 121 is, for example, a charge-coupled device (CCD) camera including an imaging element 121a. The imaging element 121a is, for example, a monochromatic charge-coupled device (CCD). The imaging element 121a may be another imaging element such as a complementary metal-oxide semiconductor (CMOS) image sensor. A color imaging element needs to include pixels respectively corresponding to light reception for red, green, and blue, and thus, has lower measurement resolving power as compared with a monochromatic imaging element, and has lower sensitivity because each of the pixels is necessarily provided with a color filter. Therefore, in the embodiment, the monochromatic CCD is adopted as the imaging element, and a color image is acquired by the illumination light output unit 130 performing irradiation with illuminations respectively corresponding to red (R), green (G), and blue (B) in a time division manner to capture images. With such a configuration, it is possible to acquire a color image of a measurement object without lowering the measurement accuracy.

Note that the color imaging element may be used as the imaging element 121a. In this case, although the measurement accuracy and the sensitivity are lower than those of the monochromatic imaging element, it becomes unnecessary to emit the illuminations respectively corresponding to RGB from the illumination light output unit 130 in a time division manner, and a color image can be acquired only by emitting white light, so that an illumination optical system can be simply configured. An analog electric signal (hereinafter, referred to as a "light reception signal") corresponding to the amount of received light is output from each pixel of the imaging element 121*a* to the measurement control unit 150.

An analog/digital converter (A/D converter) and a first-in first-out (FIFO) memory (not illustrated) are mounted on the measurement control unit 150. The light reception signals output from the camera 121 are sampled at a constant sampling period and converted into digital signals by the A/D converter of the measurement control unit 150 under the control of the light source unit 300. The digital signals output from the A/D converter are sequentially accumulated in the FIFO memory. The digital signals accumulated in the FIFO memory are sequentially transferred to the controller 200 as pixel data.

The operation unit 250 of the controller 200 can include, for example, a keyboard, a pointing device, and the like. As the pointing device, for example, a mouse, a joystick, or the like is used.

The ROM 220 of the controller 200 stores a system program and the like. The work memory 230 of the controller 200 includes, for example, a random access memory (RAM) and is used for processing of various types of data. The storage apparatus 240 includes a solid-state drive, a hard disk drive, or the like. The storage apparatus 240 stores a reverse engineering program. Further, the storage apparatus 240 is used to save various types of data such as pixel data (image data), setting information, and measurement conditions given from the measurement control unit 150. The measurement conditions include, for example, various settings set by a scanner module 260, which will be described later, at the time of measuring a shape of the workpiece W, such as settings (a pattern frequency and a pattern type) of the light projecting unit 110 and a type (the low-magnification light receiving unit or the high-magnification light receiving unit) of the light receiving unit 120. Furthermore, the storage apparatus 240 can also store luminance information, coordinate information, and attribute information for each pixel constituting a measurement image.

The CPU 210 is a control circuit or a control element that processes a given signal or data, performs various computations, and outputs computation results. In the specification, a CPU means an element or a circuit that performs computations, and is not limited to a processor, such as a CPU for general-purpose PC, an MPU, a GPU or a TPU, but used in the sense of including a processor or a microcomputer such as a FPGA, an ASIC, and an LSI, or a chip set such as an SoC.

The CPU 210 generates image data based on pixel data given from the measurement control unit 150. The CPU 210 performs various processes on the generated image data using the work memory 230. For example, the CPU 210 generates measurement data representing a three-dimensional shape of the workpiece W included in a field of view of the light receiving unit 120 at a specific position of the placement unit 140 based on the light reception signal output from the light receiving unit 120. The measurement data is an image itself acquired by the light receiving unit 120. For example, when a shape of the workpiece W is measured by a phase shift method, a plurality of images constitute one piece of measurement data. Note that the measurement data may be point cloud data that is a set of points having three-dimensional position information, and the measurement data of the workpiece W can be acquired from the point cloud data. The point cloud data is data expressed by an aggregate of a plurality of points having three-dimensional coordinates.

In a case where measurement data of at least a part of the workpiece W is acquired as described above in measuring a shape of the workpiece W, movement of the placement unit 140 by the movement control unit 144 so as to acquire measurement data of another part of the workpiece W located around the measurement data of the acquired part and generation of measurement data of the another part of the workpiece W at this position are repeated and a plurality of pieces of the obtained measurement data are synthesized, whereby synthetic measurement data including the entire shape of the workpiece W can be generated. A mode for generating the synthetic measurement data can be referred to as a linkage mode, and an image with a wider field of view than that in a case where an image is captured with a single field of view can be acquired by selecting the linkage mode.

The movement control unit 144 determines whether to execute only the rotation operation of the rotation stage 143 or to execute both the rotation operation of the rotation stage 143 and a parallel movement operation of the translation stage 141 based on the measurement data of at least a part of the workpiece W. As a result, an imaging range is automatically determined without the consciousness of the user according to an outer shape of the workpiece W, whereby the three-dimensional measurement becomes easy. Note that the movement control unit 144 can control the rotation stage 143 to rotate in a state in which the translation stage 141 has been moved in the XY directions, and then, the movement in the XY directions has been stopped, whereby a shape around the workpiece W can also be acquired.

The display unit 400 is a member configured to display the fringe projection image acquired by the measurement unit 100, the depth image generated based on the fringe projection image, a texture image captured by the measurement unit 100, various user interface screens, and the like. The display unit 400 is configured using, for example, an LCD panel or an organic electroluminescence (EL) panel. Furthermore, the display unit 400 can also be used as the operation unit 250 when being configured using a touch panel. Further, the display unit 400 can also display the image generated by the light receiving unit 120.

The light source unit 300 includes a control board 310 and an observation illumination light source 320. A CPU (not illustrated) is mounted on the control board 310. The CPU of the control board 310 controls the light projecting unit 110, the light receiving unit 120, and the measurement control unit 150 based on a command from the CPU 210 of the controller 200. Note that this configuration is an example, and other configurations may be used. For example, the control board may be omitted by controlling the light projecting unit 110 and the light receiving unit 120 by the measurement control unit 150 or controlling the light projecting unit 110 and the light receiving unit 120 by the controller 200. Alternatively, the light source unit 300 can also be provided with a power supply circuit configured to drive the measurement unit 100.

The observation illumination light source 320 includes, for example, LEDs of three colors that emit red light, green light, and blue light. Light of any color can be generated from the observation illumination light source 320 by controlling the luminance of the light emitted from each of the LEDs. Illumination light IL generated from the observation illumination light source 320 is output from the illumination light output unit 130 of the measurement unit 100 through a light guiding member (light guide). Note that light sources other than the LED, such as semiconductor laser (LD), halogen light, and HID, can be appropriately used for the observation illumination light source. In particular, in a case where an element capable of capturing a color image is used as the imaging element, a white light source can be used for the observation illumination light source.

The illumination light IL output from the illumination light output unit 130 irradiates the workpiece W with red light, green light, and blue light in a time-division manner. As a result, a color texture image can be obtained by synthesizing texture images respectively captured by these red light, green light, and blue light and be displayed on the display unit 400.

Figure 5:
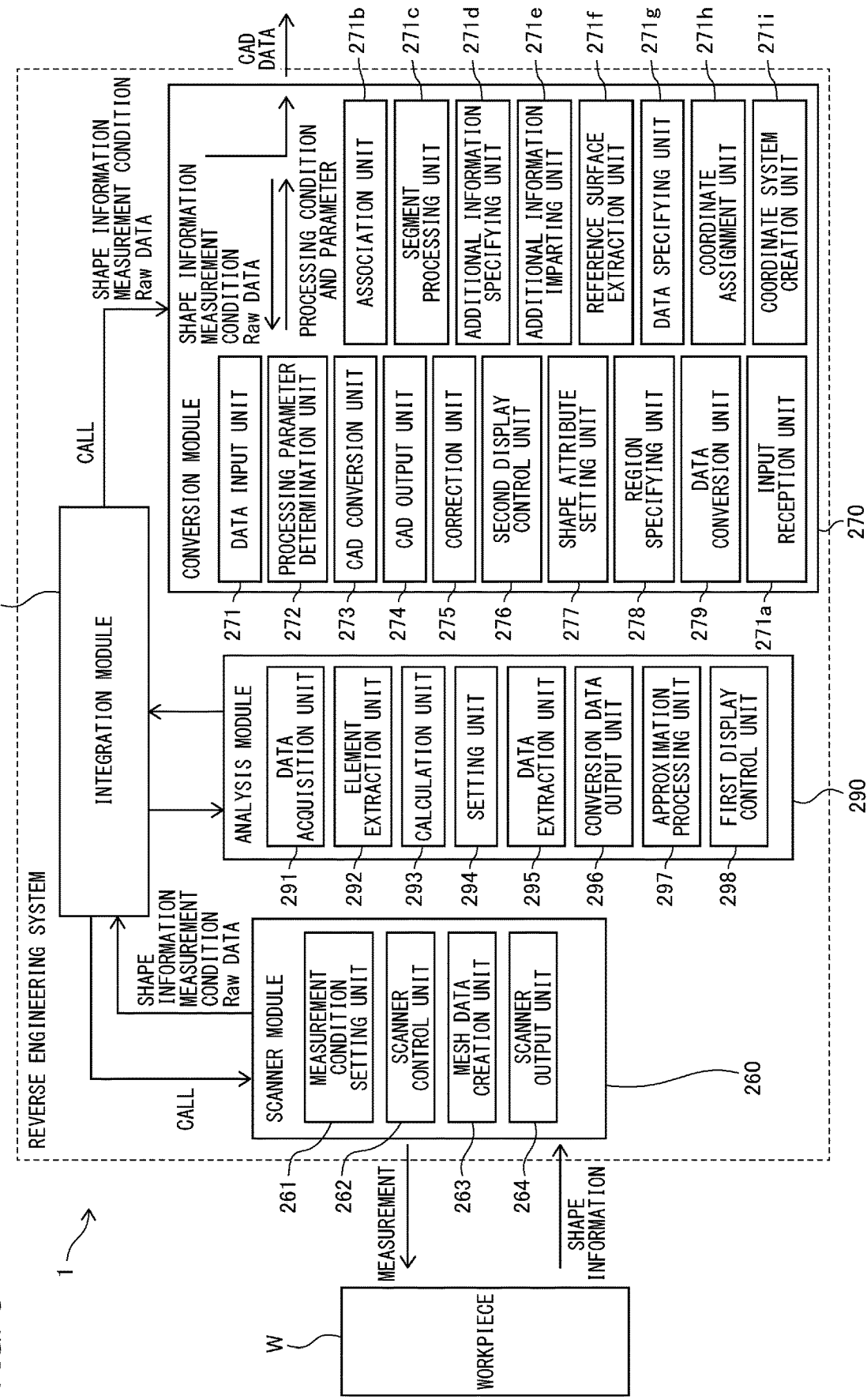
FIG. 5 is a diagram illustrating configuration examples of modules.

The controller 200 forms the scanner module 260, a conversion module 270, an integration module 280, and an analysis module 290 illustrated in FIG. 5 by the CPU 210, the ROM 220, the work memory 230, the storage apparatus 240, and the like. Details of operations of the modules 260, 270, and 290 will be described later based on flowcharts illustrated in FIGS. 8 and 9.

To give a brief description, the scanner module 260 is a part that measures a shape of the workpiece W to acquire image data of the workpiece W and creates mesh data of the workpiece W based on the image data. The conversion module 270 is a part that converts the mesh data created by the scanner module 260 into CAD data. The CAD data is three-dimensional shape information including an analytic curved surface and a free curved surface, and includes surface data, solid data, data used for design, and the like. The surface data is data of a shape surface including a free curved surface and an analytic curved surface, such as side surface data and plane data of a cylinder.

The analysis module 290 is a part that acquires mesh data, extracts a plurality of geometric elements from the acquired mesh data, and calculates dimensions between the plurality of extracted geometric elements.

The integration module 280 is a part that transmits a signal and data from the scanner module 260 to the conversion module 270 and the analysis module 290, and transmits a signal and data from the conversion module 270 to the scanner module 260. In this example, the module can execute a plurality of computational processes in one unit, and can also be referred to as functional units, functional blocks, or the like, for example.

Although details will be described later, the scanner module 260 includes, for example, the measurement condition setting unit 261, a scanner control unit 262, a mesh data creation unit 263, a scanner output unit 264, and the like. The measurement condition setting unit 261 is a part that sets a measurement condition of a shape of the workpiece. The scanner control unit 262 is a part that controls the measurement unit 100 according to the measurement condition set by the measurement condition setting unit 261 to generate image data, and acquires measurement data of the workpiece W based on the generated image data. The mesh data creation unit 263 is a part that generates mesh data based on the image data of the workpiece W acquired by the scanner control unit 262. The scanner output unit 264 is a part that outputs the mesh data created by the mesh data creation unit 263 and additional data to the conversion module 270. The additional data is data including at least one of the measurement condition or data calculated from the measurement data of the workpiece W.

That is, the scanner module 260 controls the measurement unit 100, and generates all of conditions (a measurement model, a measurement magnification, a resolution, and the like) under which a shape of the workpiece W has been measured and raw data (for example, image data and the like) at the time of the measurement together with three-dimensional data. The three-dimensional data is mesh data including a plurality of polygons, and can also be referred to as polygon data. The polygon is data including information specifying a plurality of points and information indicating a polygonal surface formed by connecting the points, and can include, for example, information specifying three points and information indicating a triangular surface formed by connecting the three points. The mesh data and the polygon data can also be defined as data represented by aggregates of a plurality of polygons.

Figure 12:
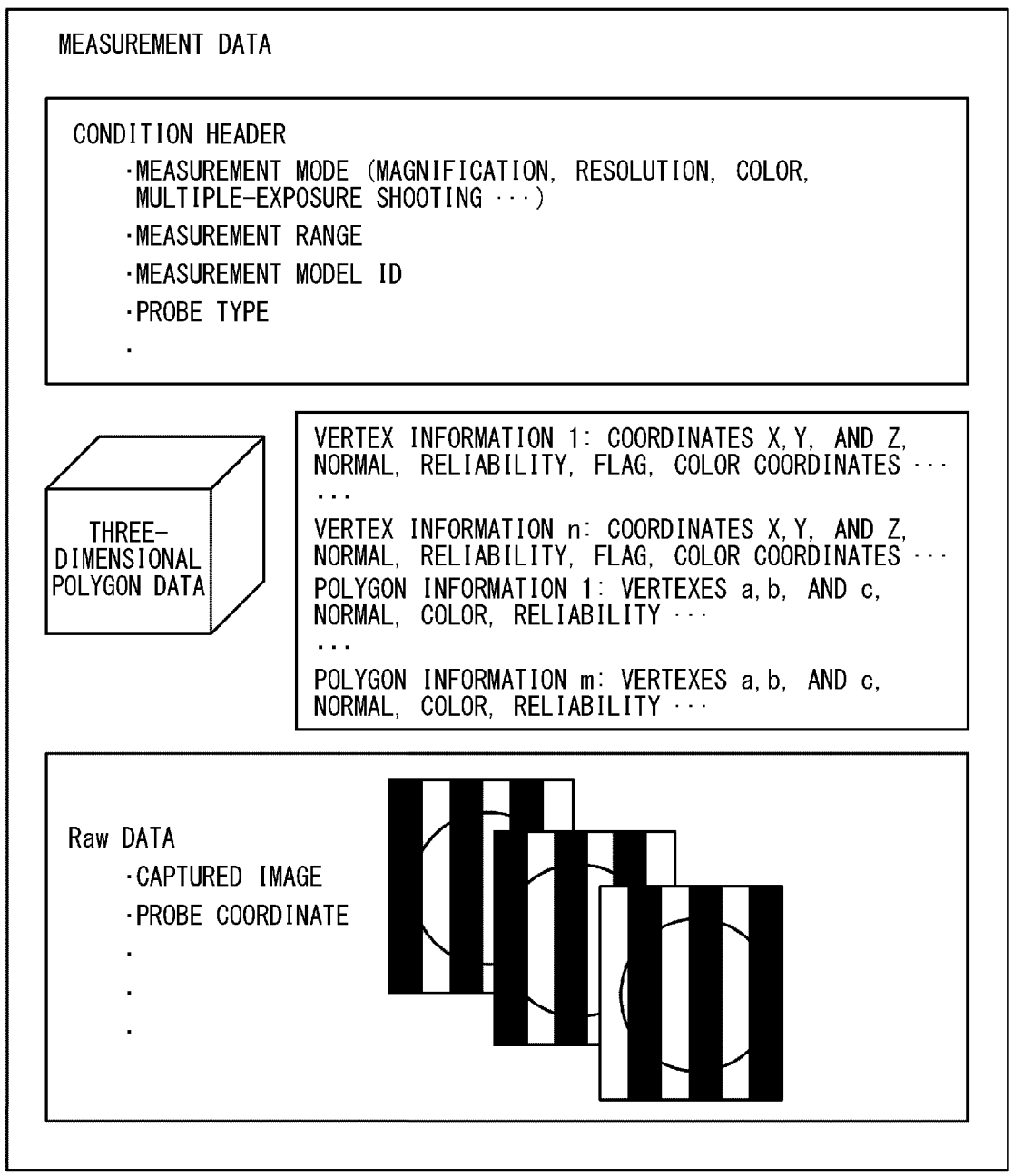
FIG. 12 is a view illustrating each piece of data included in measurement data.

The conversion module 270 converts mesh data into CAD data, and this conversion processing is determined based on the measurement condition and the raw data. Specifically, the conversion module 270 includes, for example, a data input unit 271, a processing parameter determination unit 272, a CAD conversion unit 273, a CAD output unit 274, a correction unit 275, and the like. The data input unit 271 is a part that receives inputs of the mesh data output from the scanner output unit 264 and the additional data. The processing parameter determination unit 272 is a part that determines processing parameters when the mesh data is converted into the CAD data according to the additional data received by the data input unit 271, and is configured to be capable of determining the processing parameters based on a parameter table as illustrated in FIG. 10. The CAD conversion unit 273 is a part that converts the mesh data into the CAD data according to the processing parameters determined by the processing parameter determination unit 272. The CAD output unit 274 is a part that outputs the CAD data converted by the CAD conversion unit 273. Further, regarding information on the mesh data, the information can be held in forms as illustrated in FIGS. 11 and 12. This will be described later.

In the conversion module 270, a conversion parameter, a conversion algorithm, a combination thereof, a processing order, the number of repetitions, and the like in CAD conversion processing can be determined, and for example, it is possible to change a search radius at the time of calculating a curvature from a polygon based on a measurement condition: magnification, and the like. Further, it is also possible to determine whether or not to implement a smoothing filter in the CAD conversion according to a model of the measurement unit 100, and to determine a weight in polygon processing according to image luminance data in the raw data.

The analysis module 290 includes, for example, a data acquisition unit 291 that acquires mesh data, an element extraction unit 292 that extracts a plurality of geometric elements from the acquired mesh data, a calculation unit 293 that calculates dimensions between the plurality of extracted geometric elements, a setting unit 294, a data extraction unit 295, a conversion data output unit 296, an approximation processing unit 297, and the like.

The analysis module 290 further includes the setting unit 294 that sets a conversion area for execution of CAD conversion in the mesh data acquired by the data acquisition unit 291, the data extraction unit 295 that extracts mesh data to be output to the conversion module 270 based on the conversion area set by the setting unit 294, and the scanner output unit (conversion data output unit) 264 that outputs the mesh data extracted by the data extraction unit 295 to the conversion module 270. The conversion data output unit may be substituted by the scanner output unit 264 of the scanner module 260, or may be provided separately from the scanner output unit 264.

The reverse engineering system 1 has an all-in-one form encompassing all the respective modules 260 and 270 for measurement, processing determination, and conversion, and transmission and reception of data between the modules 260 and 270 can also be automated.

In a case where the transmission and reception of data between the modules 260 and 270 is automated, the integration module 280 that integrates the modules 260 and 270 is provided. As a result, each of the modules 260 and 270 has a form of proceeding processing designated by the integration module 280. The role of the integration module 280 can also be consolidated into any of the modules 260 and 270 that execute the measurement, the processing determination, the CAD conversion, and the like. Further, each function of the analysis module 290 can also be integrated into the scanner module 260.

Figure 6:
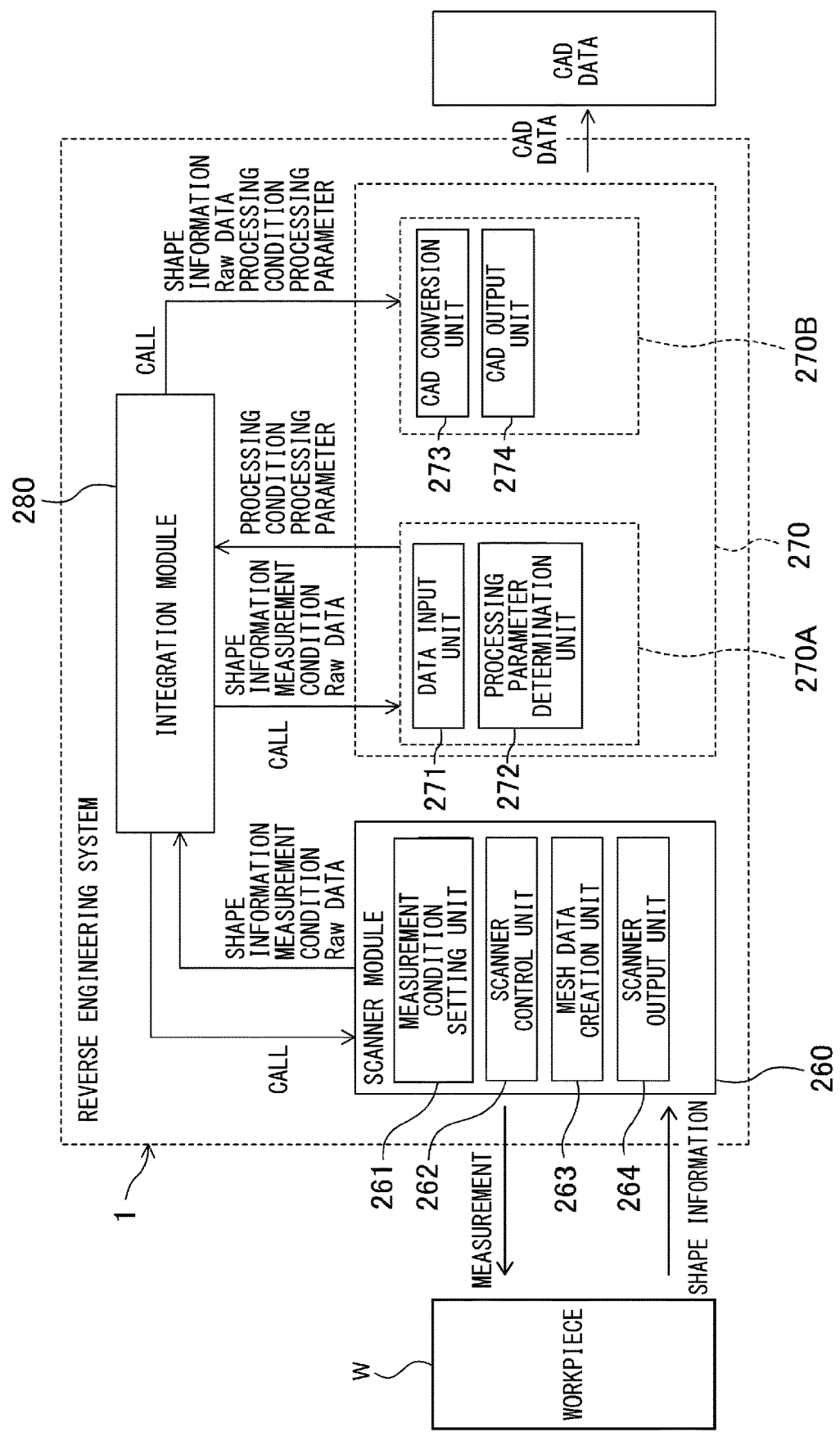
FIG. 6 is a diagram illustrating configuration examples of modules according to a first modification.

FIG. 6 is a diagram illustrating a configuration example of a module according to a first modified example. In the first modified example, the data input unit 271 and the processing parameter determination unit 272 constitute a processing determination module 270A, and the CAD conversion unit 273 and the CAD output unit 274 constitute a processing execution module 270B. The processing determination module 270A and the processing execution module 270B constitute the conversion module 270. In the first modified example, transmission and reception of the entire data are performed via the integration module 280.

Figure 7:
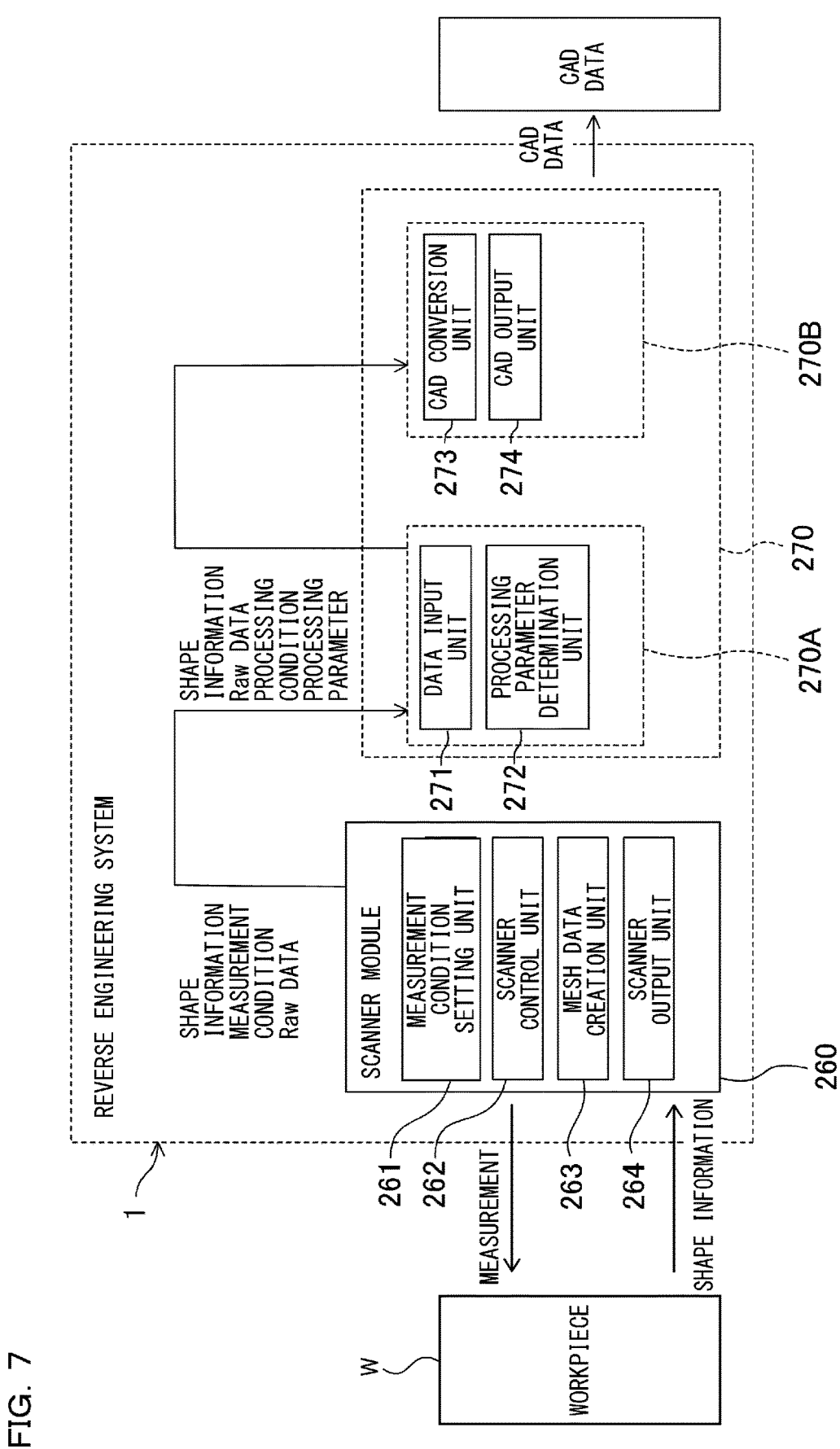
FIG. 7 is a diagram illustrating configuration examples of modules according to a second modification.

FIG. 7 is a diagram illustrating configuration examples of modules according to a second modified example. In the second modified example, an integration module is omitted, and the scanner module 260, the processing determination module 270A, and the processing execution module 270B are configured in series.

(Operation of Reverse Engineering System)

Figure 8:
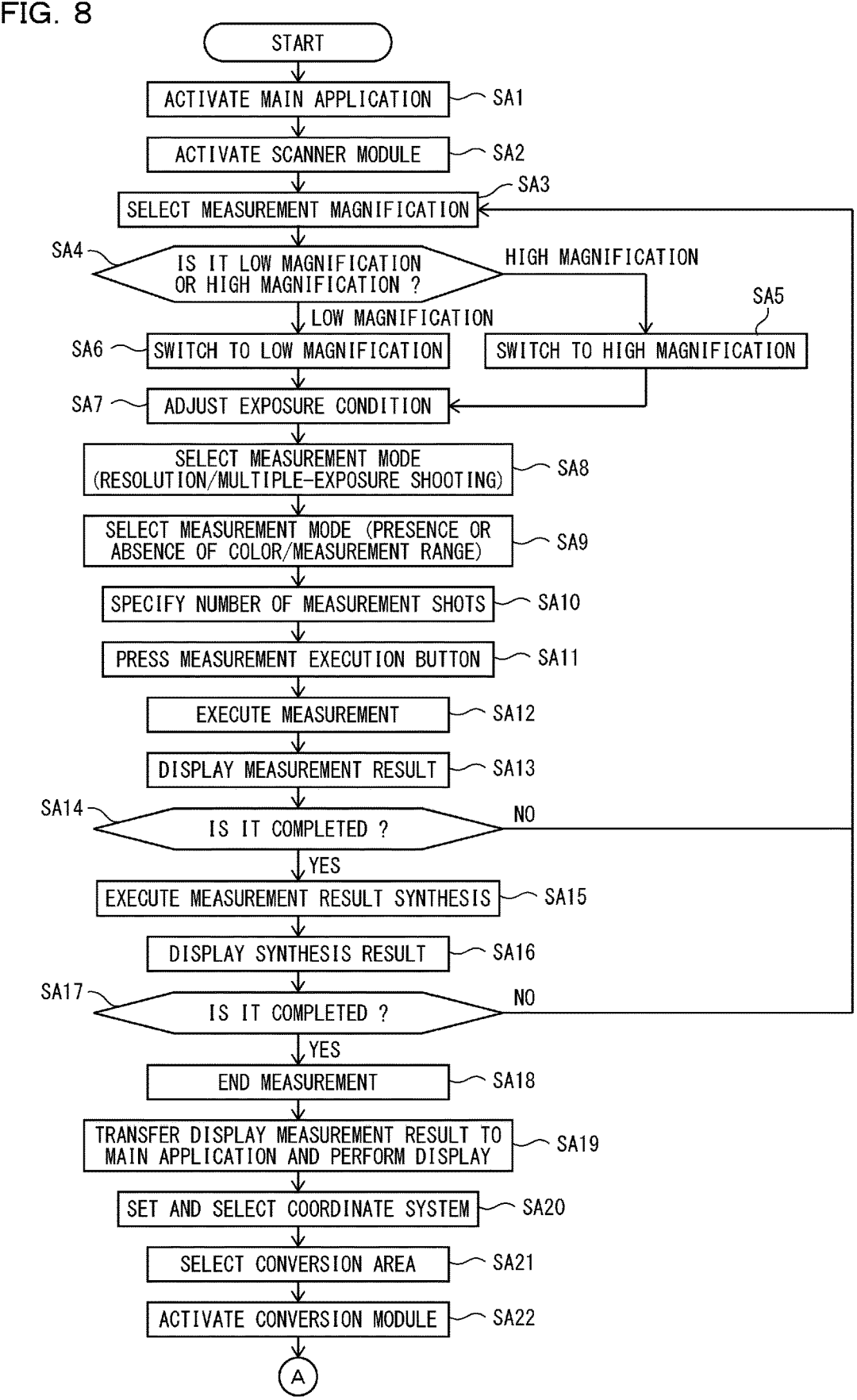
FIG. 8 is a view illustrating a first half of a flowchart illustrating an operation of the reverse engineering system.
Figure 9:
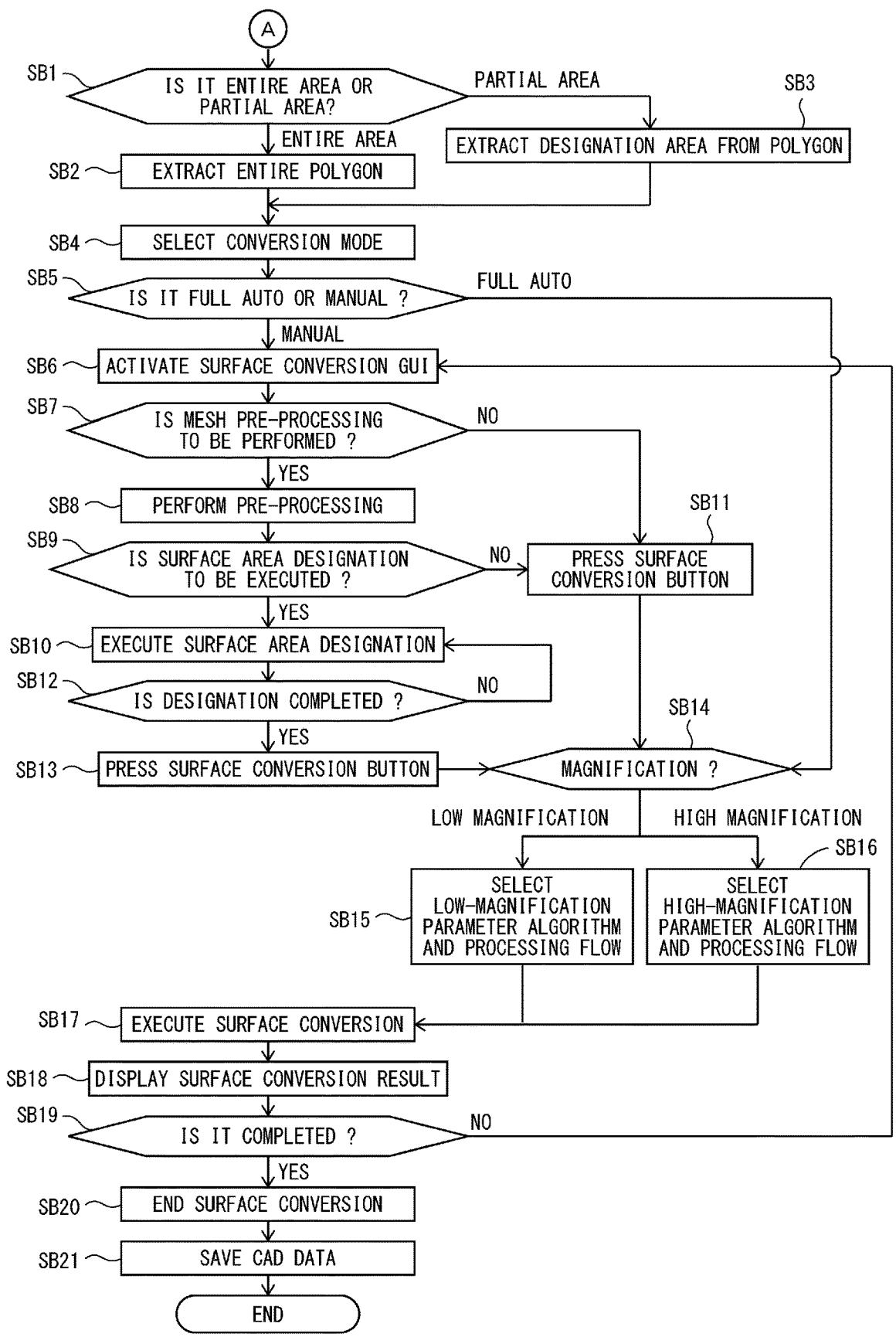
FIG. 9 is a view illustrating a second half of the flowchart illustrating the operation of the reverse engineering system.

FIGS. 8 and 9 are flowcharts illustrating the operation of the reverse engineering system 1. In Step SA1 after the start, an analysis application as a main application is activated on the controller 200. In Step SA2, the scanner module 260 is activated. In Step SA3, a measurement magnification (low magnification or high magnification) is selected. Steps SA1 to SA3 are operations by the user. The operation by the user can be performed using the operation unit 250 or the like, and an operation state of the operation unit 250 is detected by the CPU 210 and reflected in each control.

In Step SA4, the scanner module 260 determines whether the measurement magnification selected in Step SA3 is a low magnification or a high magnification. When the measurement magnification selected in Step SA3 is the high magnification, the flow proceeds to Step SA5, and the light receiving unit 120 is switched to one for the high magnification. On the other hand, when the measurement magnification selected in Step SA3 is the low magnification, the flow proceeds to Step SA6, and the light receiving unit 120 is switched to one for the low magnification. Steps SA5 and SA6 are executed by the scanner module 260.

In Step SA7, exposure conditions such as brightness of an illumination, exposure time, and a gain are adjusted. In Step SA8, measurement modes (a resolution and the number of times of multiple-exposure shooting) are selected. In Step SA9, other measurement modes (presence or absence of a color and a measurement range) are selected. In Step SA10, the number of measurement shots is designated. In Step SA11, a measurement execution button is pressed. Steps SA7 to SA11 are operations by the user, and all of a setting of the resolution, a setting of the number of times of multiple-exposure shooting, a setting of the presence or absence of the color, and a setting of the measurement range are received by the measurement condition setting unit 261. The resolution is the resolution of the measurement unit (imaging unit) 100.

In Step SA12, the scanner module 260 executes measurement. That is, when the scanner module 260 detects that the measurement execution button has been pressed, the scanner control unit 262 controls the measurement unit 100 according to measurement conditions set by the measurement condition setting unit 261 to generate image data, and acquires measurement data of the workpiece W based on the generated image data. When the scanner control unit 262 acquires the measurement data of the workpiece W, the mesh data creation unit 263 generates mesh data based on the measurement data. At this time, information on reliability of each vertex of a polygon is also created.

In Step SA13, a measurement result is displayed on the display unit 400. In Step SA14, it is determined whether or not the measurement has been completed. The flow returns to Step SA3 if the measurement has not been completed, or proceeds to Step SA15 if the measurement has been completed. In Step SA15, measurement result synthesis is executed. In Step SA16, the measurement result synthesis executed in Step SA15 is displayed on the display unit 400.

In Step SA17, it is determined again whether or not the measurement has been completed. The flow returns to Step SA3 if the measurement has not been completed, or proceeds to Step SA18 to execute measurement end processing if the measurement has been completed.

In Step SA19, the scanner output unit 264 outputs the mesh data created by the mesh data creation unit 263 and additional data to the conversion module 270. As a result, the measurement data, information on the magnification and resolution at the time of acquiring the measurement data, information on the number of times of multiple-exposure shooting, information on the presence or absence of the color, and information on the measurement range are transferred to the main application as first additional data, and information on the reliability of each vertex of the polygon and the like are transferred to the main application as second additional data. Furthermore, an image of the workpiece W based on the mesh data is displayed on the display unit 400.

In Step SA20, a coordinate system is set and selected. Thereafter, in Step SA21, a conversion area to be converted into CAD data is designated or selected. Then, in Step SA22, the user activates the conversion module 270 on the controller 200. When the conversion module 270 is activated, the data input unit 271 receives inputs of the mesh data output from the scanner output unit 264 and the additional data. In the embodiment, the coordinate system and the conversion area are determined by the main application (analysis module 290), but the coordinate system and the conversion area may be determined by the conversion module 270.

Figure 13:
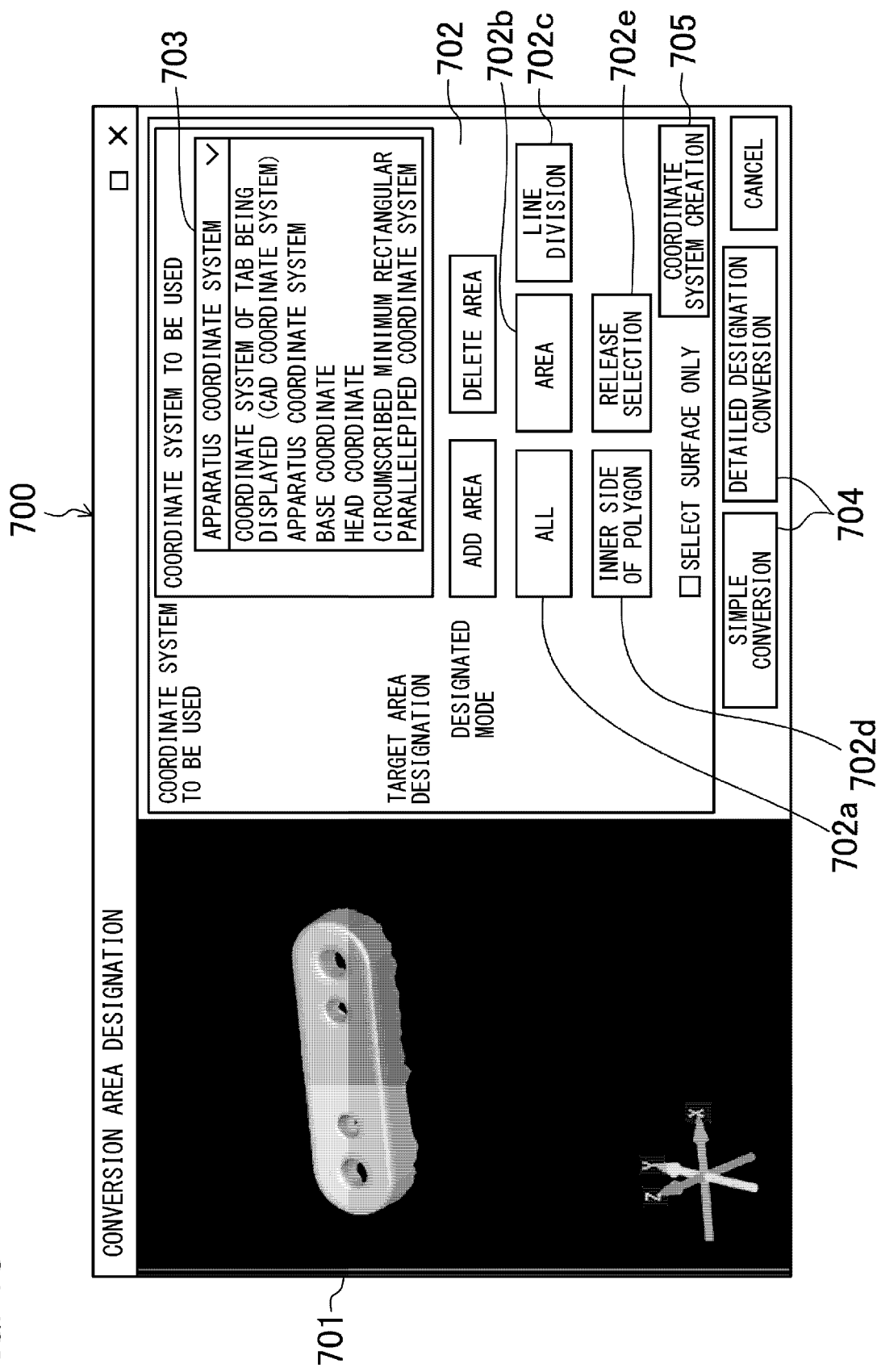
FIG. 13 is a view illustrating an example of a conversion area designation user interface screen.

That is, the conversion module 270 generates a conversion area designation user interface screen 700 as illustrated in FIG. 13 and displays the same on the display unit 400. The conversion area designation user interface screen 700 is provided with an image display area 701 for displaying an image of the workpiece W and a conversion area designation area 702. The conversion area designation area 702 is provided with a designate-all button 702a, a first area designation button 702b operated at the time of designating an area surrounded by the operation of the operation unit 250, a second area designation button 702c operated at the time of designating one of two areas divided by a predetermined surface, a third area designation button 702d operated at the time of designating an area surrounded by a polygon drawn by the operation of the operation unit 250, and a release button 702e operated at the time of releasing designation. When the designate-all button 702a is operated, the entire area of the workpiece W is designated. When the first area designation button 702b, the second area designation button 702c, and the third area designation button 702d are operated, an area of a part of the workpiece W is designated. Further, the conversion area designation user interface screen 700 is provided with an output instruction button (conversion instruction button) 704. When the output instruction button 704 is operated, the mesh data is output to the conversion module 270.

Thereafter, the flow proceeds to Step SB1 of the flowchart illustrated in FIG. 9. In Step SB1, it is determined whether the conversion area to be converted into CAD data is the entire area of the workpiece W or an area of a part (partial area) of the workpiece W. In the case of the entire area, the flow proceeds to Step SB2 to extract the entire polygon of the mesh data output from the scanner output unit 264. In the case of the partial area, the flow proceeds to Step SB3 to extract only the designated area out of the polygons of the mesh data output from the scanner output unit 264.

Figure 14:
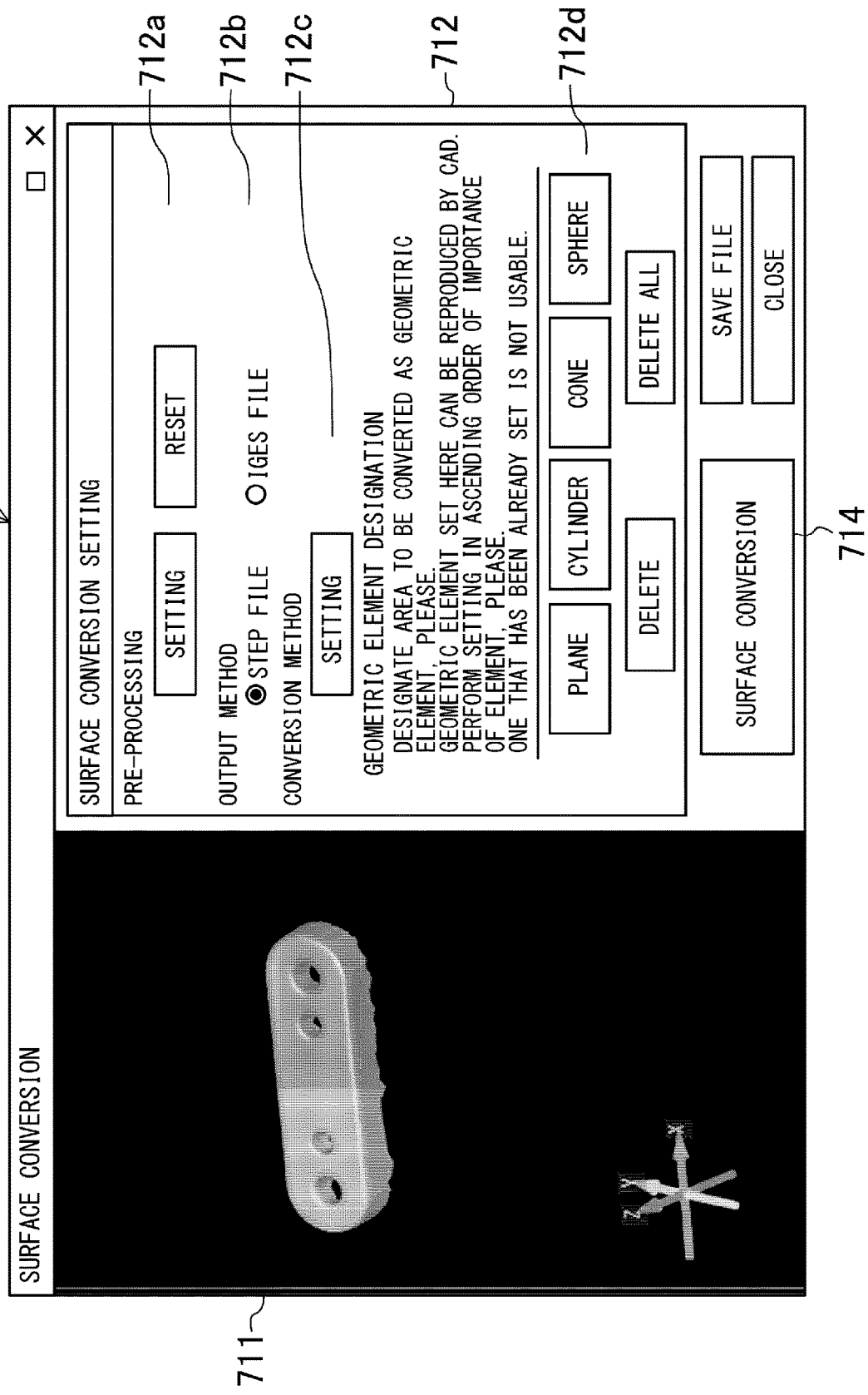
FIG. 14 is a view illustrating an example of a surface conversion user interface screen.

In Step SB4, the user selects a conversion mode. As the conversion mode, there are a full auto mode in which setting and adjustment operations by the user are unnecessary and a manual mode in which the user performs the setting and adjustment operations. In Step SB5, it is determined whether the mode selected by the user is the full auto mode or the manual mode. In the case of the manual mode, the flow proceeds to Step SB6, a surface conversion graphical user interface (GUI) is activated as illustrated in FIG. 14, and the conversion module 270 causes the display unit 400 to display a surface conversion user interface screen 710. The surface conversion GUI can also be referred to as a GUI for conversion into CAD data.

The surface conversion user interface screen 710 is provided with an image display area 711 for displaying an image of the workpiece W and a detailed setting area 712. The detailed setting area 712 is provided with a pre-processing setting area 712a for setting processing to be performed before surface conversion, an output format selection area 712b, and a conversion method setting area 712c. In the output format selection area 712b, either a STEP file or an IGES file can be selected. Note that the selectable output formats are not limited thereto, and a CAD native format, a Parasolid format, and the like may also be provided as selectable options.

In Step SB7, it is determined whether or not to perform, for example, filling processing or the like on the mesh data before the mesh data is subjected to the surface conversion (conversion into CAD data). Here, examples of pre-processing include the filling processing, unnecessary portion removal processing, healing processing, remeshing processing, and the like. In the filling processing, open edges (edges having no adjacent polygon) are specified on the mesh data, a loop including continuous open edges is specified, and then, new mesh data is created in the loop to correct the loop. Specifically, in a case where the mesh data received by the data input unit 271 includes a loop in which no polygon exists, the correction unit 275 of the conversion module 270 creates new mesh data in the loop to correct the loop. In short, the inside of the loop is filled with a polygon to generate data having no hole in Step SB7. As a result, the mesh data closed by completely filling the hole can be converted to CAD data, so that the converted data can also be solid data. Further, the remeshing processing is processing of bringing a triangle of the mesh close to an equilateral triangle.

In a case where the pre-processing is executed on the mesh data, the flow proceeds to Step SB8, and the user executes the pre-processing. This processing is automatic processing, and thus, only needs to be performed at an appropriate timing in the reverse engineering process.

Figure 15:
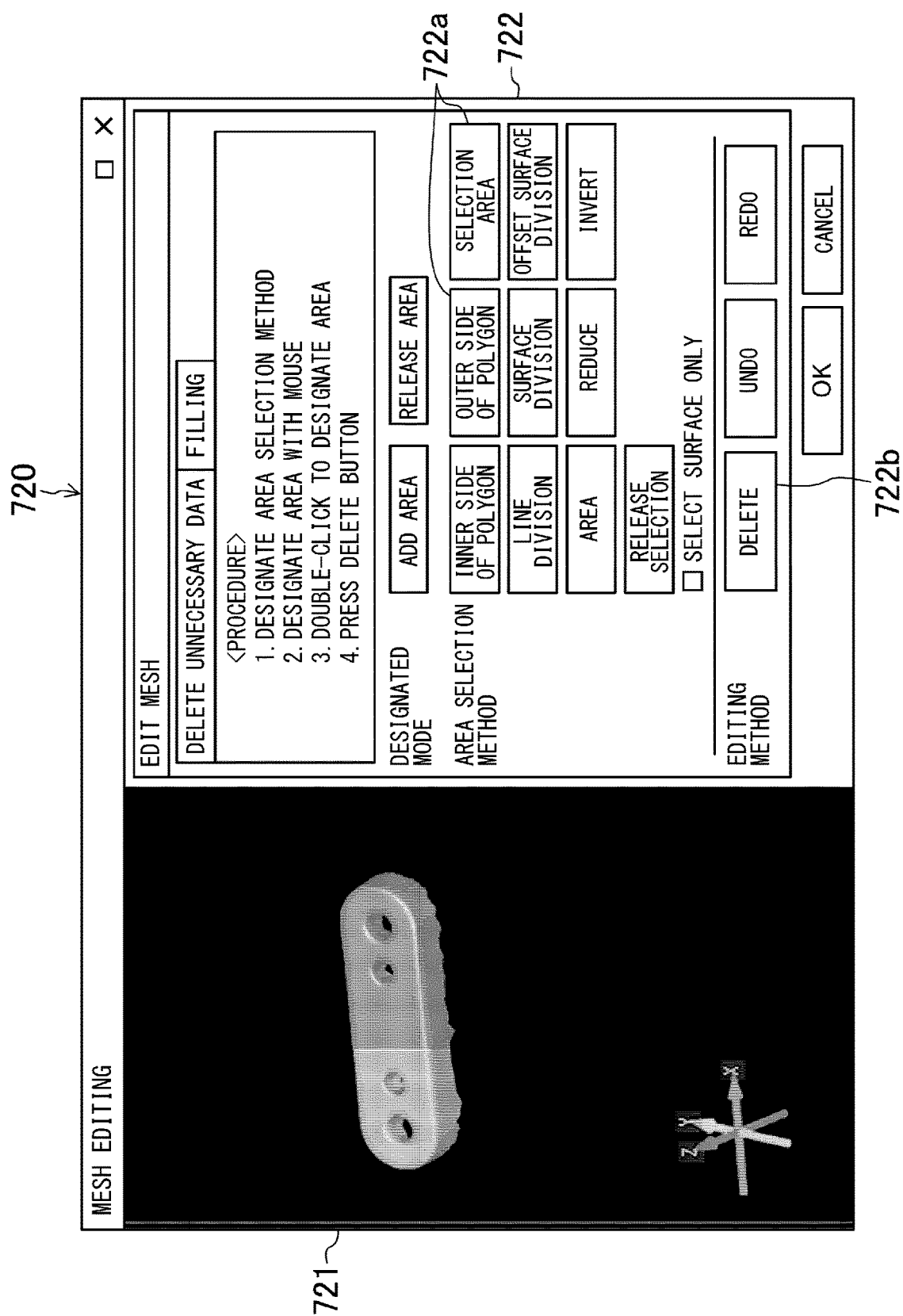
FIG. 15 is a view illustrating an example of a mesh editing user interface screen.

In Step SB8, the conversion module 270 generates a mesh editing user interface screen 720 as illustrated in FIG. 15 and displays the same on the display unit 400. The mesh editing user interface screen 720 is provided with an image display area 721 in which an image based on the mesh data is displayed, and an operation area 722. The operation area 722 is provided with a selection operation button 722a for selecting a part of the mesh data displayed in the image display area 721, a delete button 722b for deleting a selected area, and the like. The user operates the selection operation button 722a and the delete button 722b to execute the filling processing, the unnecessary portion removal processing, the healing processing, the remeshing processing, and the like.

In Step SB9, it is determined whether or not to execute designation of a surface area. The flow proceeds to Step SB10 if YES, and the flow proceeds to Step SB11 if NO. Further, the flow also proceeds to Step SB11 when it is determined in Step SB7 that the pre-processing of the mesh is not performed.

After the designation of the surface area (conversion area to CAD data) has been executed in Step SB10, it is determined in Step SB12 whether the designation of the surface area has been completed. The flow returns to Step SB10 in a case where the designation of the surface area has not been completed, or proceeds to Step SB13 in a case where the designation of the surface area has been completed.

In Step SB14, it is determined whether the magnification of the light receiving unit 120 is a low magnification or a high magnification. In the case of the low magnification, the flow proceeds to Step SB15 to select a low-magnification parameter, a low-magnification algorithm, and a low-magnification processing flow. In the case of the high magnification, the flow proceeds to Step SB16 to select a high-magnification parameter, a high-magnification algorithm, and a high-magnification processing flow. Steps SB14 to SB16 are steps executed by the processing parameter determination unit 272. Through Steps SB14 to SB16, it is possible to determine processing parameters at the time of converting the mesh data into the CAD data according to the additional data received in Step SA19.

For example, there is a case where one polygon side length is different by three times between the low magnification and the high magnification. In this case, it is possible to set a condition according to the magnification, such as using a parameter set in which a periphery search condition from each vertex of the polygon is set to ⅓. Further, there is also a possibility that unique noise may be generated according to a magnification depending on a model of the measurement unit 100, and in this case, smoothing strength may be changed according to the magnification as one of the processing parameters.

The resolution selected in Step SA8 illustrated in FIG. 8 can be associated with a smoothing kernel size as one of the processing parameters. The number of times of multiple-exposure shooting selected in Step SA8 can be associated with smoothing strength as one of the processing parameters. The presence or absence of the color selected in Step SA9 can be associated with a CAD surface color determination process based on surface color information as one of the processing parameters. The measurement range selected in Step SA9 can be associated with a thinning processing strength as one of the processing parameters. These processing parameters differ between the low magnification and the high magnification, and are automatically set to appropriate processing parameters through Steps SB14 to SB16.

It is possible to determine a noise shape that does not originally exist on the surface of the workpiece W by referring to the luminance of each of vertexes from the raw data and reliability parameters associated with shape information (polygon vertexes). It is possible to perform conversion into CAD data closer to a real object of the workpiece W by ignoring the noise shape from the conversion area and performing curved surface estimation from a peripheral shape.

The measurement conditions at the time of measuring a shape of the workpiece W include the above-described magnification, field of view (single field of view or wide field of view), exposure conditions (exposure time, gain, and illumination brightness), resolution setting (low-resolution measurement, standard measurement, or high-resolution measurement), the presence or absence of the color, and the like.

In a case where the flow proceeds to Step SB17 through Step SB15, the surface conversion is executed by applying the low-magnification parameter, the low-magnification algorithm, and the low-magnification processing flow. In a case where the flow proceeds to Step SB17 through Step SB16, the surface conversion is executed by applying the high-magnification parameter, the high-magnification algorithm, and the high-magnification processing flow. That is, the CAD conversion unit 273 converts the mesh data into the CAD data according to the processing parameters determined by the processing parameter determination unit 272.

More specifically, the measurement conditions of the workpiece W are transferred from the scanner module 260 to the conversion module 270 together with the shape information of the workpiece W. The processing parameter determination unit 272 determines the processing parameters based on the parameter table as illustrated in FIG. 10. The parameter table is obtained by associating items of the additional data such as the measurement conditions with processing parameters corresponding to the respective items, and is stored in the storage apparatus 240. Therefore, the processing parameter determination unit 272 can determine the processing parameters based on an item of the additional data and the parameter table.

In this example, information on the resolution is assigned as the item of the additional data in the parameter table. Therefore, the information on the resolution is associated with the processing parameters corresponding to the resolution information in the parameter table.

For example, in the case of the magnification, spatial resolving power is determined according to an optical magnification of a lens and a pixel pitch of the imaging element 121*a*, and thus, resolving power of the shape information changes due to a change in the magnification. Therefore, for example, appropriate values of a radius of peripheral search for the curvature calculation and strength when a filter is applied are different in the computational process performed by the CAD conversion unit 273. When the respective processing parameters are tabulated for each of the measurement conditions in advance as illustrated in FIG. 10, the processing parameters to be applied in a CAD conversion algorithm can be automatically determined based on the magnification condition of the light receiving unit 120.

As another example, in the case of the field of view, there is a condition that sampling of measurement data may be rough based on the tendency of a size of the workpiece W to increase, and it is also possible to set a processing parameter so as to ignore a fine portion in a larger workpiece W by multiplying a setting of a part of processing parameters set at a constant magnification by a coefficient. In the example illustrated in FIG. 10, if the magnification is low and the field of view is wide, a micro-hole determination size=0.2 and a shape detection ratio=2.0 are given so that a total micro-hole determination size=0.2×2.0=0.4 can be set.

Meanwhile, independently of the determination of the processing parameters through Steps SB14 to SB16, it is also possible to determine a processing parameter at the time of conversion into CAD data using additional data (for example, reliability, a valid flag, color information, or the like), which is data is calculated from the image data of the workpiece W and is attached to the shape information, when the CAD conversion unit 273 performs the conversion into the CAD data. Specifically, it is also possible to apply a certain rule at the time of conversion into the CAD data based on the data calculated from the image data of the workpiece W by adopting the reliability as the data constituting the CAD data only when the reliability is equal to or more than a predetermined value or adopting the valid flag as the data constituting the CAD data only when the valid flag is a predetermined value. In the reverse engineering system 1, the CAD conversion unit 273 can grasp not only the shape information of the workpiece W but also information individually imparted to the polygon and vertexes included in the mesh data based on a predetermined rule. An example of a data structure of data sets is illustrated in FIG. 11.

For example, in a case where there is an array setting table in which a rule that vertex information, normal information, and reliability are assigned as Data 1, Data 2, and Data 3, respectively, is defined, the data structure as illustrated in FIG. 11 can be reproduced by interpreting the data sets based on the same. This array setting table is stored in the storage apparatus 240. An array setting table includes a measurement condition as additional data (the first additional data) assigned to mesh data and vertex information constituting the mesh data, and further includes additional data (the second additional data) assigned for each piece of the vertex information. The second additional data includes the reliability, the valid flag, texture information, and the like of each vertex. In the array setting table, an array of the first additional data, the vertex information, and the second additional data is defined.

The scanner output unit 264 can specify an array of the vertex information constituting the mesh data, the first additional data, and the second additional data based on the array setting table illustrated in FIG. 11. The scanner output unit 264 outputs a data set in which the vertex information constituting the mesh data and the first additional data and the second additional data are arrayed to the conversion module 270 according to the specified array.

The data input unit 271 receives an input of the data set output from the scanner output unit 264, and the processing parameter determination unit 272 specifies the vertex information constituting the mesh data, the first additional data, and the second additional data from the data set received by the data input unit 271 based on the array setting table illustrated in FIG. 11. The processing parameter determination unit 272 determines processing parameters for converting the mesh data into CAD data based on the first additional data specified based on the array setting table stored in the storage apparatus 240. That is, the same rule can be shared between the scanner module 260 and the conversion module 270 by storing the array setting table, and thus, the additional data output from the scanner module 260 can be interpreted by the conversion module 270. Further, since the processing parameters at the time of converting the mesh data into the CAD data are determined based on the first additional data, the parameters to be applied to the entire mesh data can be determined in advance, and processing time can be shortened.

Further, the processing parameter determination unit 272 can also determine whether or not to use each piece of the vertex information constituting the mesh data for the conversion into the CAD data based on the second additional data specified based on the array setting table stored in the storage apparatus 240. That is, in a case where the second additional data includes the reliability of each of the vertexes, whether or not to use each piece of the vertex information for the conversion into the CAD data can be determined based on the reliability. For example, the vertex information can be prevented from being used for the conversion into the CAD data when the reliability is equal to or less than a predetermined value.

In an array setting table illustrated in FIG. 11, the second additional data may be data assigned for each piece of polygon information. In this case, the array setting table defines an array of the first additional data, the polygon information, and the second additional data assigned to each piece of the polygon information. The scanner output unit 264 specifies an array of the polygon information, the first additional data, and the second additional data based on the array setting table, and outputs a data set in which the polygon information, the first additional data, and the second additional data are arrayed according to the specified array to the conversion module 270. The data input unit 271 receives an input of the data set in which the array of the polygon information and the first additional data and the second additional data has been specified. Then, the processing parameter determination unit 272 specifies the polygon information, the first additional data, and the second additional data from the data set received by the data input unit 271 based on the array setting table, and determines processing parameters at the time of converting the mesh data into the CAD data based on the specified first additional data. In this case as well, whether or not to use each piece of the polygon information constituting the mesh data for the conversion into the CAD data may be determined based on the specified second additional data.

More specifically, as illustrated in FIG. 11, processing can be changed for each shape portion based on information regarding the reliability attached to the shape information by, for example, "determining a weight at the time of processing of each of the vertexes and polygon based on a value of Reliability r1 (including the case of Reliability=Weight)", or "using only a polygon with Valid Flag f1 being 1 for processing". At this time, a reliability-weight setting table or the like is held in advance. Further, when array setting tables of supplementary information are held in advance according to models of the measurement unit 100, the supplementary information can be grasped by the CAD conversion unit 273 even in a case where a data format is different for each of the models, and the conversion into the CAD data is appropriately performed.

As illustrated in FIG. 12, the measurement data may include a condition header including a measurement mode, a measurement range, a measurement model ID, a probe type (in a case where the workpiece W has been measured by a probe), and the like.

Figure 16:
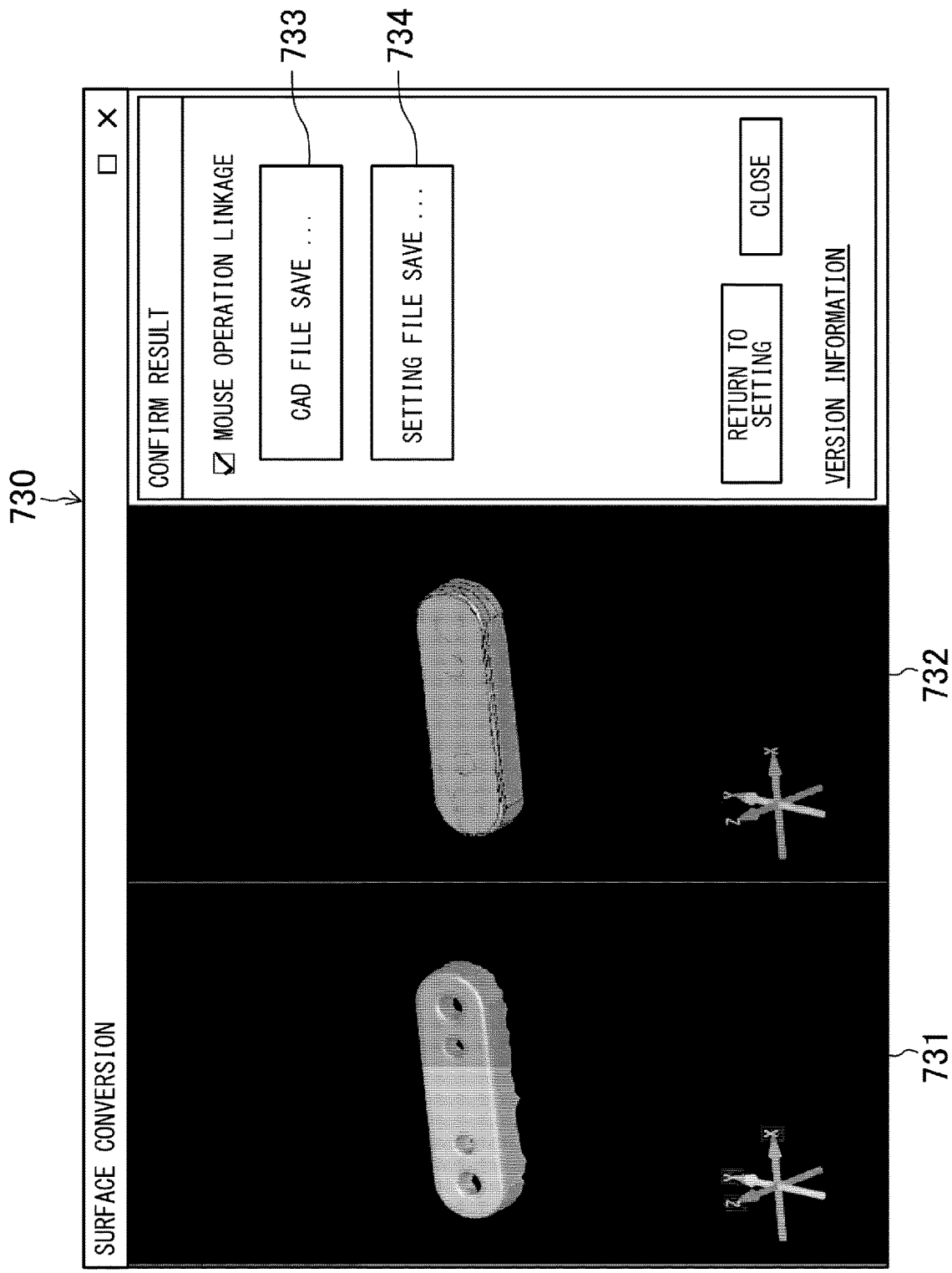
FIG. 16 is a view illustrating an example of a result display user interface screen.

In Step SB18, the conversion module 270 generates a result display user interface screen 730 as illustrated in FIG. 16 and displays the same on the display unit 400. The result display user interface screen 730 is provided with a mesh data display area 731 in which an image of the workpiece W based on the mesh data is displayed, and a converted image display area 732 in which an image of the workpiece W after the surface conversion is displayed. The mesh data display area 731 and the converted image display area 732 are simultaneously displayed on the display unit 400 and are disposed side by side. As a result, the user can easily compare the image before the surface conversion and the image after the surface conversion.

In Step SB19, it is determined whether or not the surface conversion has been completed. In a case where the surface conversion has not been completed, the flow returns to Step SB6 to activate the surface conversion GUI again. In a case where the surface conversion has been completed, the flow proceeds to Step SB20 to execute surface conversion end processing. In Step SB21, the CAD output unit 274 outputs the CAD data converted by the CAD conversion unit 273, and the output CAD data is saved in the storage apparatus 240. The saving operation is executed by operating a CAD file save button 733 on the result display user interface screen 730 illustrated in FIG. 16. Further, when a setting file save button 734 on the result display user interface screen 730 is operated, a setting file is saved in the storage apparatus 240.

The output CAD data can be read into three-dimensional CAD software or the like and used for the reverse engineering. For example, it is possible to create a product based on the CAD data, create a mold for molding a product, and the like.

(Synthesis of Mesh Data)

The reverse engineering system 1 is configured to be capable of synthesizing a plurality of pieces of mesh data having different resolutions. Specifically, the mesh data creation unit 263 creates first mesh data based on measurement data acquired with a resolution being a first resolution and second mesh data based on measurement data acquired with a resolution being a second resolution higher than the first resolution. Thereafter, the mesh data creation unit 263 synthesizes the first mesh data having a relatively low resolution and the second mesh data having a relatively high resolution to create synthetic mesh data. A difference between the first resolution and the second resolution can be freely set.

The processing parameter determination unit 272 specifies the first mesh data created based on the measurement data acquired at the first resolution being a relatively low resolution from the synthetic mesh data created by the mesh data creation unit 263, and determines processing parameters at the time of converting the specified first mesh data into CAD data based on the parameter table as illustrated in FIG. 10.

Further, the processing parameter determination unit 272 specifies the second mesh data created based on the measurement data acquired at the second resolution being a relatively high resolution from the synthetic mesh data created by the mesh data creation unit 263, and determines processing parameters at the time of converting the specified second mesh data into CAD data based on the parameter table as illustrated in FIG. 10.

Thereafter, the CAD conversion unit 273 converts the synthetic mesh data into CAD data by applying the processing parameters determined by the processing parameter determination unit 272 to each piece of the first mesh data and the second mesh data created by the mesh data creation unit 263. Then, the CAD output unit 274 outputs the CAD data converted by the CAD conversion unit 273.

The mesh data creation unit 263 is configured to be capable of creating, as the second additional data, the synthetic mesh data assigned with resolution information indicating any resolution of the first resolution or the second resolution with which the measurement data, used as the basis of each piece of the vertex information or the polygon information, has been acquired. That is, there are a case where the resolution used when each piece of the vertex information or the polygon information has been acquired is the first resolution that is relatively low, and a case where the resolution is the second resolution that is relatively high. When the first resolution and the second resolution are present, it is necessary to make it possible to determine which resolution has been used to acquire the measurement data used as the basis of each piece of the vertex information or the polygon information, and in this case, it is possible to easily make the determination by creating the synthetic mesh data assigned with the resolution information.

(Details of Each Module)

Figure 17:
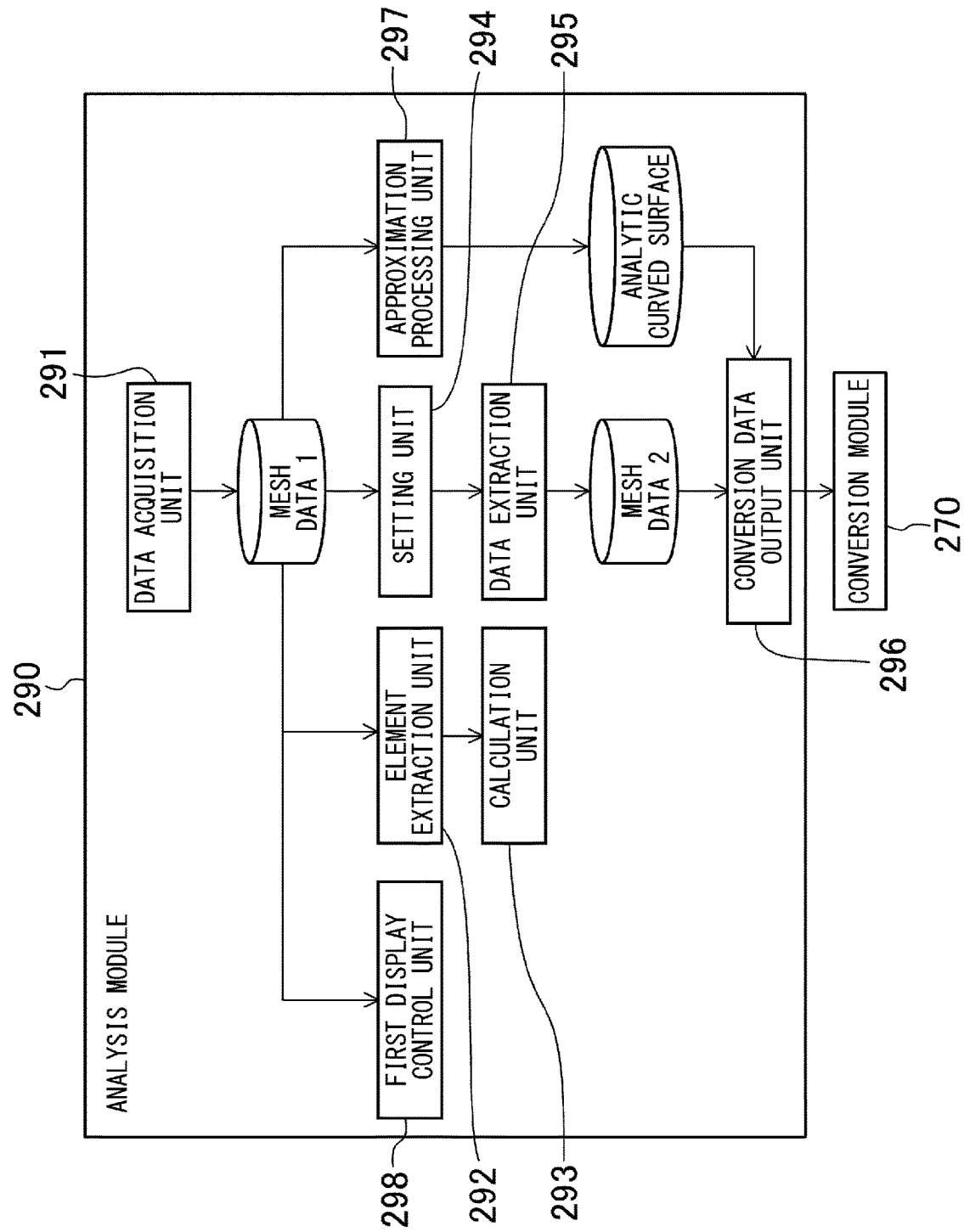
FIG. 17 is a block diagram illustrating details of an analysis module.

FIG. 17 is a block diagram illustrating details of the analysis module 290. The data acquisition unit 291 acquires mesh data created by the mesh data creation unit 263 (illustrated in FIG. 5) of the scanner module 260. This will be referred to as Mesh Data 1. Mesh Data 1 is input to the element extraction unit 292, the setting unit 294, and the approximation processing unit 297, and is also input to a first display control unit 198.

The element extraction unit 292 extracts a plurality of geometric elements such as circles and planes from Mesh Data 1. The calculation unit 293 calculates dimensions using the plurality of geometric elements extracted by the element extraction unit 292. The setting unit 294 can set an area (conversion area) to be desirably converted into CAD data from Mesh Data 1. The data extraction unit 295 extracts Mesh Data 2, which has been partially cut out, based on the conversion area set by the setting unit 294. Mesh Data 2 is data adapted to the conversion area, and has a smaller data capacity than Mesh Data 1. Mesh Data 2 is input to the conversion data output unit 296. Mesh Data 2 that has been input to the conversion data output unit 296 is output to the conversion module 270. That is, as Mesh Data 2 adapted to the conversion area corresponding to a portion of the workpiece W is output to the conversion module 270, only partial data necessary for conversion into CAD data is delivered to the conversion module 270, and the data capacity is reduced, and as a result, time for the conversion to the CAD data can be shortened.

Regarding a shape that does not require a strict shape at the time of conversion into CAD data, analytic curved surfaces (for example, a plane, a cylinder, a free curved surface, and the like) approximated by the approximation processing unit 297 of the analysis module 290 can be created. A set of the created analytic curved surfaces is output from the conversion data output unit 296 to the conversion module 270.

The approximation processing unit 297 is configured to be capable of receiving designation of an approximation area to be approximated by a geometric element and a geometric element approximating the approximation area. The approximation processing unit 297 approximates mesh data included in the received approximation area with the designated geometric element.

When receiving the mesh data and analytic curved surface data from the analysis module 290, the conversion module 270 executes conversion processing into CAD data. The processing of the analysis module 290 can be continued even while the conversion module 270 is executing conversion processing into high-load CAD data. Further, the analysis module 290 includes a first display control unit 298 configured to display the mesh data acquired by the data acquisition unit 291 on the display unit 400.

Figure 18:
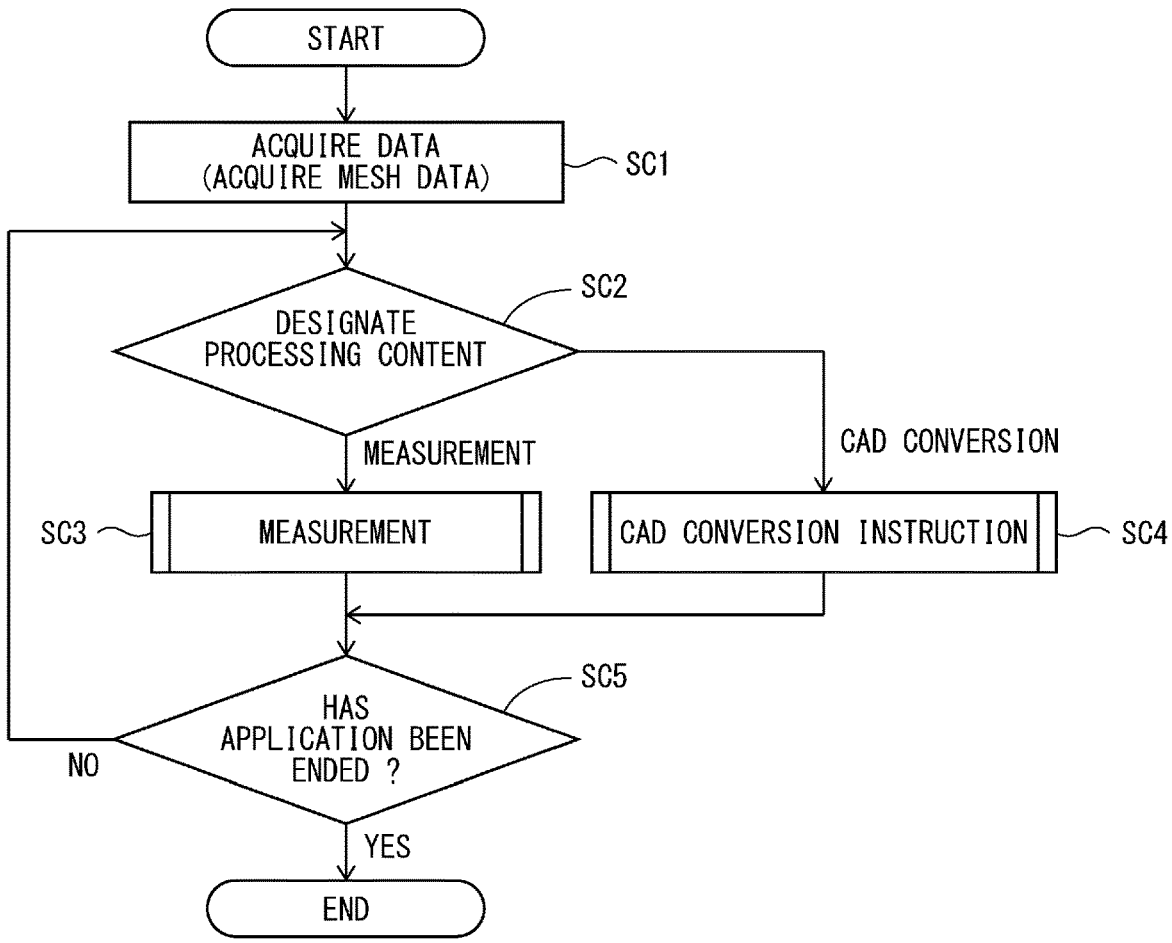
FIG. 18 is a flowchart illustrating an example of a processing procedure of the analysis module.

FIG. 18 is a flowchart illustrating a processing procedure of the analysis module 290. In Step SC1 after the start, Mesh Data 1 (illustrated in FIG. 17) is acquired. In Step SC2, the user designates a processing content (for example, measurement processing, CAD conversion processing, or the like). In a case where the measurement processing has been designated, the flow proceeds to Step SC3 to execute the measurement processing. On the other hand, in a case where the CAD conversion processing has been designated, the flow proceeds to Step SC4 to execute the CAD conversion processing. In Step SC5, it is determined whether or not an analysis application has been ended. This processing is ended in a case where the analysis application has been ended, or returns to Step SC2 in a case where the analysis application has not been ended. Since the conversion processing to the CAD data in Step SC4 is processing of generating an analytic curved surface from the mesh data, processing time is often much longer than that in the measurement processing in Step SC3. After issuing the CAD data conversion instruction, the analysis module 290 can execute the measurement processing or instruct another CAD data conversion without waiting for completion of the conversion processing to the CAD data.

Figure 19:
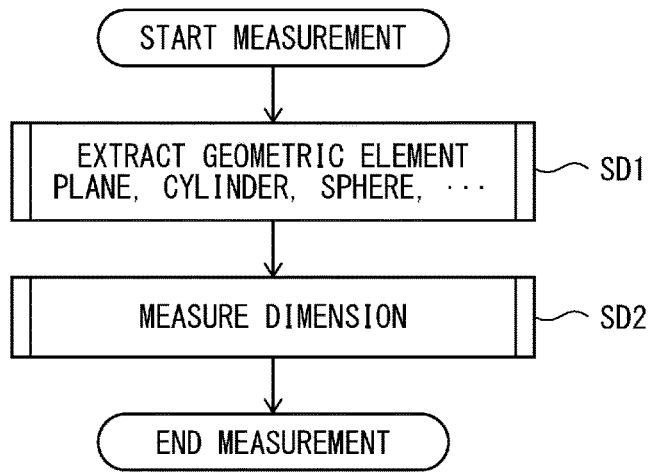
FIG. 19 is a flowchart illustrating an example of a measurement processing procedure.

FIG. 19 is a flowchart illustrating an example of a measurement processing procedure. When the measurement is started in Step SC3 of FIG. 18, the flow proceeds to Step SD1 of FIG. 19, and the element extraction unit 292 illustrated in FIG. 17 extracts a plurality of geometric elements (for example, a plane, a cylinder, a sphere, and the like) from mesh data. Thereafter, the flow proceeds to Step SD2, and the calculation unit 293 illustrated in FIG. 17 calculates dimensions between the plurality of geometric elements extracted in Step SD1. For example, a distance between a plane and a plane can be calculated in a case where the geometric elements are the two planes, and an angle between a normal of a plane and an axis of a cylinder can be calculated in a case where the geometric elements are the plane and the cylinder.

An example of a geometric element extraction processing procedure in Step SD1 of FIG. 19 will be described with reference to a flowchart illustrated in FIG. 20. In Step SE1 after the start, the selection of types of geometric elements is received. In Step SE2, mesh data is selected. In Step SE3, it is determined whether or not a confirm button has been pressed. The flow proceeds to Step SE2 if the confirm button has not been pressed, or proceeds to Step SE4 to determine an error if the confirm button has been pressed. If it is determined in Step SE4 that there is an error, the flow proceeds to Step SE2. If there is no error, the geometric element extraction processing ends.

Figure 20:
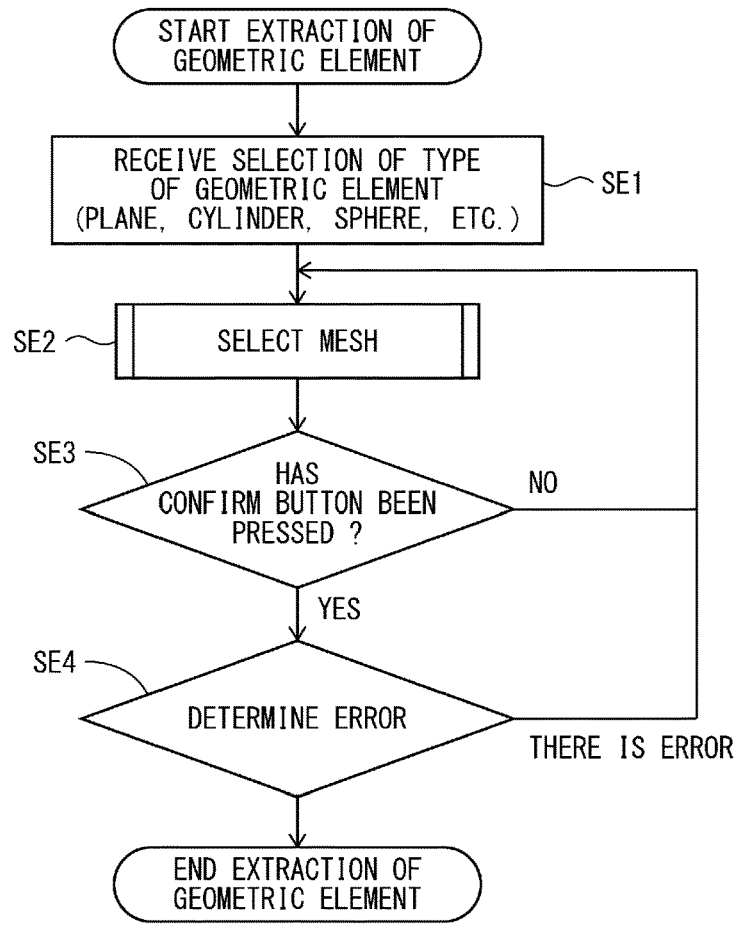
FIG. 20 is a flowchart illustrating an example of a geometric element extraction processing procedure.
Figure 21:
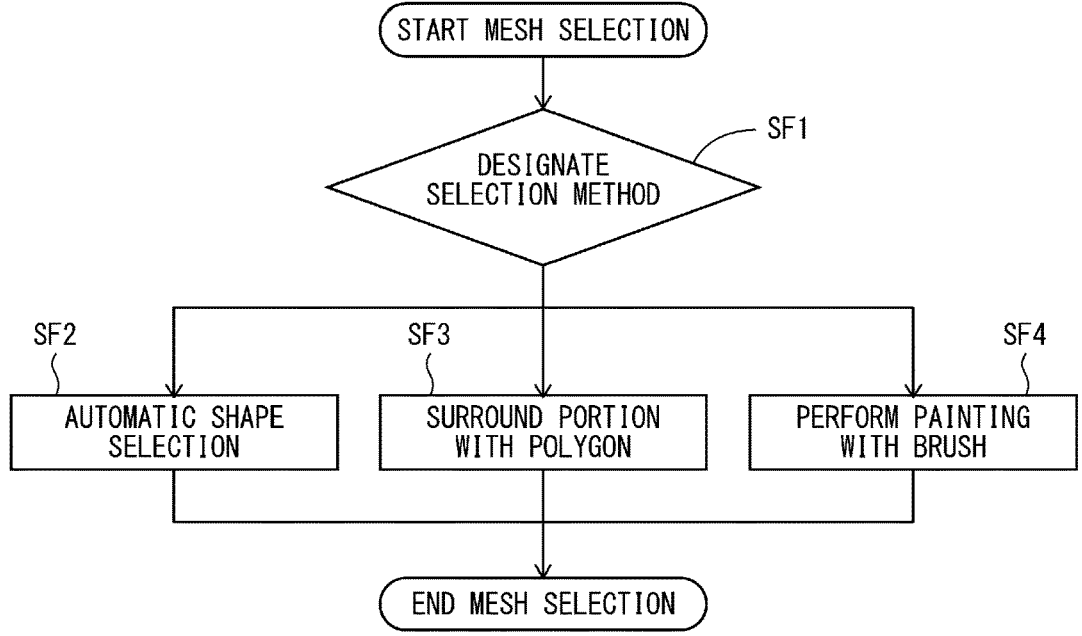
FIG. 21 is a flowchart illustrating an example of a mesh selection processing procedure.

FIG. 21 is a flowchart illustrating an example of a mesh selection processing procedure in Step SE2 of FIG. 20. In Step SF1 after the start, designation of a selection method is received, and a type of the designated selection method is determined. In a case where the type of the selection method is automatic shape selection, the flow proceeds to Step SF2, and a mesh is selected by automatic shape selection processing. For example, when the user double-clicks on a 3D display screen using the operation unit 250, a range followed by a geometric shape selected as an area type is automatically selected.

Further, in a case where the type of the selection method is selection by a method of surrounding a portion with a polygon, the flow proceeds to Step SF3, and a mesh is selected by processing of surrounding a portion with a polygon. For example, when the user designates a polygon by operating the operation unit 250 on the 3D display screen, an area of a portion surrounded by the polygon is selected.

Further, in a case where the type of the selection method is a process of painting with a brush, the flow proceeds to Step SF4, and a mesh is selected by the process of painting with the brush. For example, when the user moves a mouse while pressing a mouse button of the operation unit 250 on the 3D display screen, a locus of the movement is selected. Here, different thicknesses or shapes of the brush may be designated. Note that the types of the selection method are not limited to those described above.

Figure 22:
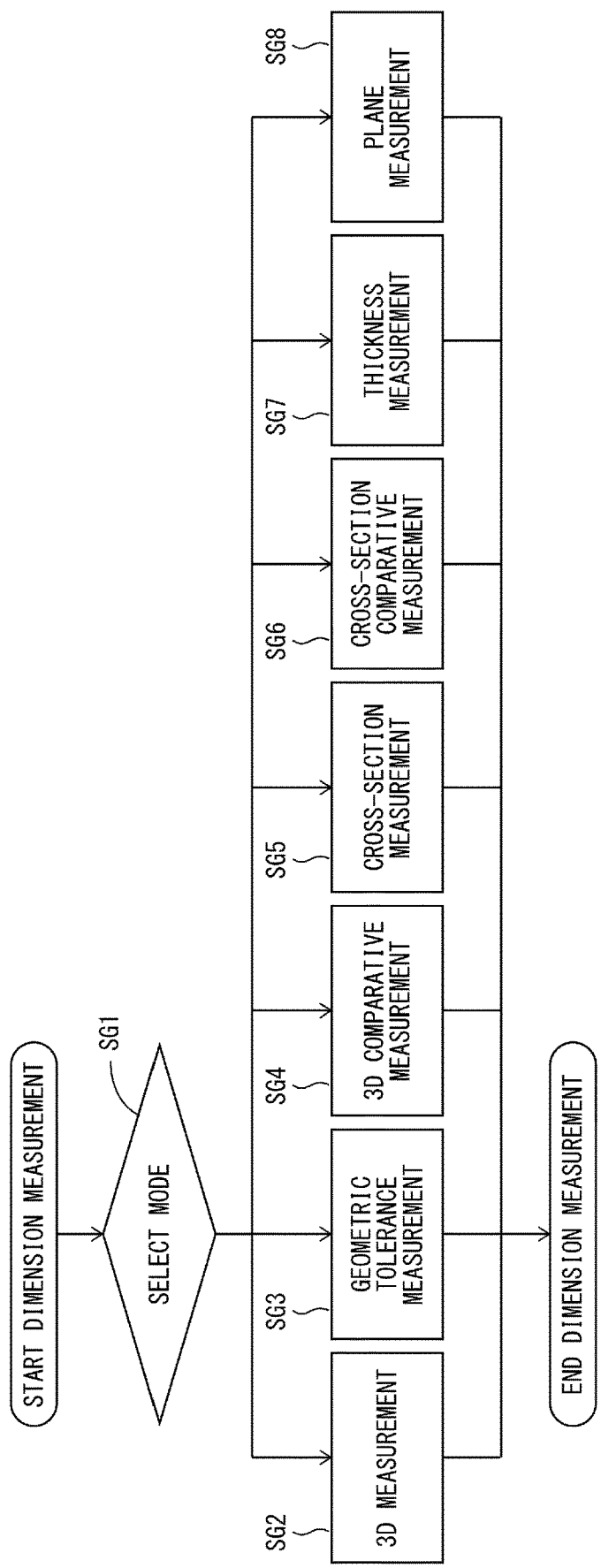
FIG. 22 is a flowchart illustrating an example of a dimension measurement processing procedure.

FIG. 22 is a flowchart illustrating an example of a dimension measurement processing procedure in Step SD2 of FIG. 19. In Step SG1 after the start, designation of a mode is received, and the designated mode is determined. The flow proceeds to Step SG2 in a 3D measurement mode, proceeds to Step SG3 in a geometric tolerance measurement mode, proceeds to Step SG4 in a 3D comparative measurement mode, proceeds to Step SG5 in a cross-section measurement mode, proceeds to Step SG6 in a cross-section comparative measurement mode, proceeds to Step SG7 in a thickness measurement mode, and proceeds to Step SG8 in a plane measurement mode. This is merely an example, and types of measurement modes are not limited to the above-described types.

Figure 23:
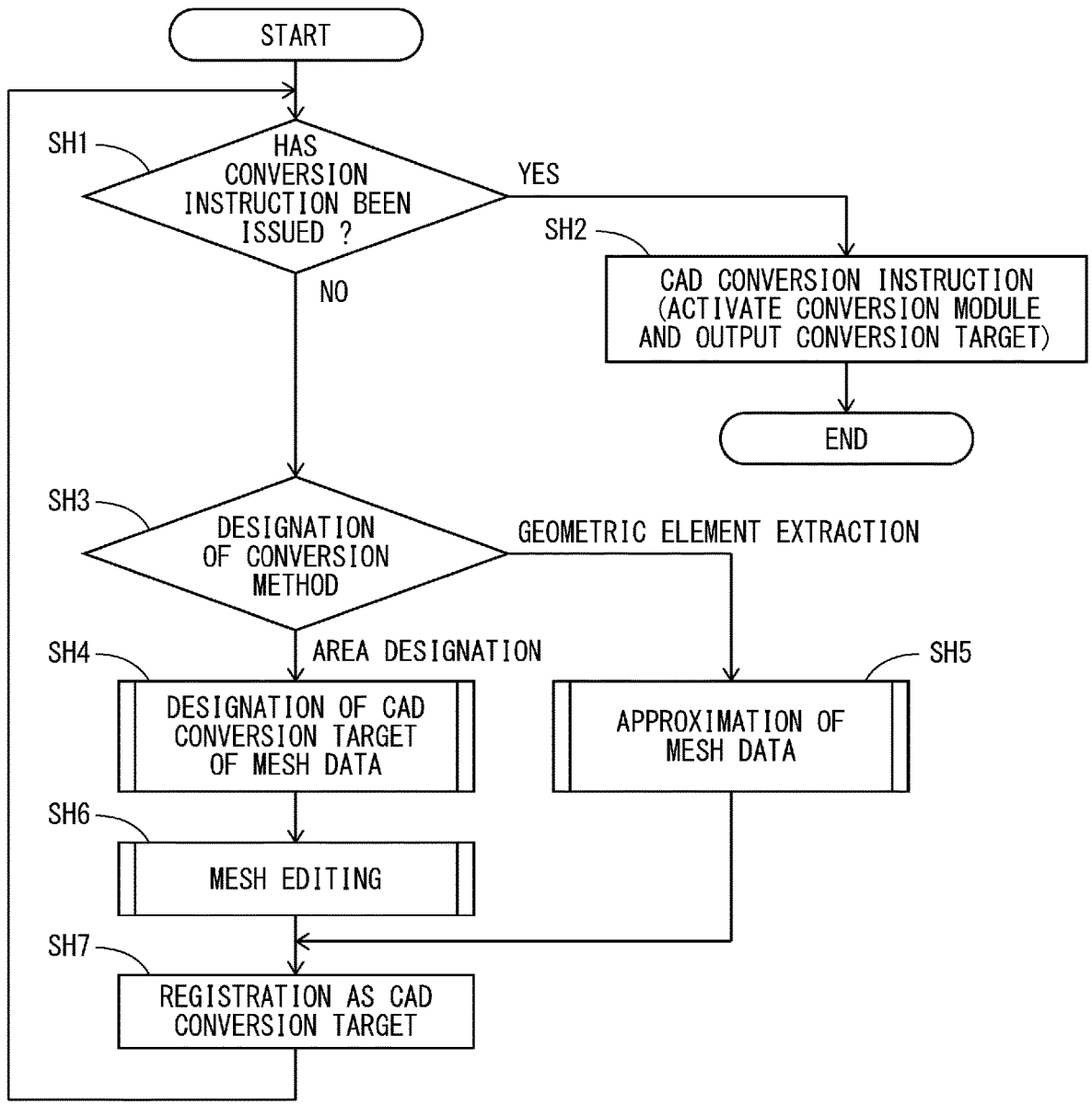
FIG. 23 is a flowchart illustrating an example of a CAD conversion instruction procedure.

FIG. 23 illustrates a CAD conversion instruction procedure by the analysis module 290. In Step SH1 after the start, it is determined whether or not a CAD conversion instruction has been issued. In a case where the CAD conversion instruction has been issued, the flow proceeds to Step SH2 to execute the CAD conversion. In a case where the CAD conversion instruction has not been issued, designation of a conversion method is received in Step SH3, and the designated conversion method is determined. In a case where area designation has been selected in Step SH3, that is, in a case where mesh data is converted into CAD data true to a shape, the flow proceeds to Step SH4, and designation of a CAD conversion target is received from the mesh data. In this case, the flow proceeds to Step SH6 to receive mesh editing. On the other hand, in a case where geometric element extraction has been selected in Step SH3, a geometric element is extracted from the mesh data. The geometric element extracted here is extracted by approximating a portion of the mesh data, and the geometric element extraction processing can also be referred to as approximation processing. In this case, the flow proceeds to Step SH5 to execute mesh data approximation processing. For example, the geometric element extraction processing in Step SD1 of FIG. 19 is executed, and the extracted geometric element is approximated to the corresponding geometric shape. Thereafter, registration as the CAD conversion target is performed in Step SH7. After Step SH7, the flow returns to Step SH1. Note that a plurality of conversion areas can also be registered.

Figure 24:
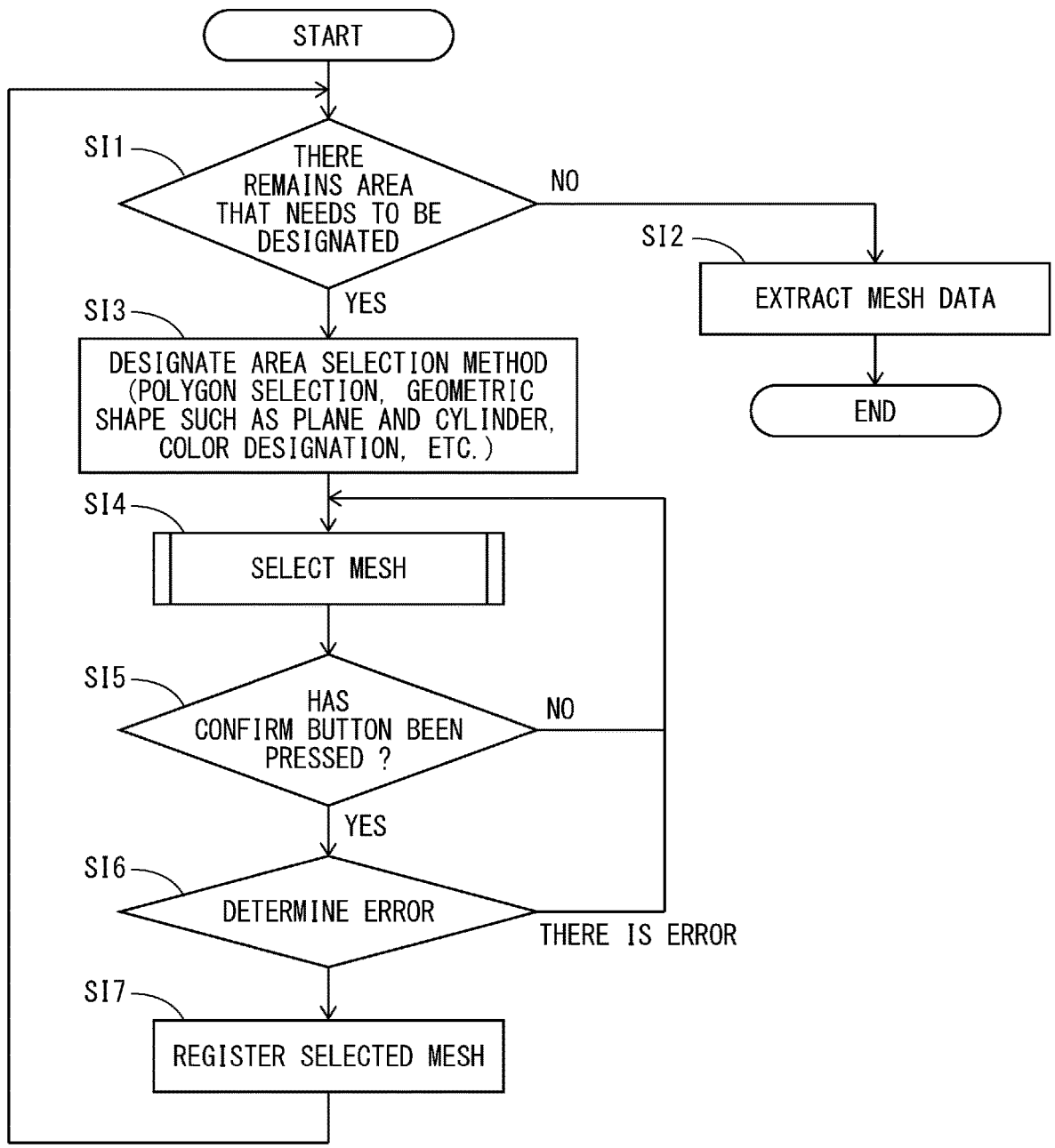
FIG. 24 is a flowchart illustrating an example of a CAD conversion target designation processing procedure.

FIG. 24 is a flowchart illustrating a procedure for designating the CAD conversion target in Step SH4 of FIG. 23. In Step SI1 after the start, for example, the conversion area designation user interface screen 700 as illustrated in FIG. 13 is displayed on the display unit 400, and the user determines whether or not a conversion area that needs to be designated remains in the mesh data based on the image displayed in the image display area 701. In a case where there is no remaining conversion area that needs to be designated, the flow proceeds to Step SI2, the mesh data extraction processing is executed, and then, this processing is ended. On the other hand, in a case where there remains a conversion area that needs to be designated, the flow proceeds to Step SI3, and designation of a selection method of the conversion area is received. The selection method may adopt any method, for example, the above-described polygon selection, a geometric shape such as a plane or a cylinder, color designation, and the like, and can be executed by operating the designate-all button 702a, the first area designation button 702b, the second area designation button 702c, the third area designation button 702d, and the like illustrated in FIG. 13. The selected conversion area is displayed in the image display area 701 in a state of being colored in a color different from that before selection, and thus, the user can easily grasp which area is designated as the conversion area.

At this time, a coordinate system for displaying the mesh data on the display unit 400 may be selected. That is, the setting unit 294 illustrated in FIG. 5 is configured to be capable of setting a coordinate system included in a display condition for displaying the mesh data on the display unit 400. The setting of the display condition at the time of displaying the mesh data on the display unit 400 is received by the setting unit 294 constituting a display condition setting unit. The display condition set by the setting unit 294 is stored in the storage apparatus 240. The first display control unit 298 can reproduce a display state set by the setting unit 294 to be displayed on the display unit 400 by specifying the coordinate system at the time of displaying mesh data on the display unit 400 for the mesh data newly acquired by the data acquisition unit 291 based on the display condition stored in the storage apparatus 240.

As an example of a display condition setting method, the conversion area designation user interface screen 700 is provided with a coordinate system selection area 703. The coordinate system selection area 703 is configured using, for example, a pull-down menu and the like, and enables the user to select one of an apparatus coordinate system, a coordinate system of a base or a coordinate system of a head constituting the workpiece W, a coordinate system of a minimum rectangular parallelepiped circumscribing the workpiece W (circumscribed minimum rectangular parallelepiped coordinate system), and the like. When the selected coordinate system is set by the setting unit 294, the first display control unit 298 assigns the set coordinate system to the mesh data as coordinates for display, and displays the mesh data on the display unit 400.

Figure 27:
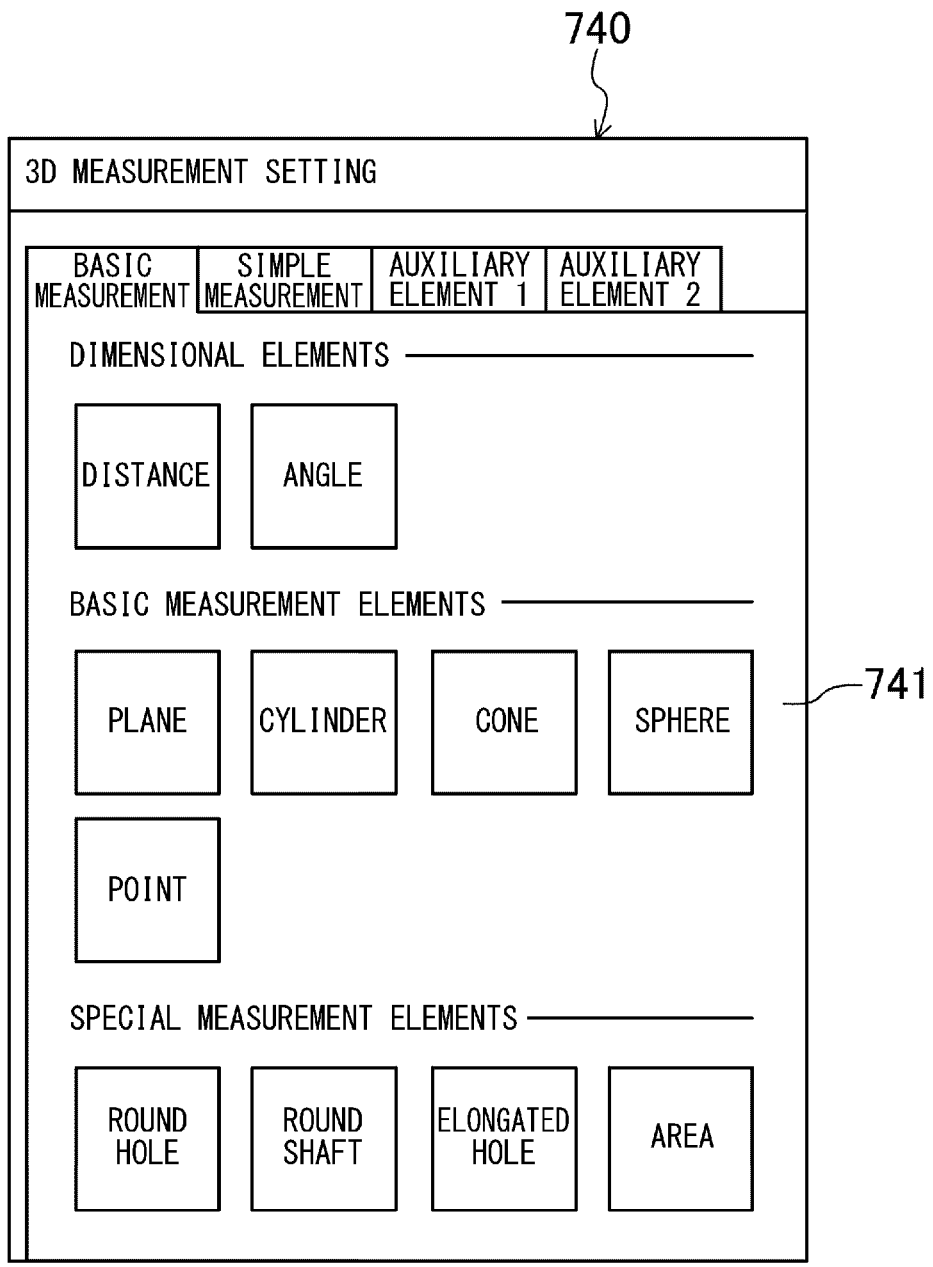
FIG. 27 is a view illustrating an example of an analytic curved surface creation user interface screen.

Further, the first display control unit 298 causes the display unit 400 to display a mesh data display area (for example, the image display area 701 illustrated in FIG. 13) for displaying the mesh data, a measurement setting area (an analytic curved surface creation user interface screen 740 illustrated in FIG. 27) for receiving designation of a shape of a geometric element extracted by the element extraction unit 292 and designation of a calculation method of a dimension calculated by the calculation unit 293, a conversion area designation area (an area where the buttons 702a to 702e illustrated in FIG. 13 are displayed) for receiving designation of a conversion area where CAD conversion set by the setting unit 294 is to be executed, and an output instruction icon (the output instruction button 704 illustrated in FIG. 13) for receiving an instruction to output the mesh data to the conversion module 270.

The conversion data output unit 296 creates an output file in which the mesh data is associated with the coordinate system set by the setting unit 294. The conversion data output unit 296 outputs the created output file to the conversion module 270.

The conversion module 270 includes a second display control unit 276 for causing the display unit 400 to display the mesh data whose input has been received by the data input unit 271. The data input unit 271 is configured to be capable of reading the output file output by the conversion data output unit 296. The second display control unit 276 is configured to reproduce a display state of the mesh data in the analysis module 290 on the display unit 400 by causing the display unit 400 to display the mesh data included in the output file based on the coordinate system included in the output file.

The second display control unit 276 can cause the display unit 400 to display a CAD conversion target data display area (for example, the image display area 711 illustrated in FIG. 14) for displaying the mesh data received by the data input unit 271 and a conversion instruction icon (a conversion instruction button 714 illustrated in FIG. 14) for receiving a conversion instruction to convert the mesh data displayed in the CAD conversion target data display area into CAD data.

When detecting that the output instruction button 704 illustrated in FIG. 13 has been operated, the second display control unit 276 generates a first conversion window (corresponding to the surface conversion user interface screen 710 illustrated in FIG. 14) including the CAD conversion target data display area and the conversion instruction icon, and displays the same on the display unit 400. When detecting that the output instruction button 704 has been operated, the second display control unit 276 displays a second conversion window including the CAD conversion target data display area and the conversion instruction icon on the display unit 400 in addition to the first conversion window. That is, when an output instruction of the analysis module 290 has been operated a plurality of times, the conversion module 270 is activated by the number of times.

The conversion data output unit 296 may be configured to convert coordinates of the mesh data based on the coordinate system set by the setting unit 294, and output the mesh data after the coordinate conversion to the conversion module 270. In this case, the data input unit 271 is configured to be capable of reading the mesh data after the coordinate conversion output by the conversion data output unit 296. The second display control unit 276 is configured to reproduce the display state of the mesh data in the analysis module on the display unit 400 by displaying the mesh data after the coordinate conversion on the display unit 400.

In a case where the mesh data is directly converted into CAD data, the mesh data of an area to be desirably converted can be selected by an operation of a mouse or the like. Further, the partially selected mesh data is data having a defect at a boundary of the selection area. Since the CAD data is desirably data having no defect, mesh editing (for example, filling, deletion, or healing) may be executed at this timing.

In Step SI4, mesh selection is performed by applying the selection method designated in Step SI3. In Step SI5, it is determined whether a confirm button has been pressed, and the flow proceeds to Step SI4 in a case where the confirm button has not been pressed, or proceeds to Step SIG in a case where the confirm button has not been pressed. In Step SIG, an error is determined. If it is determined in Step SI7 that there is an error, the flow proceeds to Step SI4. If there is no error, the selected mesh is registered. When this process ends and the user executes the conversion instruction, the conversion module 270 is activated, and CAD data conversion processing is started.

Figure 25:
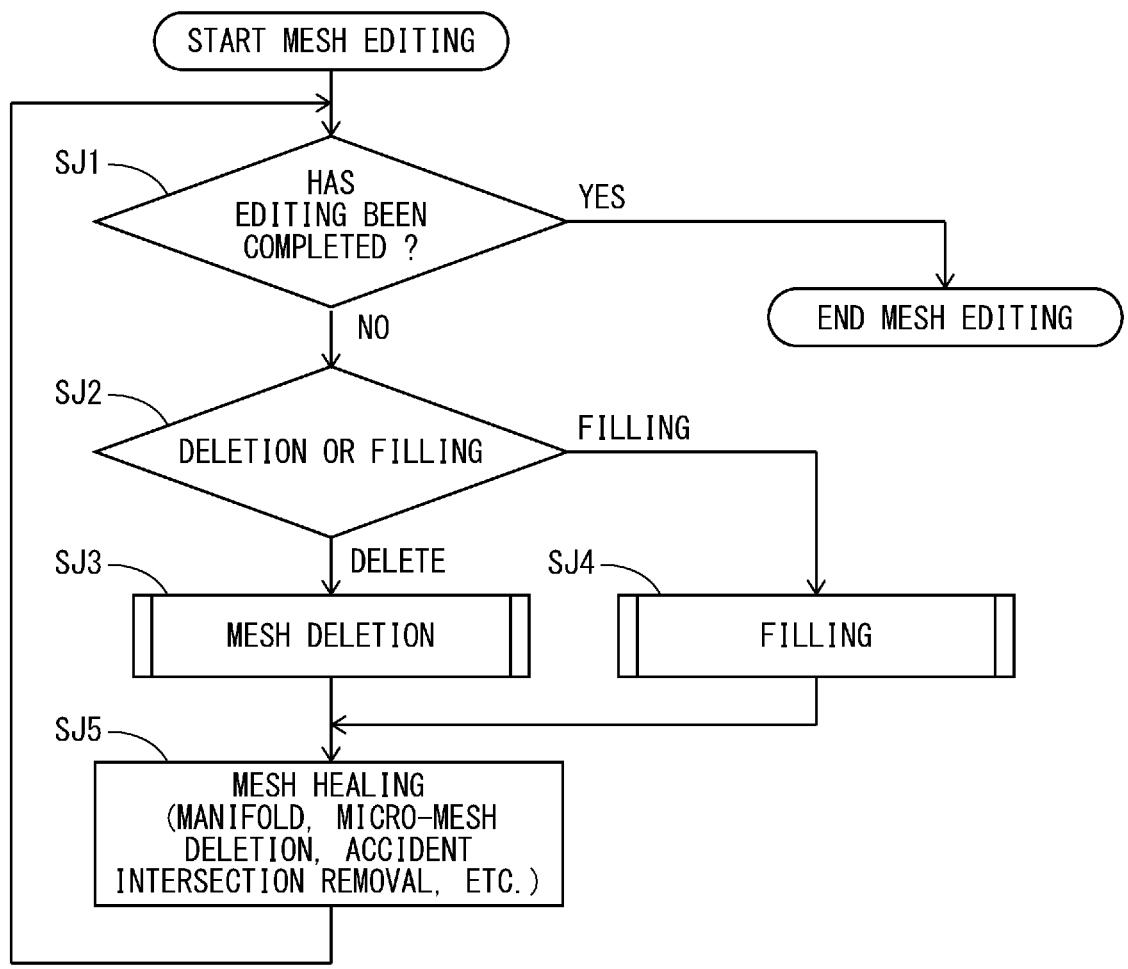
FIG. 25 is a flowchart illustrating an example of a mesh editing procedure.

FIG. 25 is a flowchart illustrating a mesh editing procedure. After the start, in Step SJ1, it is determined whether or not mesh editing has been completed. This process is ended in a case where the mesh editing has been completed, or proceeds to Step SJ2 in a case where the mesh editing has not been completed. In Step SJ2, designation of a type of mesh editing is received, and it is determined whether the type is deletion or filling. In the case of deletion, the flow proceeds to Step SJ3 to execute processing in which a desired mesh is selected by the operation unit 250 and deleted. In the case of filling, the flow proceeds to Step SJ4 to select an open edge missing in a mesh and perform filling processing. In Step SJ5, mesh healing is performed, and then, the flow returns to Step SJ1.

Mesh healing processing is processing automatically performed on the mesh data subjected to the mesh deletion in Step SJ3 or the filling processing in Step SJ4. If an invalid mesh is generated as a result of the mesh editing, a conversion error occurs in CAD data conversion, and thus, the healing processing is executed before the CAD data conversion. Specifically, the healing processing is a process of repairing the invalid mesh, such as removal of self-intersection, removal of a non-manifold mesh, and deletion of a minute mesh. The self-intersection refers to intersection in space between meshes having no connection relationship. The non-manifold mesh refers to a mesh in which three or more polygons share one edge. The minute mesh refers to, for example, one in which the total number of meshes of polygon data having a connection relationship is small (for example, 100 polygons or less).

Figure 26:
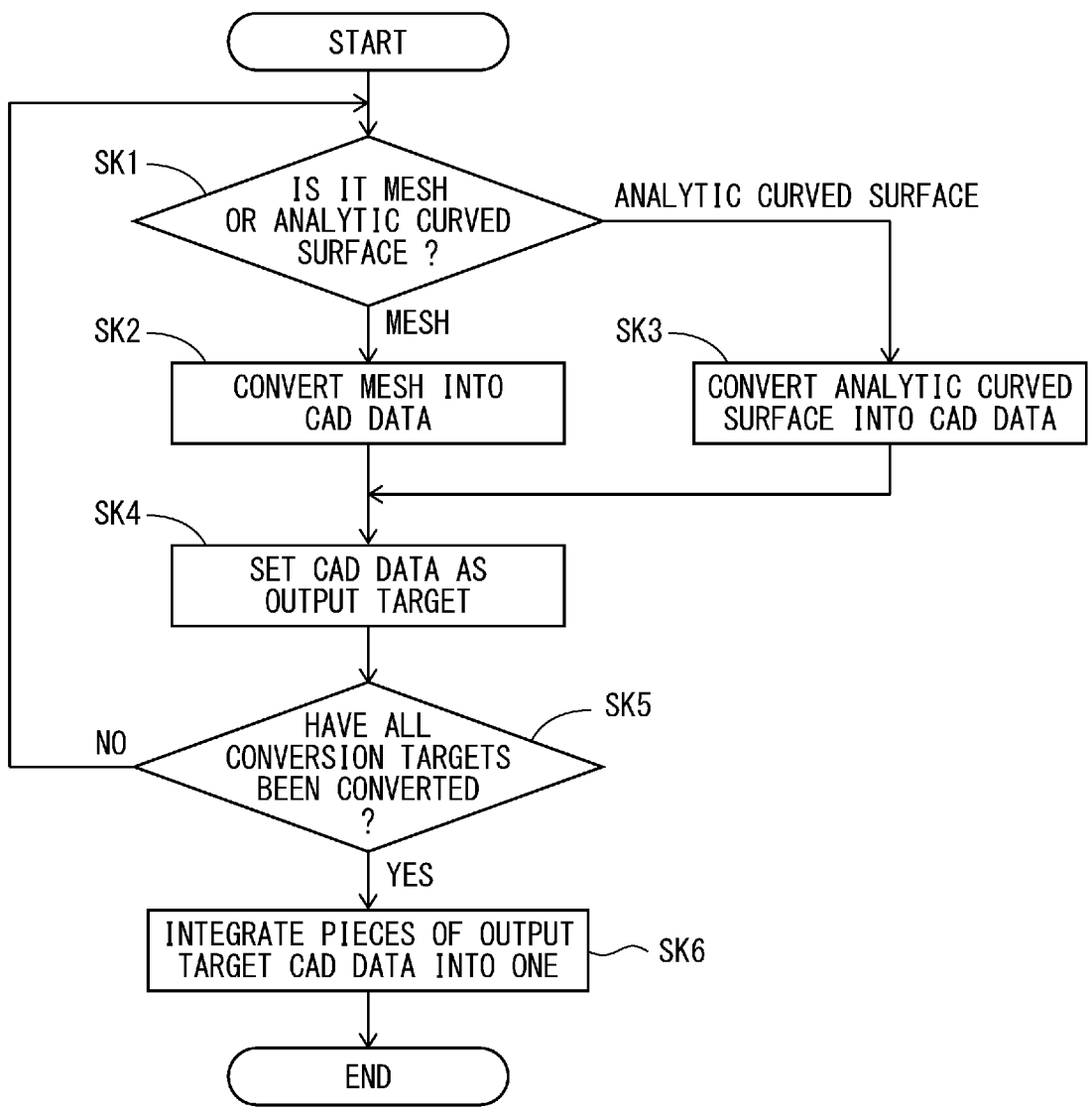
FIG. 26 is a flowchart illustrating an example of a procedure of conversion processing into CAD data.

FIG. 26 is a flowchart illustrating a procedure of conversion processing into CAD data. In Step SK1 after the start, it is determined whether a conversion target is mesh data or an analytic curved surface. In the case of the mesh data, the flow proceeds to Step SK2, and the CAD conversion unit 273 converts the mesh data of a conversion area set by the setting unit 294 into CAD data as surface data of a free curved surface. In the case of the analytic curved surface, the flow proceeds to Step SK3, and the CAD conversion unit 273 converts the analytic curved surface into a data format, such as a plane, a cylinder, or a curved surface, that can be handled by CAD software. That is, the CAD conversion unit 273 can convert mesh data included in the geometric element extracted in Step SH5 of FIG. 23 into CAD data as surface data of the analytic curved surface.

In Step SK4, the CAD data converted in Step SK2 and the CAD data converted in Step SK3 are set as output targets. In Step SK5, it is determined whether or not all conversion targets have been converted, and the flow returns to Step SK1 in a case where there remains a conversion target, or proceeds to Step SK6 in a case where there is no remaining conversion target. In Step SK6, in a case where there are a plurality of output targets set in Step SK4, a plurality of pieces of CAD data are integrated into one.

There are two types of data formats to be combined in Step SK6: a part file and an assembly file. The part file is a file in which all models are treated as one rigid body. The assembly file is a file in which all models are treated as separate models. In the assembly file, individual models can be moved separately on CAD software.

Details of a case in which an analytic curved surface is created will be described in detail. The analysis module 290 generates the analytic curved surface creation user interface screen 740 illustrated in FIG. 27 and displays the same on the display unit 400. The analytic curved surface creation user interface screen 740 is provided with an element display area 741 in which selectable basic measurement elements are displayed. Examples of the basic measurement elements include a plane, a cylinder, a cone, a sphere, a point, and the like. Selectable special measurement elements can also be displayed on the analytic curved surface creation user interface screen 740.

Figure 28:
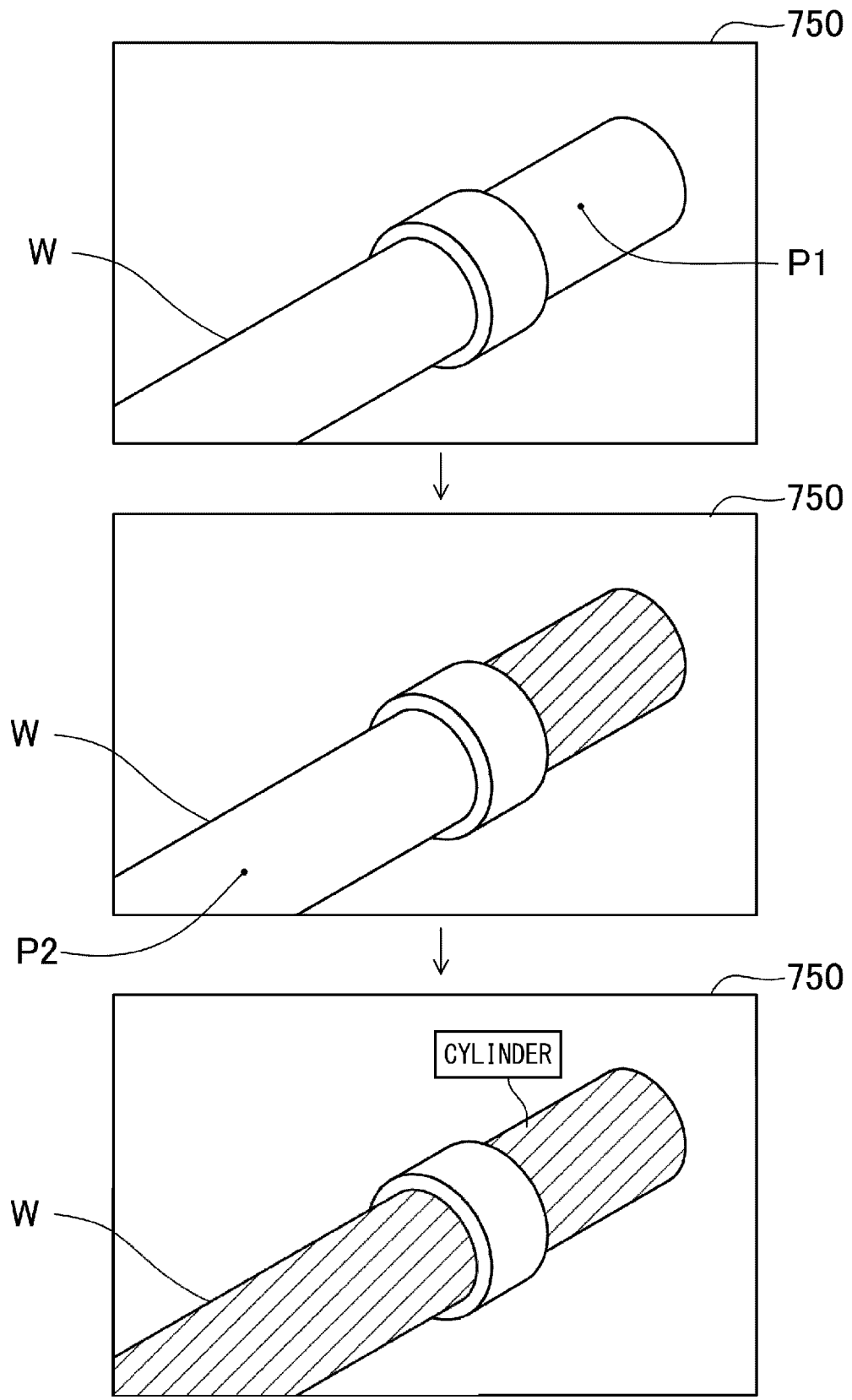
FIG. 28 is a view illustrating an analytic curved surface creation procedure.

FIG. 28 is a view illustrating an analytic curved surface creation procedure, and can be executed by the approximation processing unit 297 illustrated in FIG. 17. Reference sign 750 in FIG. 28 denotes a user interface screen displayed on the display unit 400. Since the workpiece W having two cylindrical portions is displayed in this example, when the user clicks a point P1 on one of the cylindrical portions with a mouse of the operation unit 250, the cylindrical portion including the point P1 is selected, and a color changes (the portion where the color has changed is indicated by hatching). This operation is an operation of designating an approximation area approximate to a geometric element, and is received by the approximation processing unit 297. Thereafter, when a point P2 on the other cylindrical portion is clicked by the mouse of the operation unit 250, the cylindrical portion including the point P2 is selected, and a color changes. This operation is also received by the approximation processing unit 297. Further, the approximation processing unit 297 receives designation of a cylinder as the geometric element approximating the approximation area. Thereafter, a state in which the two cylindrical portions are selected is confirmed by operating a confirm button, and the selected portions are approximated by cylinders. The approximate geometric shape is not limited to the cylinder, and the approximation can also be performed using, for example, a plane, a sphere, a cone, or the like.

Figure 29:
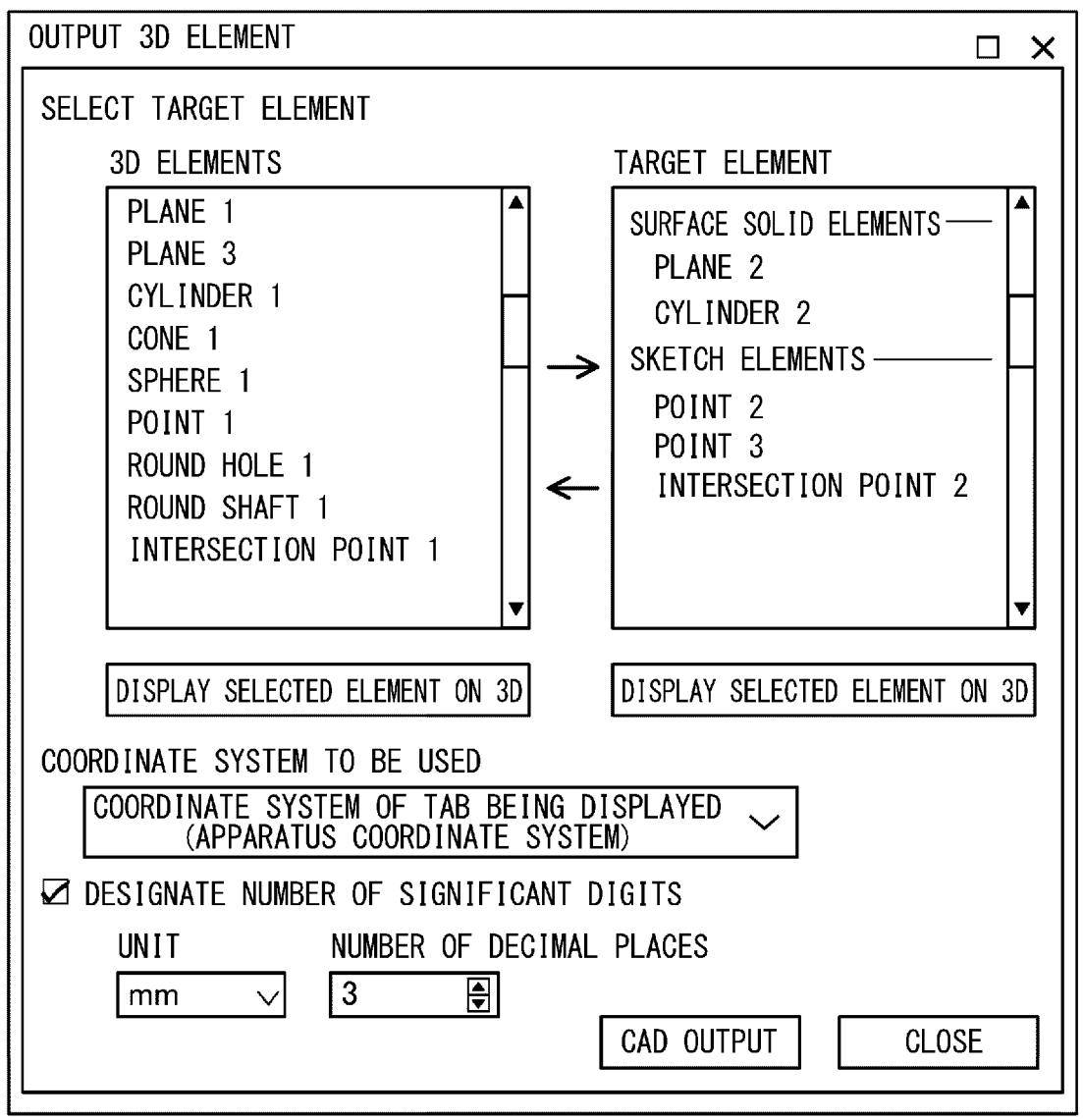
FIG. 29 is a view illustrating an example of a window for selecting a target element.

A window as illustrated in FIG. 29 is displayed on the display unit 400 such that selective display of 3D elements and target elements can be individually performed. That is, the conversion data output unit 296 outputs, to the conversion module 270, the mesh data of the conversion area set by the setting unit 294 together with geometric element data created by approximating mesh data included in the approximation area using the geometric element.

In this example, a recipe can be saved and reproduced after the conversion area is selected. In a case where a polygon selection command history is saved, all 3D operations performed by the operation unit 250 described above until a polygon is selected are saved. In a case where the polygon selection command history is reproduced, mesh data existing at substantially the same position can be selected by executing a similar polygon selection command with respect to new mesh data (partially amended mesh data). That is, it is possible to accurately extract the mesh data by reproducing the operation performed by the user at the time of mesh extraction as it is based on line-of-sight information or the polygon selection command saved in the recipe.

Further, it is also possible to save a selected polygon and select a new polygon within a certain distance from the selected polygon. In this case, the selected polygon is saved as it is in consideration of a coordinate system. In the reproduction, the selected polygon is read in the same coordinate system as that of new polygon data (partially amended polygon data), and an area of the new polygon data existing at a certain distance from the selected polygon is brought into a selected state, whereby mesh data existing at substantially the same position can be selected. That is, an area close to mesh data extracted in the past can be extracted, and for example, the mesh data extracted in the past can be expanded by a predetermined amount, a mesh data included in such an expanded area can be extracted. Note that an attitude of the past mesh data and an attitude of the newly acquired mesh data are substantially the same, but do not always exactly coincide with each other, and thus, it is possible to specify the close area by expanding the mesh data extracted in the past.

The recipe for saving and reproducing a polygon selection command history includes a reference plane, a planar element (a plane, a parallel surface, or the like), a reference axis, an axial element (a cylinder, a cone, a surface intersection line, or the like), an origin, and a point element (a point, an intersection point between a surface and an axis, or the like) as a coordinate system (a transformation matrix with respect to a measurement data coordinate system). The recipe for saving and reproducing a polygon selection command history includes a position (x, y, z) of a camera (viewpoint), attitudes (roll, pitch, and yaw) of the camera, and a line-of-sight direction vector as 3D line-of-sight information. The recipe for saving and reproducing a polygon selection command history includes a projective transformation method (perspective projection, parallel projection, or the like) and a viewport setting (left, right, bottom, top, near, or far) as 3D view volume information. The recipe for saving and reproducing a polygon selection command history includes, as the polygon selection command history, Polygon Selection 1 (in the case of double-click selection) and a double-click coordinate (x, y) on a projection surface; Polygon Selection 2 (in the case of line division) and the first-point coordinate (x, y) on the projection surface, the first point of a line segment, the second-point coordinate (x, y) on the projection surface, the second point of the line segment, the third-point coordinate (x, y) on the projection surface, and selection area; and Polygon Selection 3 (in the case of the inner side of a polygon), the first-point coordinate (x, y) on the projection surface, the second-point coordinates (x, y) on the projection surface, and the like.

A recipe used in a case where a selected polygon is saved and a new polygon within a certain distance from the selected polygon is selected includes a reference plane, a planar element (a plane, a parallel surface, or the like), a reference axis, an axial element (a cylinder, a cone, a surface intersection line, or the like), an origin, and a point element (a point, an intersection point between a surface and an axis, or the like) as a coordinate system (a transformation matrix with respect to a measurement data coordinate system). The recipe used in a case where a selected polygon is saved and a new polygon within a certain distance from the selected polygon is selected includes the selected polygon, a search range (distance), and the like. Note that the user input may be received at the time of reproduction without the saving in the recipe. Note that a mesh pre-processing history may also be included in a recipe, in addition to the polygon selection command history.

(Multiple Conversion Modules)

Figure 30:
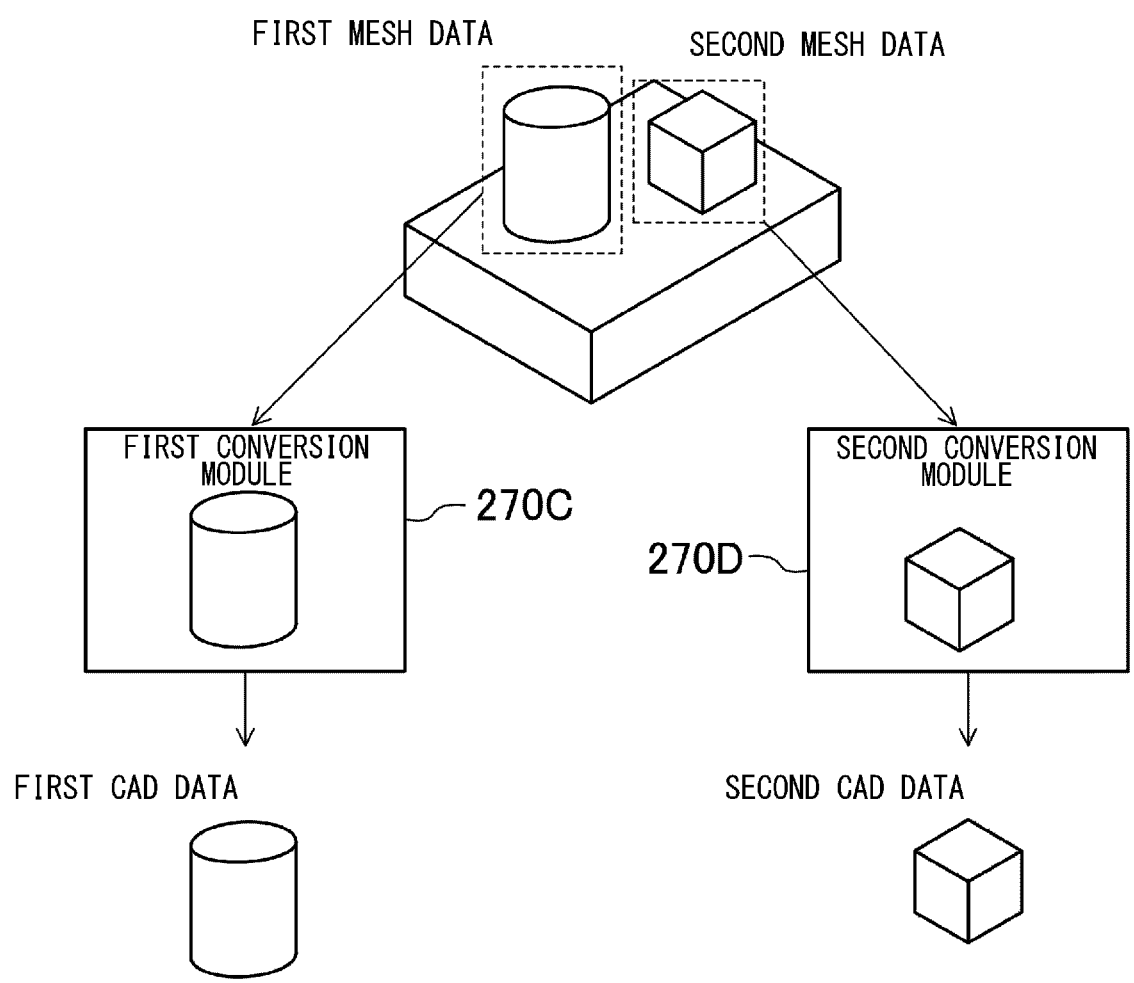
FIG. 30 is a diagram illustrating a form including multiple conversion modules.

FIG. 30 illustrates a form including multiple conversion modules. That is, the reverse engineering system 1 may include a first conversion module 270C and a second conversion module 270D. The setting unit 294 (illustrated in FIG. 5) sets a first conversion area for executing first CAD conversion and a second conversion area for executing second CAD conversion in mesh data acquired by the data acquisition unit 291. The data extraction unit 295 is configured to be capable of extracting first mesh data based on the first conversion area set by the setting unit 294, and is configured to be capable of extracting second mesh data based on the second conversion area set by the setting unit 294. The conversion data output unit 296 outputs the first mesh data extracted by the data extraction unit 295 to the first conversion module 270C, and outputs the second mesh data extracted by the data extraction unit 295 to the second conversion module 270D.

For example, the first conversion module 270C converts the first mesh data (in FIG. 30, data constituting a cylindrical portion) into first CAD data. On the other hand, the second conversion module 270D converts the second mesh data (in FIG. 30, data constituting a cubic portion) into second CAD data regardless of an operation status of the first conversion module 270C. That is, another mesh data can be converted into CAD data by the second conversion module 270D even while the first conversion module 270C is performing conversion processing into CAD data, and thus, the first mesh data and the second mesh data can be converted into pieces of the CAD data in parallel, and processing time can be shortened. During the conversion into CAD data, a window indicating that processing is in progress may be generated and displayed on the display unit 400. Further, a cancel button that can cancel the conversion processing during the conversion into CAD data may be provided, and the conversion processing into CAD data may be canceled by operating the cancel button.

(Design Intention Reflecting Function)

Figure 31:
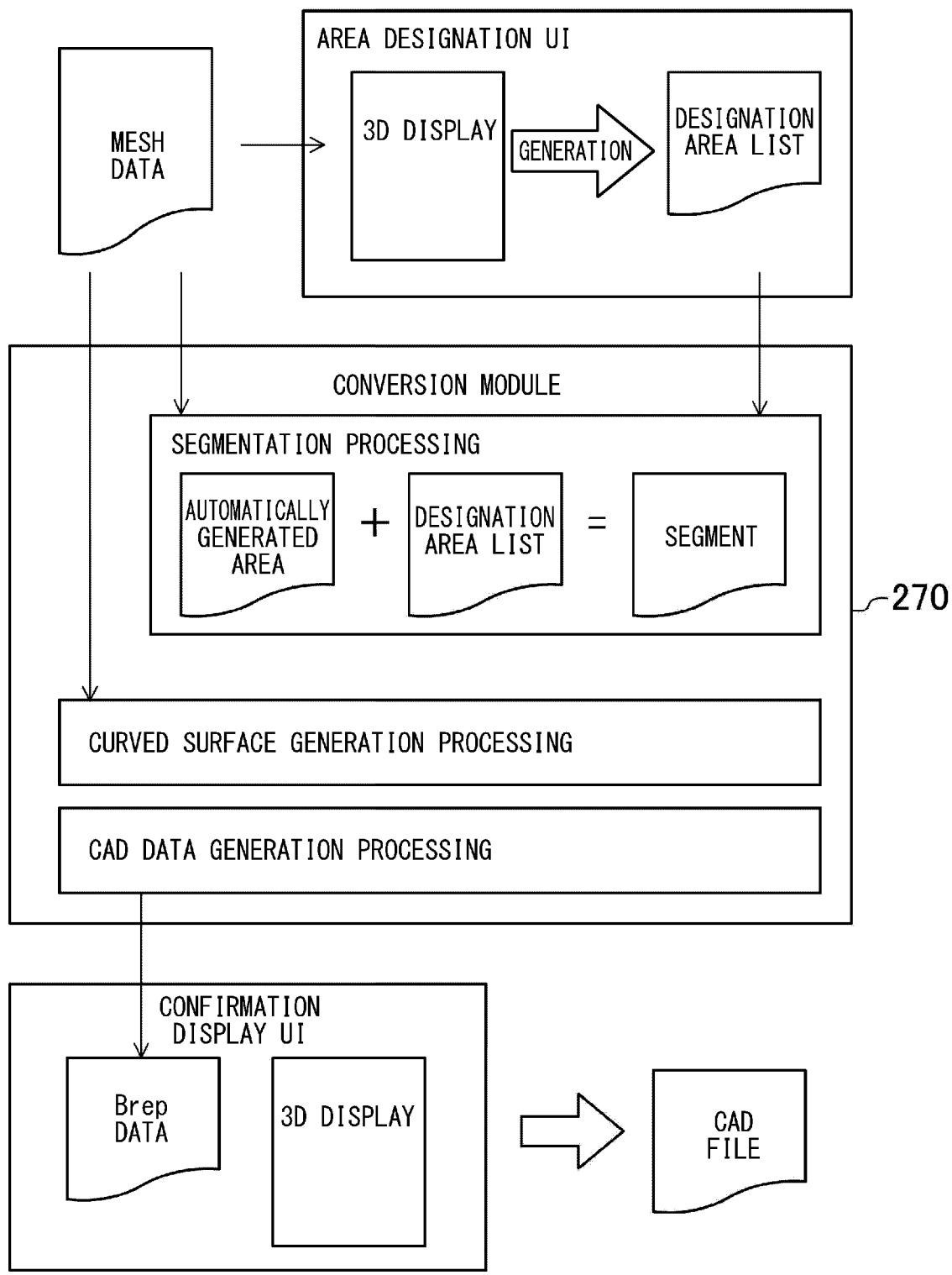
FIG. 31 is a functional block diagram in a case where CAD data reflecting a shape attribute is generated.

The reverse engineering system 1 according to the embodiment has a function capable of positively reflecting a design intention when creating surface data. To describe the overall outline, first, an area designation user interface is activated to perform 3D display of mesh data on the display unit 400 as illustrated in FIG. 31. On the 3D display, the user sets an arbitrary area and a shape attribute of the area (information on an analytic curved surface). That is, the shape attribute setting unit 277 illustrated in FIG. 5 sets the shape attribute to a polygon included in the mesh data acquired by the data acquisition unit 291. The shape attribute can be input by the user. The input of the shape attribute from the user is received by an input reception unit 271a.

Further, the region specifying unit 278 illustrated in FIG. 5 specifies a region included in the mesh data acquired by the data acquisition unit 291 based on the shape attribute set by the shape attribute setting unit 277. The input reception unit 271a receives an operation by the user for specifying the region using the region specifying unit 278. When the input reception unit 271a receives the operation by the user for specifying the region, the region specifying unit 278 specifies the region based on the user's operation received by the input reception unit 271a. Further, the input reception unit 271a is configured to be capable of receiving designation of a shape attribute of the region specified by the region specifying unit 278.

Note that the region is mesh data included in one area having similar mathematical parameters such as an orientation and/or a curvature of a normal on mesh data (polygon data), and can also be referred to as an aggregate of polygons. An area specified by the region specifying unit 278 in the following description corresponds to the region.

Although details will be described later, the data conversion unit 279 illustrated in FIG. 5 converts a polygon included in the region specified by the region specifying unit 278 among polygons included in mesh data acquired by the data acquisition unit 291 into surface data based on the shape attribute set by the shape attribute setting unit 277. Here, the data conversion unit 279 may convert the polygon included in the region specified by the region specifying unit 278 into surface data of an analytic curved surface based on the shape attribute set by the shape attribute setting unit 277.

Furthermore, the data conversion unit 279 converts a polygon not included in the region specified by the region specifying unit 278 among the plurality of polygons included in the mesh data acquired by the data acquisition unit 291 into surface data of a free curved surface. The CAD output unit 274 as a data output unit outputs the surface data converted based on the shape attribute by the data conversion unit 279 and the surface data of the free curved surface converted by the data conversion unit as CAD data. Here, in a case where the data conversion unit 279 converts the polygon included in the region specified by the region specifying unit 278 into the surface data of the analytic curved surface, data including the surface data of the analytic curved surface and the surface data of the free curved surface together can be output as CAD data.

The surface data of the free curved surface has higher followability to measurement data although positioning on a design drawing is difficult and processability of the measurement data is low. Further, the surface data of the analytic curved surface is mathematically expressed data, and thus, has lower followability to measurement data, but the processability of the measurement data is high since it is possible to acquire an axis, draft a surface, and apply a constraint at the time of positioning. When such two types of the surface data are used together, it is possible to achieve both the processability and the followability by outputting the free curved surface for an area where the followability to measurement data is emphasized and outputting the analytic curved surface for an area where the processability of measurement data is emphasized.

An association unit 271b illustrated in FIG. 5 is a part that creates association data in which a shape attribute of a region specified by the region specifying unit 278 is associated with a polygon included in the region. When the association unit 271b creates the association data, the association data is stored in the storage apparatus 240. The data conversion unit 279 reads the association data from the storage apparatus 240 when performing conversion to surface data. After reading the association data, the data conversion unit 279 specifies a plurality of polygons to which one shape attribute has been imparted based on the association data stored in the storage apparatus 240 from mesh data acquired by the data acquisition unit 291. Then, the data conversion unit 279 can convert the plurality of specified polygons into one piece of surface data based on the shape attribute associated with the polygons.

The region specifying unit 278 can also specify a plurality of regions. That is, the region specifying unit 278 can also be configured to be capable of sequentially specifying a first region and a second region from the mesh data acquired by the data acquisition unit 291. In this case, the association unit 271b associates a first shape attribute with a polygon included in the first region specified by the region specifying unit 278, and determines whether or not an overlapping area exists between the first region and the second region. When determining that there is an overlapping area between the first region and the second region, the association unit 271b can change the first shape attribute already associated with the overlapping area to a second shape attribute by associating the second shape attribute with the overlapping area.

Further, when determining that there is an overlapping area between the first region and the second region, the association unit 271b can also hold the first shape attribute already associated with the overlapping area by associating the second shape attribute with an area other than the overlapping area in the second region.

In a case where a plurality of shape attributes are associated with a certain region, the data conversion unit 279 generates surface data corresponding to each of the plurality of shape attributes. In this case, a plurality of pieces of the surface data exist for an overlapping area so that invalid data is generated. When there is an overlapping area between the first region and the second region, it is possible to improve the practical use of defining a shape having higher priority with a wider surface while preventing the generation of invalid data by associating the first shape attribute with the overlapping area. Further, when there is an overlapping area between the first region and the second region, it is possible to improve the operability (usability) that a range of a region can be easily changed afterward while preventing the generation of invalid data by associating the second shape attribute with the overlapping area.

A segment processing unit 271c illustrated in FIG. 5 is a part that divides mesh data acquired by the data acquisition unit 291 into a plurality of segments. First, the segment processing unit 271c acquires the mesh data acquired by the data acquisition unit 291, and calculates geometric feature values of a polygon such as the area, an edge length, a curvature, and a normal vector of the polygon. Then, the segments are generated based on the calculated geometrical feature values of the polygon.

At this time, the segment processing unit 271c specifies whether or not a shape attribute is associated with a plurality of polygons included in the mesh data acquired by the data acquisition unit 291. The segment processing unit 271c is configured to segment the mesh data such that a geometric element corresponding to the shape attribute is extracted from the plurality of polygons specified to be associated with shape attributes, and to segment a plurality of polygons specified not to be associated with shape attributes into a plurality of segments based on geometric feature values of each of the polygons. In this case, the data conversion unit 279 converts each of the segments segmented by the segment processing unit 271c into surface data.

When area designation by the user is completed, the conversion module 270 is activated. A divided area of a curved surface is automatically generated for an area not designated by the user, and is synthesized with an area designated by the user to generate segment information that is a set of the areas covering the entire mesh data. The segment information holds a list of the areas and information on the shape attribute of the area set by the shape attribute setting unit 277.

In curved surface generation processing, curved surfaces and trim lines of the individual areas are calculated from the mesh data and the segment information to generate trimmed surfaces. Further, topology information that is adjacency information between the trimmed surfaces is also generated. In CAD data generation processing, boundary representation (Brep) data is generated from the trimmed surfaces, shape attributes of the trimmed surfaces, and the topology information. A CAD file (STEP file) is uniquely generated from the Brep data.

In a confirmation display user interface, 3D display of the Brep data is performed to cause the user to perform final confirmation. If the generated Brep data is as intended, the CAD file is generated, and the processing ends. If the Brep data is not as intended, the processing is performed again returning to the area designation user interface.

Figure 32:
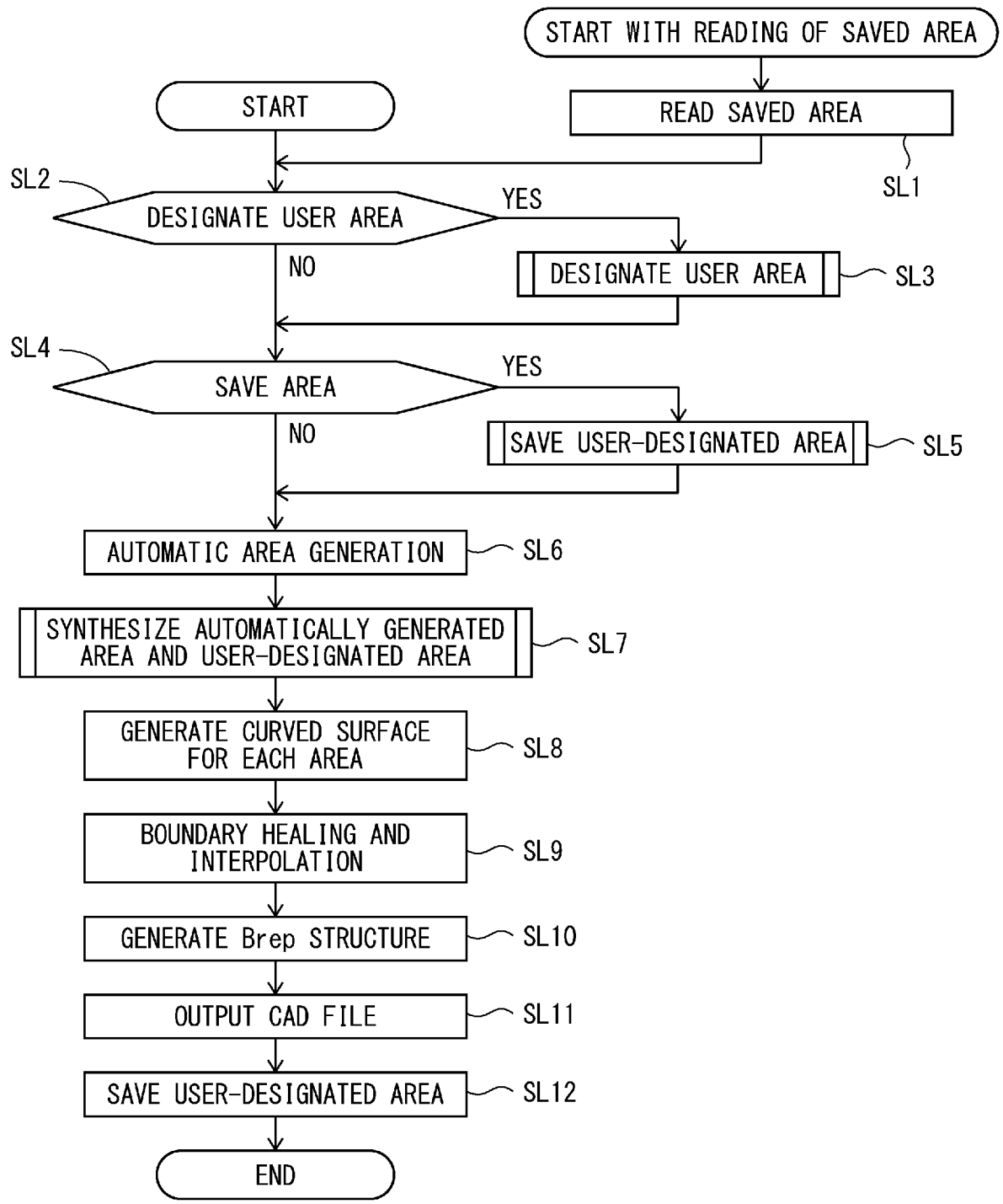
FIG. 32 is a flowchart illustrating an example of a procedure for generating the CAD data reflecting the shape attribute.

Hereinafter, a description will be given with specific examples. FIG. 32 is a flowchart illustrating a procedure for generating CAD data reflecting a shape attribute set by the shape attribute setting unit 277. Step SL1 is a step of reading a saved area in a case where processing starts with reading of the saved area. In Step SL2, it is determined whether or not to designate a user area. In a case where a user area is to be designated, the flow proceeds to Step SL3 to designate the user area, and then, proceeds to Step SL4. The designation of the user area is an operation performed by the user for specifying a region, and is received by the input reception unit 271a.

In a case where the user area is not to be designated, the processing directly proceeds to Step SL4. In Step SL4, it is determined whether or not to save an area designated by the user (user-designated area) in the storage apparatus 240 or the like. In a case where the user-designated area is to be saved in the storage apparatus 240 or the like, the flow proceeds to Step SL5 to save the user-designated area in the storage apparatus 240 or the like, and then, proceeds to Step SL6. In a case where the user-designated area is not to be saved in the storage apparatus 240 or the like, the flow directly proceeds to Step SL6.

In Step SL6, automatic area generation is performed. For example, the region specifying unit 278 specifies a region based on the user area designation operation received by the input reception unit 271a. At this time, in a case where the input reception unit 271a has received an operation of inputting a shape attribute by the user, the region is specified based on the shape attribute input by the user.

There are a plurality of methods for the automatic area generation. One method is a method of generating an area independently of the user-designated area. In this method, the area is synthesized with the user-designated area afterward. The other method is a method of marking the user designated area as an already designated area and performing automatic area generation processing for the other area. In the automatic area generation, a shape attribute may be automatically set by the shape attribute setting unit 277. In Step SL7, an automatically generated area and the user-designated area are synthesized. In the case of the other method described above, Step SL7 is unnecessary.

In Step SL8, curved surfaces are generated for the areas, respectively. In Step SL9, boundary healing and interpolation processing is performed on a boundary between adjacent curved surfaces. A Brep structure is generated in Step SL10, and a CAD file is output in Step SL11. In Step SL12, the user-designated area is saved in the storage apparatus 240 or the like.

Figure 33:
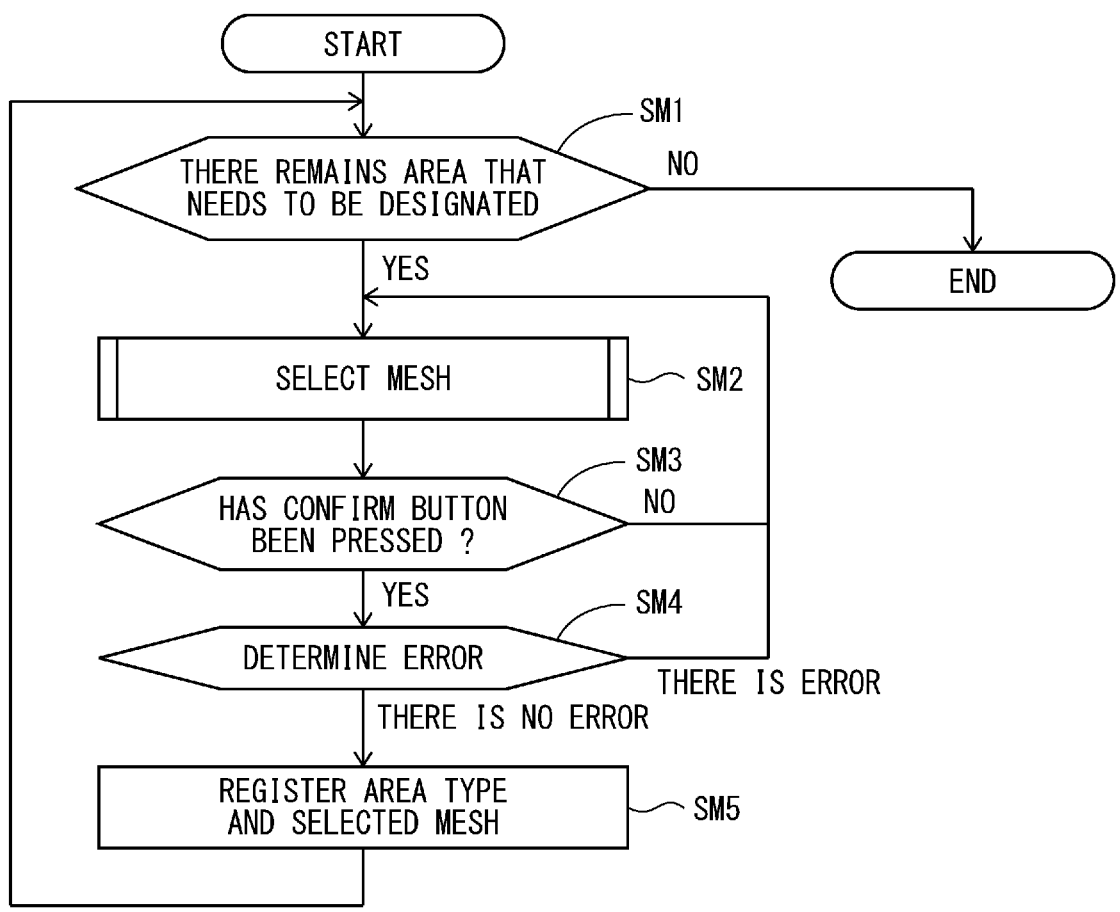
FIG. 33 is a flowchart illustrating an example of a user area designation procedure.

FIG. 33 is a flowchart illustrating a user area designation procedure. In Step SM1 after the start, it is determined whether or not there remains an area that needs to be designated. In a case where there is no remaining area that needs to be designated, the flow ends. In a case where there remains an area that needs to be designated, the flow proceed to Step SM2 to execute mesh selection. In Step SM3, it is determined whether a confirm button has been pressed. The flow returns to Step SM2 in a case where the confirm button has not been pressed, or proceeds to Step SM4 in a case where the confirm button has been pressed. In Step SM4, an error is determined. The flow returns to Step SM2 if there is an error, or proceeds to Step SM5 if there is no error. In Step SM5, an area type and a selected mesh are registered.

Figure 34:
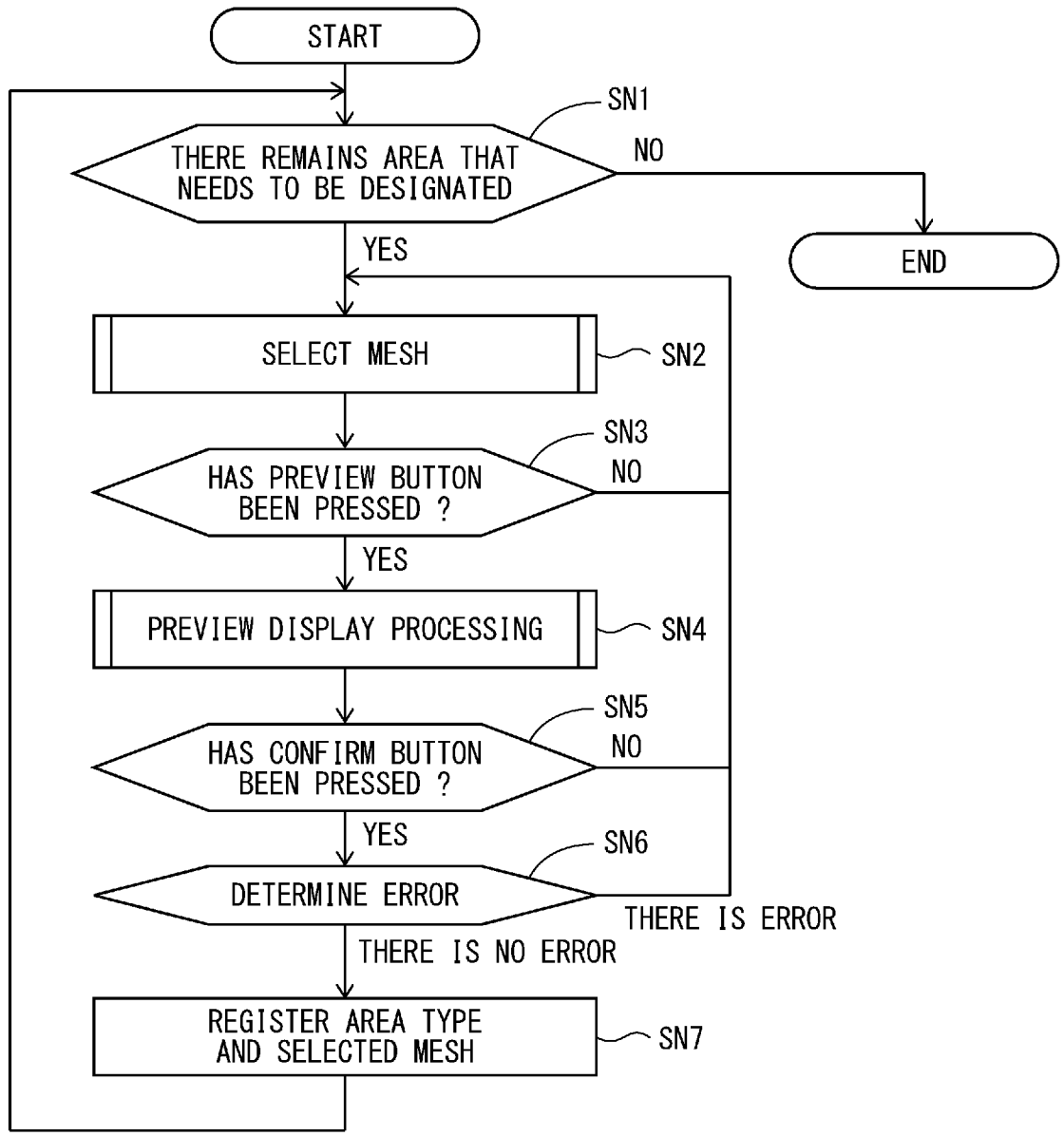
FIG. 34 is a flowchart illustrating an example of a user area designation procedure in a case where there is preview display.

FIG. 34 is a flowchart illustrating a user area designation procedure in a case where there is preview display. Steps SN1 and SN2 are the same as Steps SM1 and SM2 of FIG. 33. In Step SN3, it is determined whether or not a preview button has been pressed. In a case where the preview button has not been pressed, the flow returns to Step SN2. In a case where the preview button has been pressed, the flow proceeds to Step SN4, and a preview screen that can be confirmed by the user is generated and displayed on the display unit 400. Steps SN5 to SN7 are the same processes as Steps SM3 to SM5 of FIG. 33.

Figure 35:
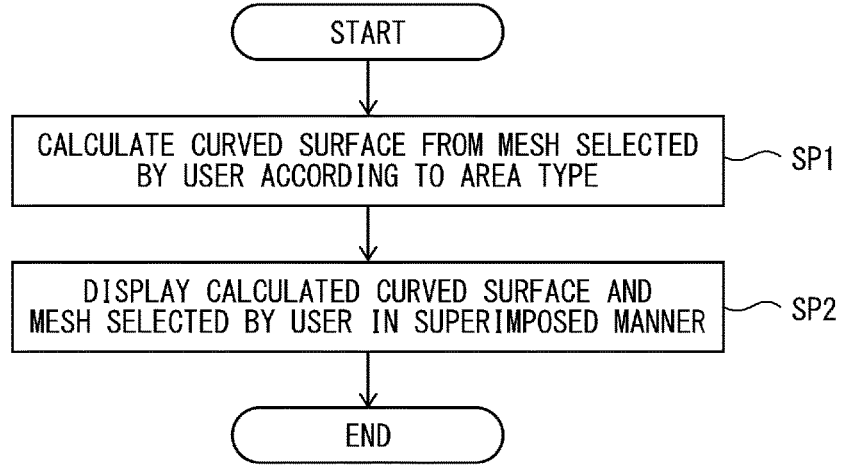
FIG. 35 is a flowchart illustrating an example of a procedure of the preview display.

FIG. 35 is a flowchart illustrating details of Step SN4 of FIG. 34. In Step SP1, a curved surface is calculated according to the area type from the mesh selected by the user. In Step SP2, the curved surface calculated in Step SP1 and the mesh selected by the user are displayed in a superimposed manner on the display unit 400. The curved surface calculated in Step SP1 and the mesh selected by the user are displayed in a distinguishable form. The distinguishable form is a form in which the curved surface calculated in Step SP1 and the mesh selected by the user are displayed in different colors, a form of display in which one is translucent to make the other visible, or the like.

Figure 36:
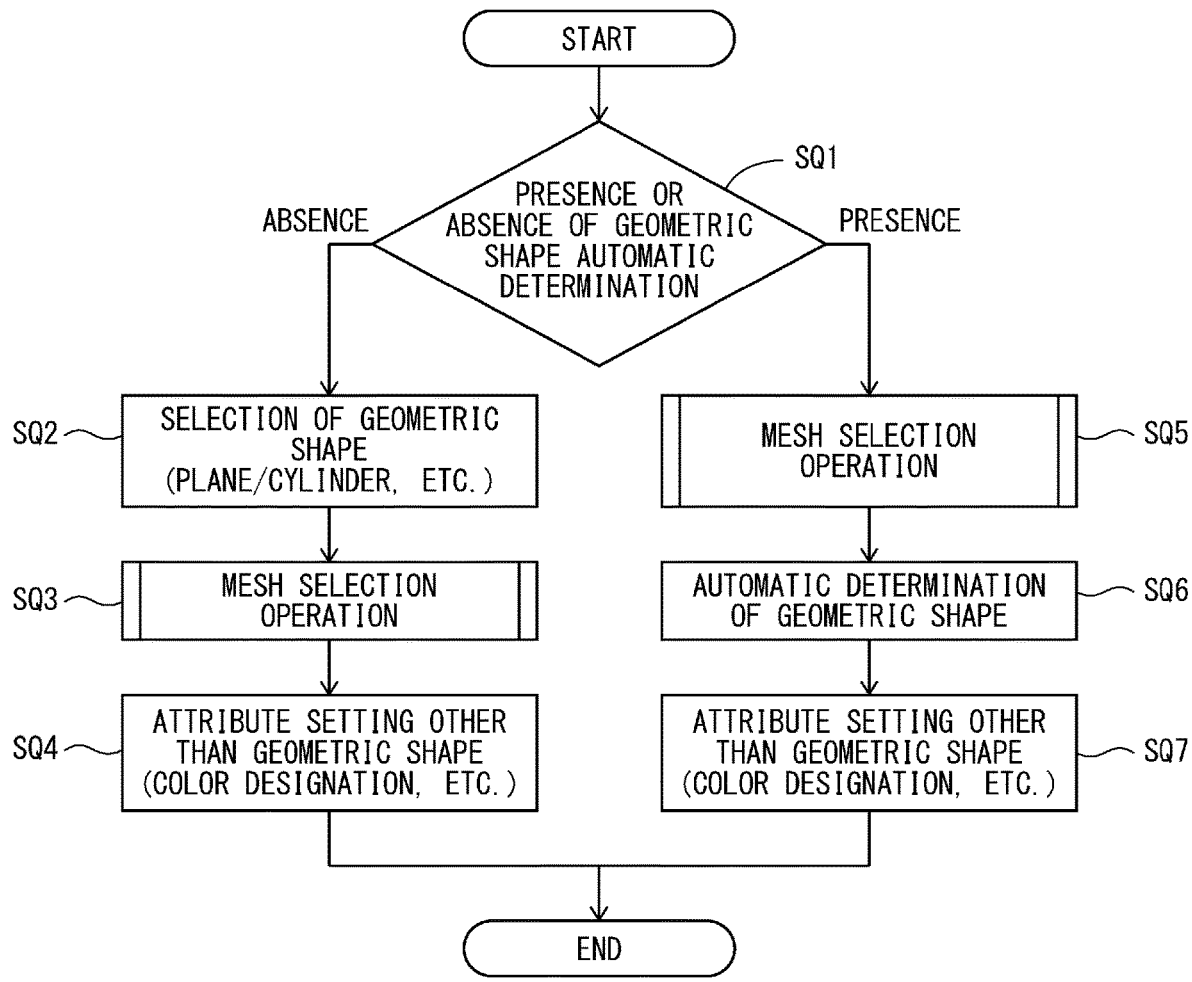
FIG. 36 is a flowchart illustrating an example of the mesh selection processing procedure.

FIG. 36 is a flowchart illustrating the mesh selection processing procedure. In Step SQ1, the presence or absence of an automatic determination of a geometric shape is determined. The automatic determination of a geometric shape means that a type of the geometric shape (a plane, a cylinder, a cone, a sphere, a torus, or a free curved surface) is automatically determined based on a shape of the mesh in the area designated by the user and set as an attribute. For example, in a case where any one of a plane button, a cylinder button, a cone button, and a sphere button in the detailed setting area 712 of the surface conversion user interface screen 710 illustrated in FIG. 14 is operated, the type of the geometric shape is set to a geometric shape specified by the selected button.

Figure 38:
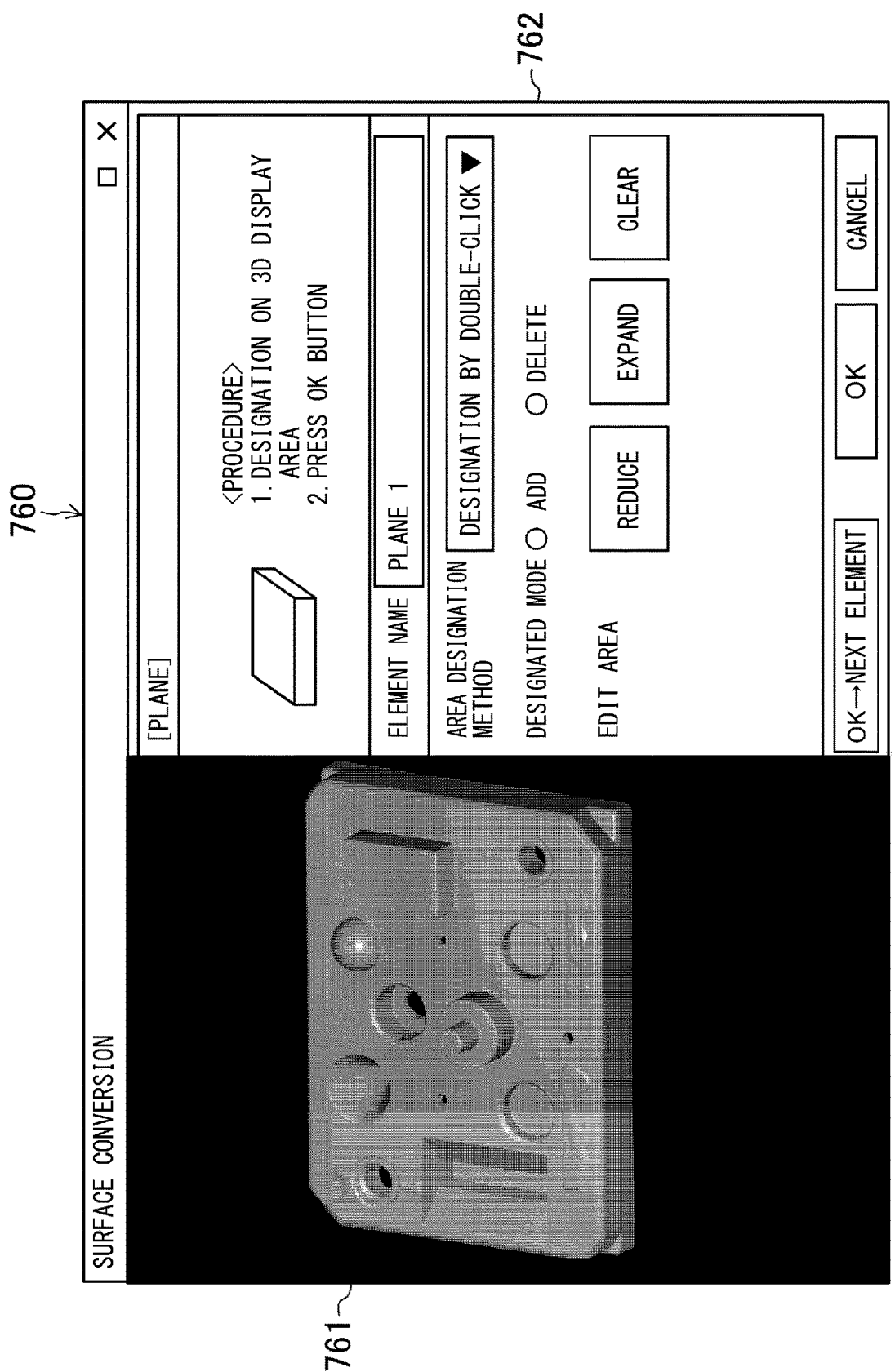
FIG. 38 is a view illustrating an example of an area designation user interface screen.

When a certain button in the detailed setting area 712 is operated, an area designation user interface screen 760 illustrated in FIG. 38 is generated and displayed on the display unit 400. The area designation user interface screen 760 is provided with an image display area 761 in which an image of the workpiece W based on the mesh data is displayed, and a detailed setting area 762. In the detailed setting area 762, a set geometric element is also displayed, and a plane is set in this example. When the user double-clicks a portion to be desirably designated as an area on the image display area 761 by the operation unit 250, a shape to be currently designated is automatically extracted and selected. In a case where a plane is set, an area that can be continuously regarded as a plane from the double-clicked position is automatically selected as the plane. In a case where designation is performed by surrounding a portion with a mouse, a shape surrounded by a mouse pointer is selected.

In the case of absence of the automatic determination, the flow proceeds to Step SQ2 to execute selection of a geometric shape, and then, proceeds to Step SQ3 to execute a mesh selection operation. The mesh selection operation is performed as described in the flowchart illustrated in FIG. 21. Examples of the user's operation for specifying a region by the region specifying unit 278 include designation of a point by the user, designation of surrounding a specific area, and the like, and these operations are received by the input reception unit 271*a*. When the designation of the point is received, the region specifying unit 278 specifies the region based on a feature of a surface including the point received by the input reception unit 271*a*. Further, when the designation of surrounding the specific area is received, the region specifying unit 278 specifies a polygon included in the specific area received by the input reception unit 271*a* as the region. In a case where the point or the specific area has been designated by the region specifying unit 278 as the user's operation for specifying the region, the storage apparatus 240 stores coordinate information of the point or the specific area in association with a display condition at the time of displaying the mesh data on the display unit 400. As described above, the second display control unit 276 can reproduce a display state of the mesh data in the analysis module 290 on the display unit 400. The region specifying unit 278 can also specify the region based on the mesh data whose display state has been reproduced and the coordinate information stored in the storage apparatus 240. Thereafter, in Step SQ4, an attribute setting (for example, color designation) other than a geometric shape is executed.

In the case of presence of the automatic determination, the flow proceeds to Step SQ5 to execute the mesh selection operation. In Step SQ6, the automatic determination of a geometric shape is executed. Thereafter, in Step SQ7, an attribute setting (for example, color designation) other than the geometric shape is executed.

Figure 37A:
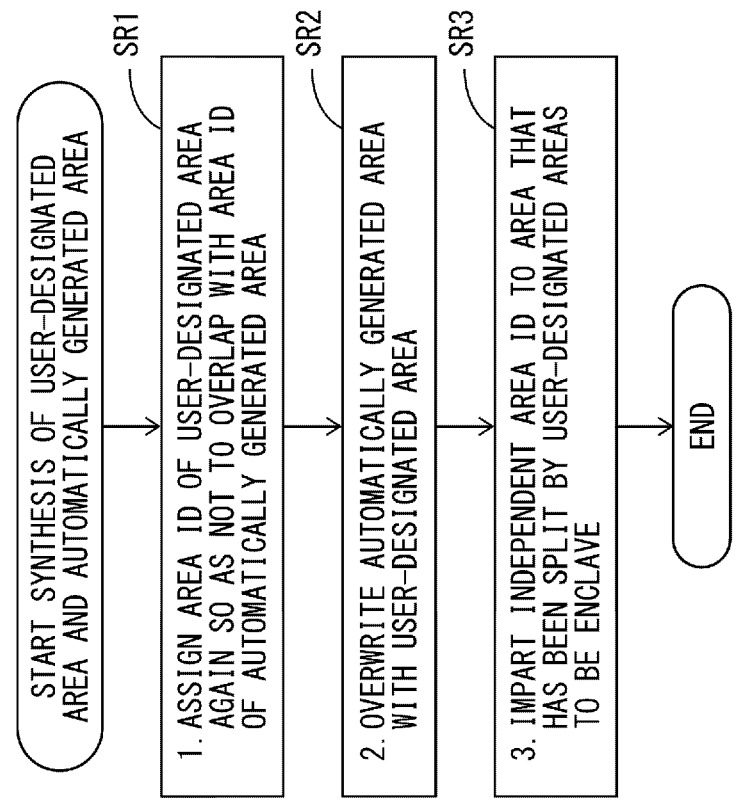
FIGS. 37A and 37B are views illustrating a procedure of synthesis processing of a user-designated area and an automatically generated area and an example of the synthesis processing.
Figure 37B:
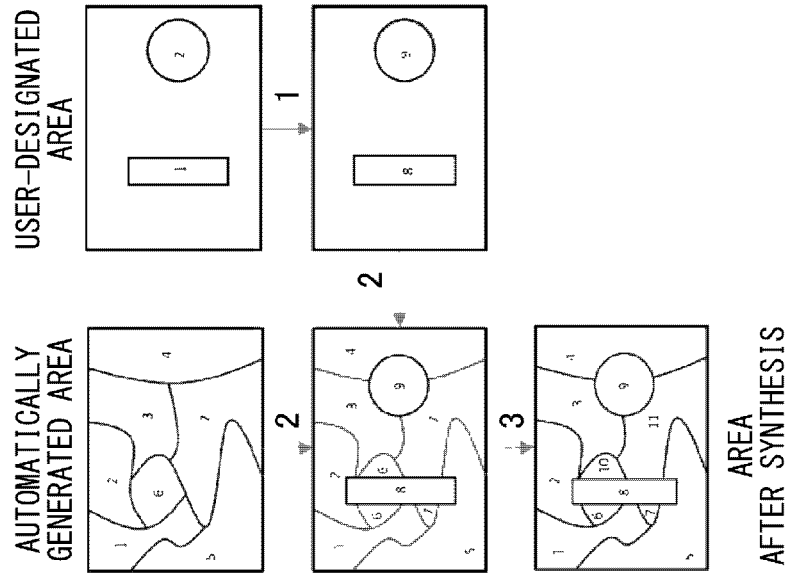

FIG. 37A is a flowchart illustrating a procedure of synthesis processing of a user-designated area and an automatically generated area. A number in each step corresponds to a number in the FIG. 37B. In Step SR1, an area ID of the user-designated area is assigned again so as not to overlap with an area ID of the automatically generated area. In Step SR2, the user-designated area is overwritten on the automatically generated area. In Step SR3, an independent area ID is imparted to an area that has been split by the user-designated area to be an enclave. The synthesized area can be obtained as described above.

In the case of a boundary between free curved surfaces, first, it is determined whether boundary connection healing is necessary. That is, points are placed at regular intervals on a curve serving as a boundary line. An average value and a maximum value of distances between the points and each of the curved surfaces are evaluated, and if the values are equal to or more than certain values, it is determined that the healing is necessary, and both curved surfaces are generated again. At this time, a point cloud belonging to an area of the curved surface and a point cloud generated from the boundary curve are used as point clouds to which the curved surface is fitted. Further, calculation is performed by setting a weight of the point cloud derived from the boundary curve to be greater than a weight of the point cloud derived from the area. Next, whether the healing is necessary is determined again by the method described above. If a criterion is not satisfied, calculation is performed again by increasing the weight of the point cloud derived from the boundary line.

In the case of a boundary between primitives, first, a boundary line projected on the primitives is set as a new boundary line. Alternatively, calculation is performed upon projecting a vertex, which serves as a source at the time of generating the boundary line, onto the primitives. Thereafter, it is determined whether boundary connection healing is necessary. That is, points are placed at regular intervals on a curve serving as a boundary line. An average value and a maximum value of distances between the points and the free curved surfaces are evaluated, and if the values are equal to or more than certain values, it is determined that the healing is necessary, and free curved surfaces are generated again. At this time, a point cloud belonging to an area of the curved surface and a point cloud generated from the boundary curve are used as point clouds to which the curved surface is fitted. Further, calculation is performed by setting a weight of the point cloud derived from the boundary curve to be greater than a weight of the point cloud derived from the area. Next, whether the healing is necessary is determined again by the method described above. If a criterion is not satisfied, calculation is performed again by increasing the weight of the point cloud derived from the boundary line.

A case where a user designated area and an analytic curved surface designated by the user are inconsistent is conceivable. In a case where the user-designated area is, for example, a plane but is designated as a cylindrical surface, or in a case where a surface having a step is set as one area and is designated as a plane, an error message is displayed at the time of area designation to prompt the user to perform designation again.

Further, a problem may occur when a curved surface has been actually generated although area designation and an analytic curved surface are consistent at the time of the area designation. For example, in a case where adjacent free curved surfaces or adjacent free curved surface and analytic curved surface are separated from each other or intersect with each other, healing processing is performed to eliminate the problem by deforming the free curved surface side.

Although it is possible to perform healing processing of connecting adjacent areas at a boundary line by deforming curved surfaces in the case of free curved surface, this is not possible between analytic curved surfaces in a case where the analytic curved surfaces are adjacent to each other. There is no problem if the analytic curved surfaces are continuous within an allowable error range, but an error occurs if not. When the error has occurred, a problem is confirmed on a confirmation user interface, and area designation is performed again by interposing a free curved surface between the curved surfaces or the like to avoid the problem.

For example, in a case where the user has performed an operation of surrounding a specific area as an operation for specifying a region, the region specifying unit 278 calculates an approximate plane based on a plurality of polygons included in the surrounded specific area. Further, the region specifying unit 278 acquires a calculated normal of the approximate plane and positions and normals of the polygons included in the specific area. Then, the region specifying unit 278 can also determine whether or not the specific area can be approximated as a plane based on the acquired normal of the approximate plane and the positions and normals of the polygons included in the specific area.

The shape attribute setting unit 277 can also calculate a curvature radius of a polygon based on a curvature of the polygon. The shape attribute setting unit 277 can also calculate a center point of a curvature circle of the polygon based on the calculated curvature radius of the polygon and an orientation of a normal of the polygon, and set shape attributes to a plurality of polygons included in the mesh data acquired by the data acquisition unit 291 based on the positional relationship of the center points of the curvature circles calculated for the polygons constituting the mesh data.

Error processing in the case of designating a geometric shape is also possible. That is, it is determined whether or not a shape and an attribute of an area selected by the user coincide with each other for the area in which a geometric shape has been set as the attribute, such as a plane or a cylindrical surface. For example, assuming that the area designated by the user is the geometric shape set by the attribute, an analytic curved surface of the geometric shape is estimated by a least squares method or the like. After the analytic curved surface is estimated, the shortest distance between the estimated analytic curved surface and a vertex is calculated for each vertex of the area designated by the user. After the shortest distance is calculated, a maximum value and an average value of the shortest distances are calculated, and it is determined as an error when the maximum value and the average value exceed predetermined thresholds, respectively. Before the maximum value and the average value are calculated, outlier removal may be performed by performing pre-processing such as removing the top 0.5% of the shortest distances. The outlier removal can prevent a state in which it is difficult to designate an area due to shape noise.

Error processing in the case of designating a free curved surface is also possible. That is, the presence or absence of an overhang is determined since it is difficult to generate an overhanging area for a free curved surface as one curved surface. For example, principal component analysis is performed on vertex coordinates of the area designated by the user to obtain a direction of the first principal component. After the direction of the first principal component is obtained, an angle formed with the direction of the first principal component is calculated for each normal vector of each of the vertexes of the area designated by the user. When each of the angles exceeds a predetermined threshold, it is determined as an error. The predetermined threshold is, for example, about 60° to 80°. When the overhang has been detected for the free curved surface, there are a method in which a user assigns an area again and a method in which an area is automatically divided to eliminate the overhang. Regarding the latter, for example, a vertex having the maximum principal curvature in the area designated by the user is obtained, and then, vertexes closest to the vertex in both positive and negative directions of a principal curvature vector are searched from the vertex. The processing of searching for the closest vertexes in both the positive and negative directions of the principal curvature vector is repeatedly performed until the found vertex reaches an end of the area. As a result, a vertex sequence that divides the area is obtained. The area is divided into two by the vertex sequence, an overhang is detected in each of the areas, and area division is recursively performed by the above method when the overhang is present.

(Imparting of Additional Information to Surface Data)

The reverse engineering system 1 is configured to be capable of imparting additional information not directly related to a three-dimensional shape to surface data. The additional information is information indicating surface features of the workpiece W, and is, for example, color information indicating a color of the surface of the workpiece W, reflection information indicating the degree of reflection of light on the surface of the workpiece W, diffusion information indicating the degree of diffusion of light on the surface of the workpiece W, and the like.

When a description is given based on the block diagram illustrated in FIG. 5, the input reception unit 271*a* is configured to be capable of receiving designation of color information for each shape attribute as additional information. An additional information specifying unit 271*d* is a part that specifies additional information to be imparted to surface data converted by the data conversion unit 279. For example, the additional information specifying unit 271*d* can specify one piece of additional information to be assigned to a region based on pieces of additional information associated with a plurality of polygons included in the region specified by the region specifying unit 278. Examples of the one piece of additional information specified here include representative colors and representative luminances of the plurality of polygons included in the region.

An additional information imparting unit 271*e* is a part that imparts the additional information specified by the additional information specifying unit 271*d* to the surface data converted by the data conversion unit 279. When the additional information specifying unit 271*d* has specified the one piece of additional information to be assigned to the region, the additional information imparting unit 271e imparts the specified one piece of additional information to the region. When the additional information is imparted to the surface data in this manner, the CAD output unit 274 outputs CAD data imparted with the additional information to the surface data. When color information is assigned as additional information, the additional information specifying unit 271d specifies a representative color as one piece of additional information to be assigned to a region based on pieces of color information associated as the additional information with the plurality of polygons included in the region. Then, the additional information imparting unit 271e imparts the specified representative color to the region.

Further, the data conversion unit 279 is configured to, after specifying whether or not shape attributes are assigned to a plurality of polygons included in mesh data acquired by the data acquisition unit 291, convert a plurality of polygons specified to be assigned with shape attributes into surface data of an analytic curved surface based on the shape attributes, and convert a plurality of polygons specified not to be assigned with shape attributes into surface data of a free curved surface. When conversion into the surface data of the analytic curved surface and the surface data of the free curved surface has been executed, the additional information specifying unit 271d specifies color information designated for each of the shape attributes as additional information to be imparted to the surface data of the analytic curved surface, and specifies predetermined color information set in advance as additional information to be imparted to the surface data of the free curved surface.

The association unit 271b is configured to be capable of associating a polygon included in a region specified by the region specifying unit 278 with additional information specified by the additional information specifying unit 271d. The associated polygon and the additional information can also be stored in the storage apparatus 240 or the like. Further, the association unit 271b is configured to be capable of associating the polygon included in the region specified by the region specifying unit 278, the additional information specified by the additional information specifying unit 271d, and a shape attribute received by the input reception unit 271a. The associated polygon, additional information, and shape attribute can also be stored in the storage apparatus 240 or the like.

Further, when the input reception unit 271a receives an input of color information for each shape attribute as additional information, the association unit 271b is configured to associate the color information corresponding to the shape attribute of a region with a polygon included in the region based on the received shape attribute and the color information for each shape attribute, thereby associating the same color information with the region having the same shape attribute.

Figure 39:
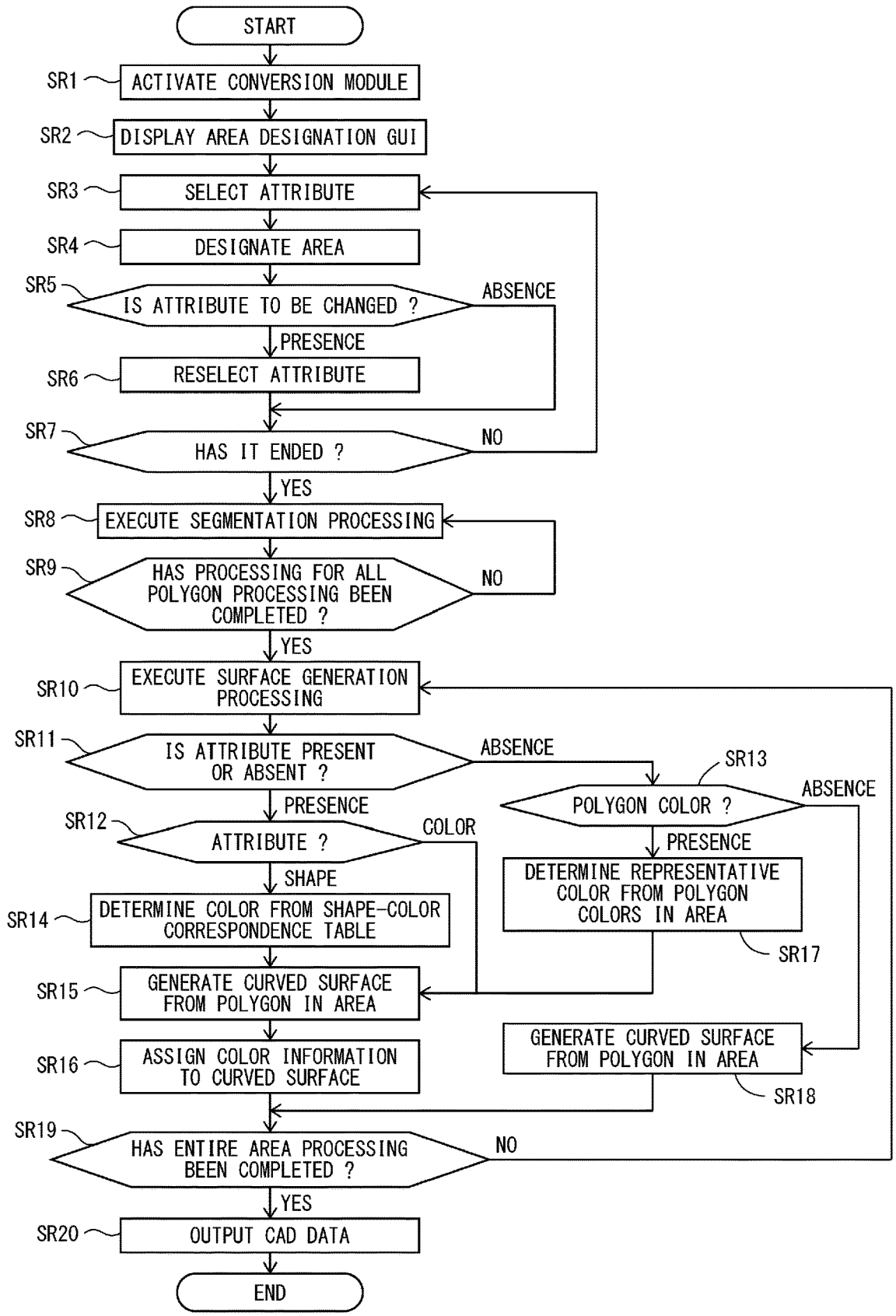
FIG. 39 is a flowchart illustrating an example of a processing procedure in a case where additional information is imparted.
Figure 40:
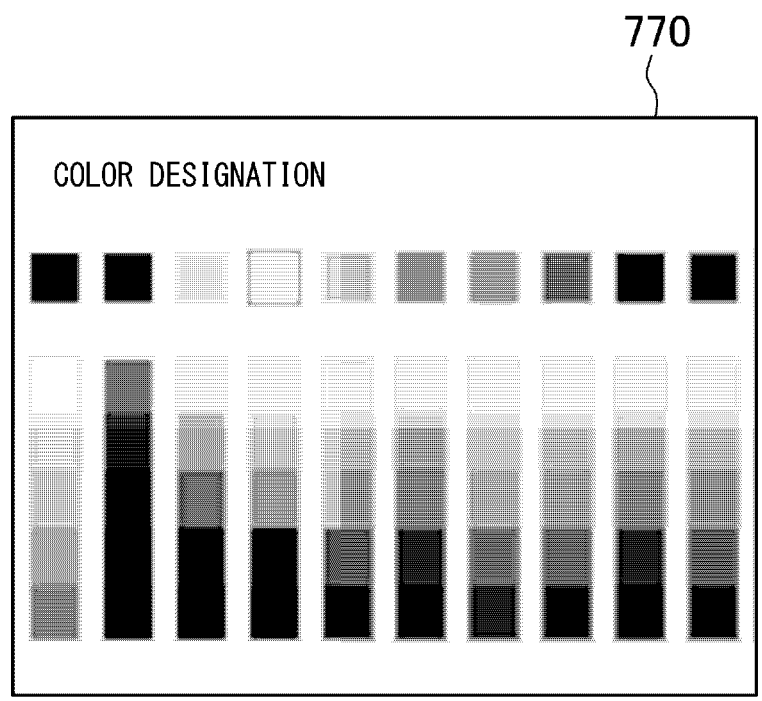
FIG. 40 is a view illustrating an example of a color designation window.

Hereinafter, a procedure of imparting additional information to surface data will be described with reference to a flowchart illustrated in FIG. 39. In Step SR1 after the start, the conversion module 270 is activated. In Step SR2, the conversion module 270 generates the surface conversion user interface screen 710 and displays the same on the display unit 400 as an area designation GUI, for example, as illustrated in FIG. 14. In Step SR3, the user selects an attribute, and the input reception unit 271a receives the selected attribute. A shape type selection area 712d is provided in the detailed setting area 712 of the surface conversion user interface screen 710, and a geometric shape such as a plane or a cylinder can be designated by operating the shape type selection area 712d. In Step SR3, the user designates a color, and the input reception unit 271a receives the designation of the color. When the designation of the color is received, the conversion module 270 generates a color designation window 770 as illustrated in FIG. 40 and displays the same on the display unit 400. In the color designation window 770, a plurality of color samples having different hues and saturations are displayed, and the user can designate a desired color.

In Step SR4, the user designates an area based on the shape designated in Step SR3. In Step SR5, the presence or absence of an attribute change is determined. The flow proceeds to Step SR6 in a case where the user changes an attribute, or proceeds to Step SR7 in a case where there is no attribute change. In Step SR6, the user reselects an attribute. In Step SR6, a procedure similar to that in Step SR3 can be performed.

In Step SR7, it is determined whether or not the setting has ended. The flow returns to Step SR3 in a case where the setting has not ended, or proceeds to Step SR8 in a case where the setting has ended. In Step SR8, the segment processing unit 271c divides the mesh data into a plurality of segments. The area designated by the user is not to be divided.

In Step SR9, it is determined whether or not processing for all the polygons of the mesh data has been completed. The flow proceeds to Step SR8 in a case where the processing has not been completed, or proceeds to Step SR10 in a case where the processing has been completed. In Step SR10, surface generation processing is executed. Thereafter, the flow proceeds to Step SR11. In Step SR11, the presence or absence of an attribute is determined. The flow proceeds to Step SR12 if there is an attribute, or proceeds to Step SR13 if there is no attribute. In Step SR12, a type of the attribute is determined. The flow proceeds to Step SR14 if the attribute is a shape, or proceeds to Step SR15 if the attribute is a color.

In Step SR14, the additional information specifying unit 271d specifies a color based on a shape-color correspondence table. The shape-color correspondence table is a table specifying a color to be assigned to each shape, and is, for example, a table specifying a plane as blue and a cylinder as green, or the like. This table may be created by the user. In Step SR15, a curved surface is generated from a polygon in the area designated by the user. In Step SR16, the additional information imparting unit 271e imparts color information to the curved surface generated in Step SR15.

In a case where it is determined in Step SR13 that there are polygon colors, the flow proceeds to Step SR17, and a representative color is determined from the polygon colors in the respective segment areas. The representative color determined here is an example of one piece of additional information. If it is determined in Step SR13 that there is no polygon color, the flow proceeds to Step SR18 to generate the curved surface from the polygon in the area designated by the user.

Thereafter, the flow proceeds to Step SR19, and it is determined whether or not the processing of the entire area has been completed. In a case where the processing of the entire area has not been completed, the flow returns to Step SR10. On the other hand, in a case where the processing of the entire area has been completed, the flow proceeds to Step SR20, and the CAD output unit 274 outputs the CAD data imparted with the additional information and ends the flow.

Figure 41:
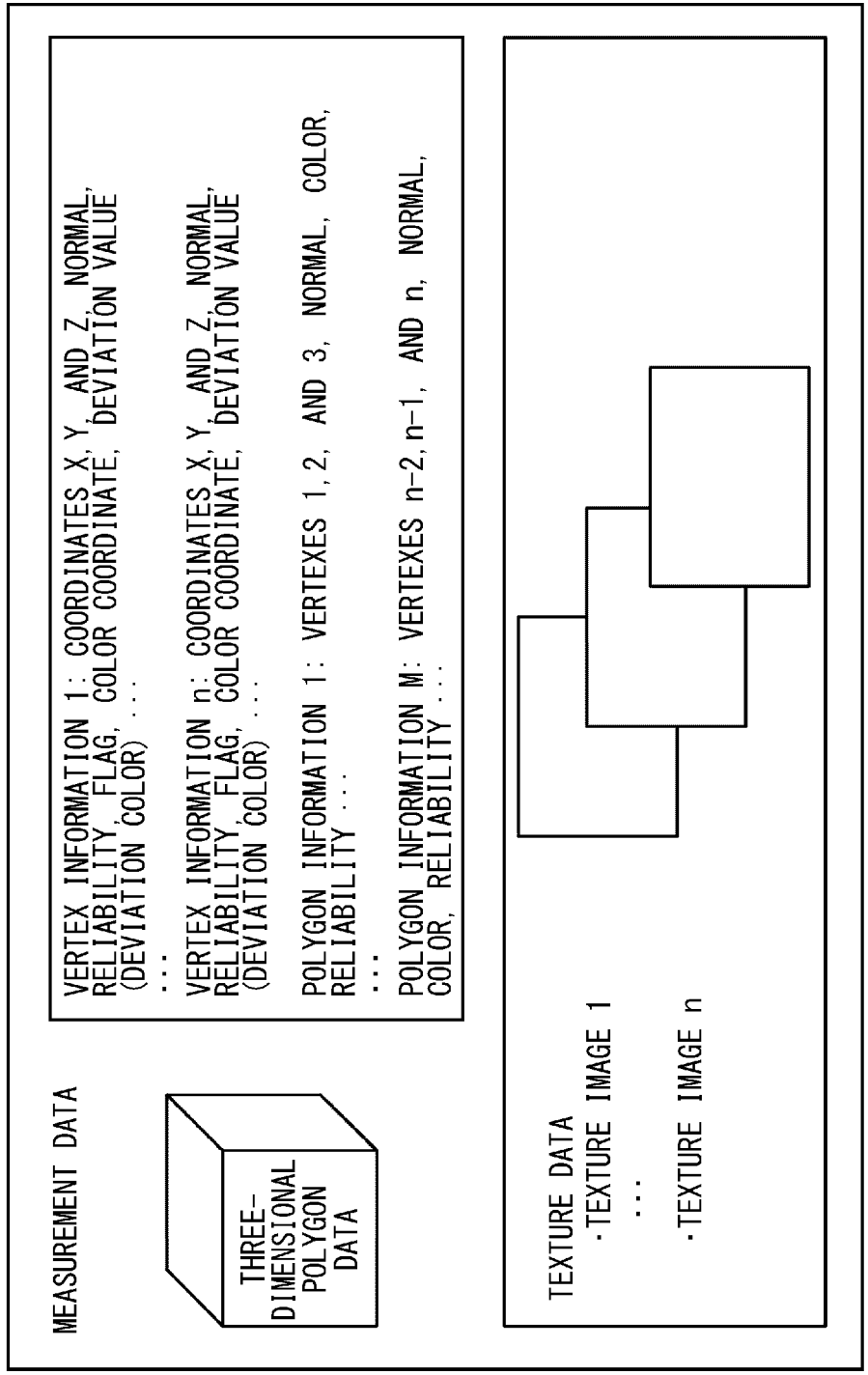
FIG. 41 is a view illustrating a configuration example of measurement data having additional information.

FIG. 41 is a view illustrating a configuration example of measurement data having texture information as additional information. The texture information includes a texture image.

As described above, when an area included in mesh data obtained by measuring a shape of the workpiece W is specified, a polygon included in the specified area is converted into surface data. When the converted surface data is imparted with additional information such as a color, a reflection, or a color variation, the additional information is specified, and the specified additional information is automatically imparted to the surface data. Then, CAD data imparted with the additional information is output, and thus, the additional information can be used as information useful in the reverse engineering.

Further, a polygon included in a region specified by the region specifying unit 278, the additional information specified by the additional information specifying unit 271*d*, and a shape attribute can be associated with each other, and thus, a region having the same shape attribute can automatically be imparted with the same additional information.

Note that, in a case where the additional information is the color variation, it is sometimes difficult to generate CAD data by adding color information that closely expresses a difference, and thus, a representative color may be determined, and the additional information may be imparted to the region based on the determined representative color. Further, in a case where the additional information is a color texture, the texture may be imparted as it is, or a representative color may be applied for each region.

(Mesh Data Correction Function)

The reverse engineering system 1 has a correction function of correcting mesh data acquired by measuring the workpiece W, and can execute correction processing by the correction function. To give a description based on the block diagram illustrated in FIG. 5, the input reception unit 271*a* is configured to be capable of receiving a user input for extracting a correction reference surface serving as a reference of the correction processing from mesh data acquired by the data acquisition unit 291 when starting the correction processing. Examples of the for specifying the correction reference surface include a polygon and a vertex forming the correction reference surface, a type (a plane, a cylinder, or the like) of an analytic curved surface, a coefficient of a mathematical expression, and the like, and these are held.

A reference surface extraction unit 271*f* extracts the correction reference surface from the mesh data acquired by the data acquisition unit 291 based on the user input received by the input reception unit 271*a*. The correction unit 275 corrects the mesh data acquired by the data acquisition unit 291 based on the correction reference surface extracted by the reference surface extraction unit 271*f*. The correction unit 275 can also generate a geometric shape polygon representing an ideal shape of the correction reference surface based on the correction reference surface. In this case, a polygon included in the correction reference surface is deleted and replaced with the geometric shape polygon. Here, the geometric shape polygon is obtained by tessellating (into a triangular polygon) a geometric element such as a cylinder or a plane.

Examples of the correction by the correction unit 275 can include an example in which the mesh data acquired by the data acquisition unit 291 is corrected by detecting a deviation between the mesh data acquired by the data acquisition unit 291 and the correction reference surface, removing the mesh data of an area where the deviation has been detected, and creating new mesh data in a portion from which the mesh data has been removed. For example, the correction unit 275 is configured to be capable of correcting the mesh data acquired by the data acquisition unit 291 by detecting a distance between the mesh data acquired by the data acquisition unit 291 and the correction reference surface, removing the mesh data of an area where the detected distance is equal to or more than a predetermined threshold, and creating new mesh data in the portion from which the mesh data has been removed.

Further, the correction unit 275 may detect a normal change amount between the mesh data acquired by the data acquisition unit 291 and the correction reference surface. The correction unit 275 can also correct the mesh data acquired by the data acquisition unit 291 by detecting the normal change amount between the mesh data and the correction reference surface, then removing the mesh data in an area where the detected normal change amount is equal to or more than a predetermined threshold, and creating new mesh data in a portion from which the mesh data has been removed.

The input reception unit 271*a* can also receive designation of an unnecessary area included in the mesh data acquired by the data acquisition unit 291. The unnecessary area is, for example, a hole area, a protruding area, or the like. In this case, the correction unit 275 corrects the mesh data acquired by the data acquisition unit 291 by removing the mesh data of an area included in the unnecessary area received by the input reception unit 271*a* and having a deviation between the mesh data acquired by the data acquisition unit 291 and the correction reference surface, and creating new mesh data in a portion from which the mesh data has been removed.

When the correction unit 275 executes the mesh data correction processing, first, the correction unit 275 determines whether the mesh data is included in an area where the input reception unit 271*a* has received the user input for extracting the correction reference surface. When determining that the mesh data is not included in the area received by the input reception unit 271*a*, the correction unit 275 can stop the correction of the mesh data acquired by the data acquisition unit 291.

The correction unit 275 may correct the mesh data acquired by the data acquisition unit 291 by removing the mesh data of an area continuously extending to the correction reference surface from a point received as the unnecessary area by the input reception unit 271*a*, and creating new mesh data in a portion from which the mesh data has been removed.

The input reception unit 271*a* can also receive inputs of a plurality of the correction reference surfaces. That is, the input reception unit 271*a* can receive a first user input for extracting a first surface as a first correction reference surface, a second user input for extracting a second surface facing the first surface at an interval as a second correction reference surface, and designation of a through-hole area existing between the first surface and the second surface.

When receiving the first user input and the second user input, the reference surface extraction unit 271*f* extracts the first correction reference surface from the mesh data acquired by the data acquisition unit 291 based on the first user input, and extracts the second correction reference surface from the mesh data acquired by the data acquisition unit 291 based on the second user input. Thereafter, the correction unit 275 detects a deviation between the mesh data acquired by the data acquisition unit 291 and each of the first correction reference surface and the second correction reference surface. Next, the correction unit 275 corrects the mesh data acquired by the data acquisition unit 291 by removing the mesh data of an area that is included in the through-hole area received by the input reception unit 271*a* and has the deviation, and creating new mesh data in a portion from which the mesh data has been removed.

The correction unit 275 may correct the mesh data acquired by the data acquisition unit 291 by removing the mesh data of an area continuously extending to the first correction reference surface and the second correction reference surface from a point received as the unnecessary area by the input reception unit 271a, and creating new mesh data in a portion from which the mesh data has been removed.

Hereinafter, a specific example of the correction processing will be described with reference to a flowchart. In Step S101 after the start of a flowchart illustrated in FIG. 42, a correction reference surface is extracted. Specifically, as illustrated in a flowchart of FIG. 43, a geometric element is extracted in Step SU1. The same geometric element extraction technique as that illustrated in the flowchart of FIG. 20 is used. In Step SU2, a deviation between the mesh data and the correction reference surface is detected, and a polygon is selected from the deviation from the correction reference surface. In Step SU3, a type of the geometric element and the selected mesh data are registered. In Step SU4, it is determined whether or not there is a through polygon. The flow returns to Step SU1 in a case where there is a through polygon, and ends the extraction of the correction reference surface in a case where there is no through polygon. Note that the geometric element for determining the correction reference surface includes a cylinder, a cone, a sphere, a torus, and the like in addition to a plane.

Figure 42:
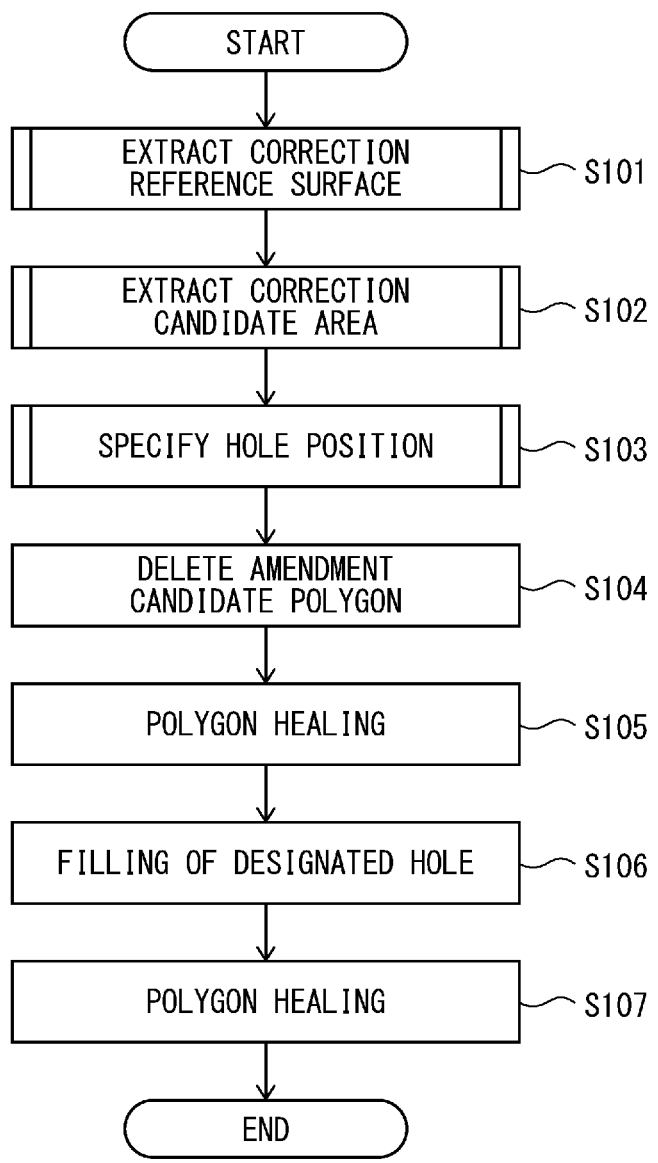
FIG. 42 is a flowchart illustrating an example of a correction processing procedure.
Figure 43:
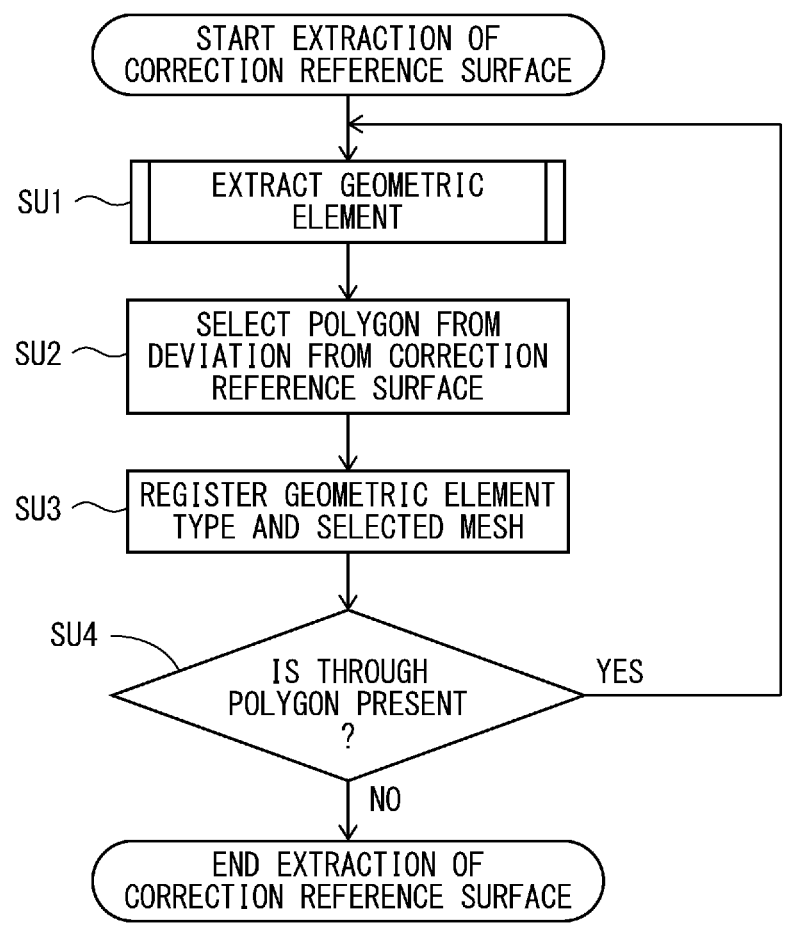
FIG. 43 is a flowchart illustrating an example of a correction reference surface extraction processing procedure.
Figure 44:
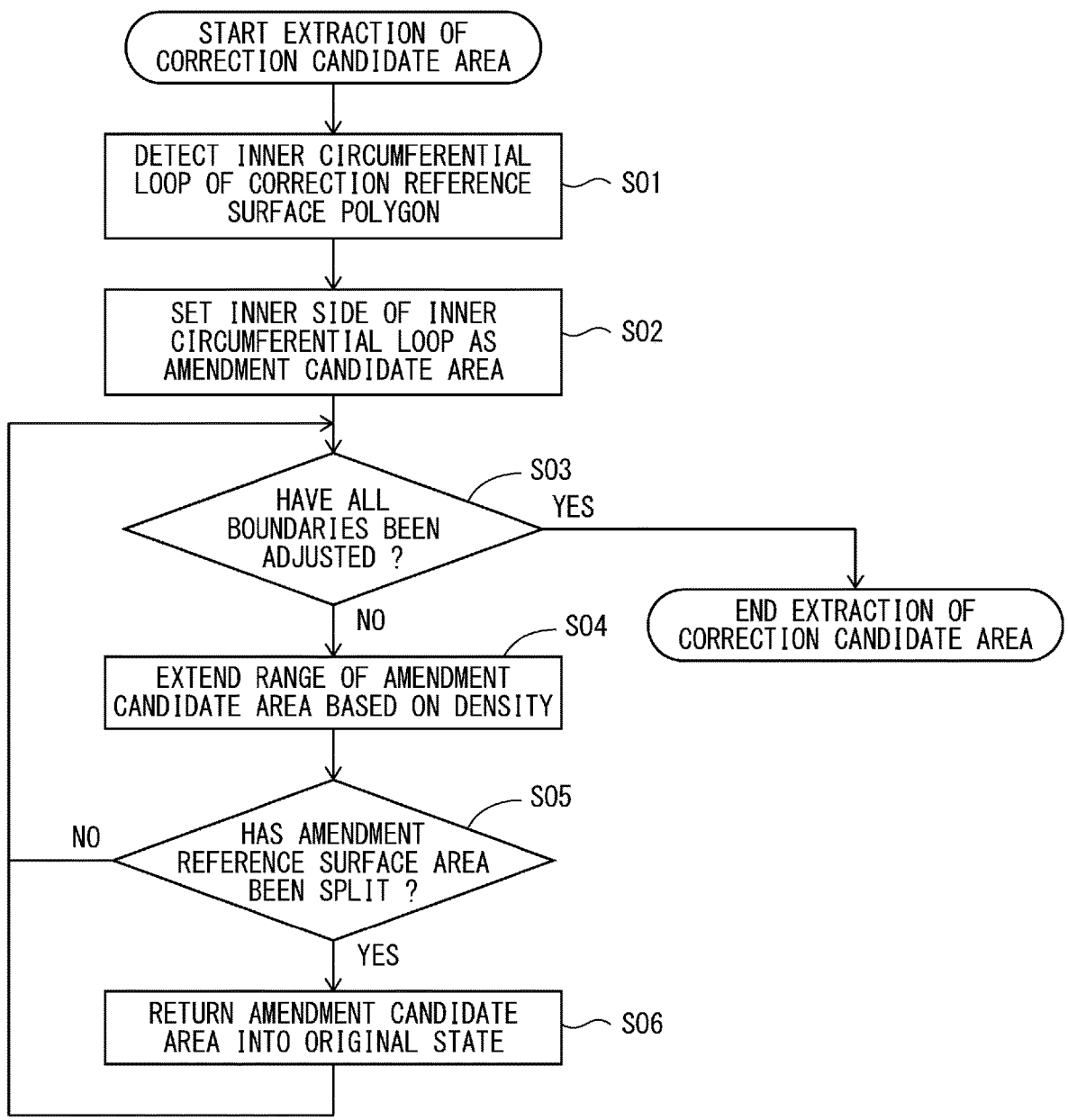
FIG. 44 is a flowchart illustrating an example of an amendment candidate area extraction processing procedure.

Next, the flow proceeds to Step S102 in FIG. 42. In Step S102, an amendment candidate area is extracted. Specifically, as illustrated in a flowchart of FIG. 44, in Step S01, an inner circumferential loop of a polygon constituting the correction reference surface is detected. In Step SO2, the inner side of the inner circumferential loop detected in Step SO1 is set as the amendment candidate area. In Step S03, it is determined whether or not all boundaries have been adjusted. The processing proceeds to Step SO4 in a case where all the boundaries have not been adjusted, or is ended in a case where all the boundaries have been adjusted. In Step SO4, a range of the amendment candidate area is extended based on the density. In Step S05, it is determined whether or not the correction reference surface area has been split. The flow proceeds to Step SO6 in a case where the correction reference surface area has been split, or returns to Step SO3 in a case where the correction reference surface area is not split. In Step SO6, the amendment candidate area is returned to the original state. As data for specifying the amendment candidate area, there are a boundary edge connected to the correction reference surface, a polygon and a vertex connected to a correction reference surface polygon, and the like, and these are held.

Figure 45:
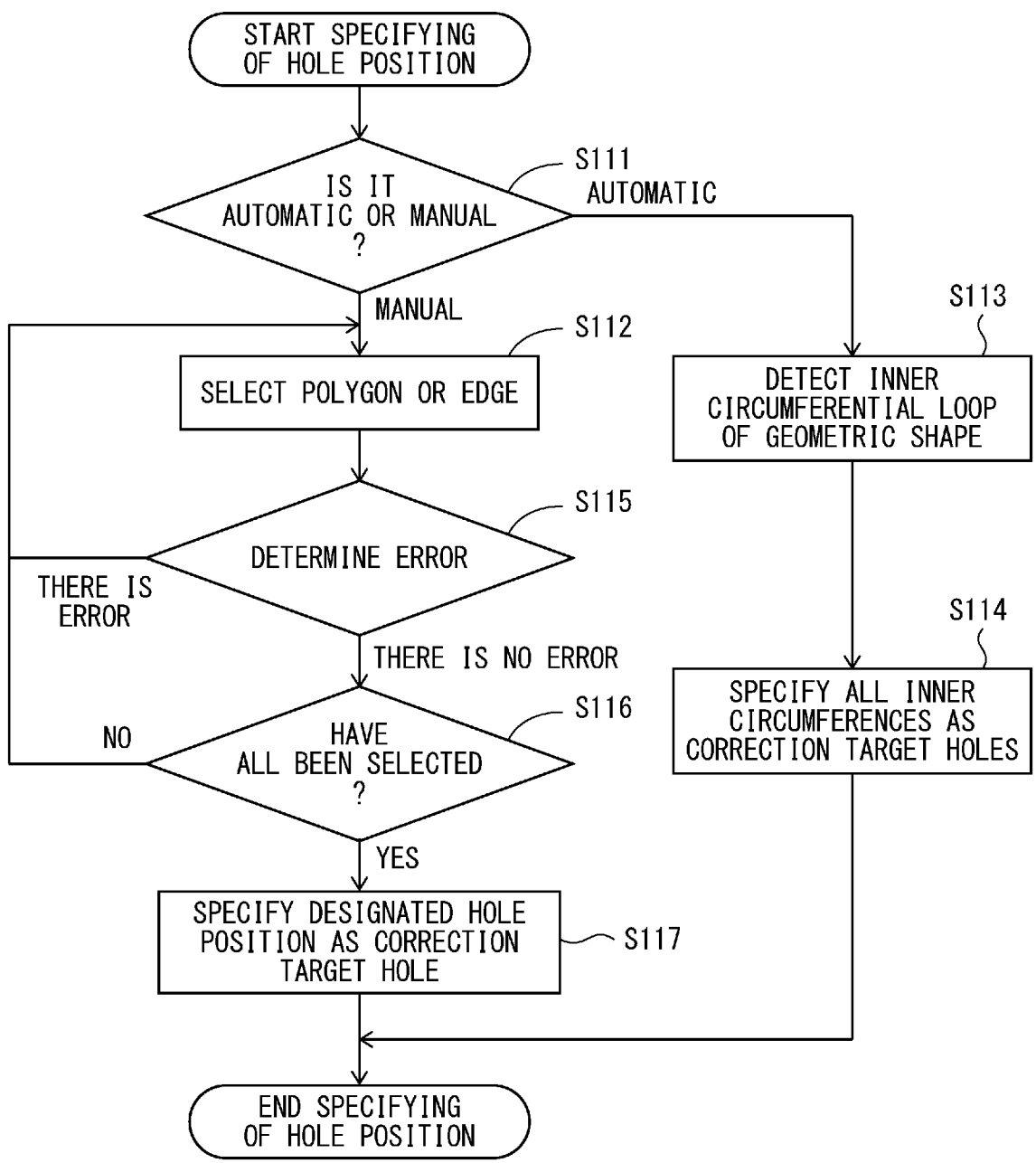
FIG. 45 is a flowchart illustrating an example of a hole position specifying processing procedure.

Next, the flow proceeds to Step S103 in FIG. 42. In Step S103, a hole position is specified. Specifically, as illustrated in the flowchart of FIG. 45, it is determined in Step S111 whether the specifying of the hole position is automatic or manual. The flow proceeds to Step S112 in the manual case, or proceeds to Step S113 in the automatic case. In Step S113, an inner circumferential loop of a geometric shape is detected. Thereafter, in Step S114, all of inner circumferences are specified as correction target holes, and the flow ends. Examples of data for specifying the hole position include a boundary edge of the amendment candidate area, a polygon and a vertex of the amendment candidate area, and the like, and these data are held.

In Step S112, a polygon or an edge is selected. In Step S115, an error is determined. The flow proceeds to Step S116 if there is no error, or returns to Step S112 if there is an error. In Step S116, it is determined whether all have been selected. The flow returns to Step S112 if all have not been selected, or proceeds to Step S117 if all have been selected. In Step S117, a designated hole position is specified as a correction target hole, and this processing is ended.

Next, the flow proceeds to Step S104 in FIG. 42. In Step S104, the polygon as the amendment candidate is deleted. In Step S105, polygon healing is executed. Specifically, an invalid mesh is removed by removing self-intersection, removing a non-manifold mesh, and deleting a minute mesh. In Step S106, the designated hole is filled. Thereafter, in Step S107, the polygon healing is executed again. The polygon healing only needs to be performed as necessary.

Figure 46:
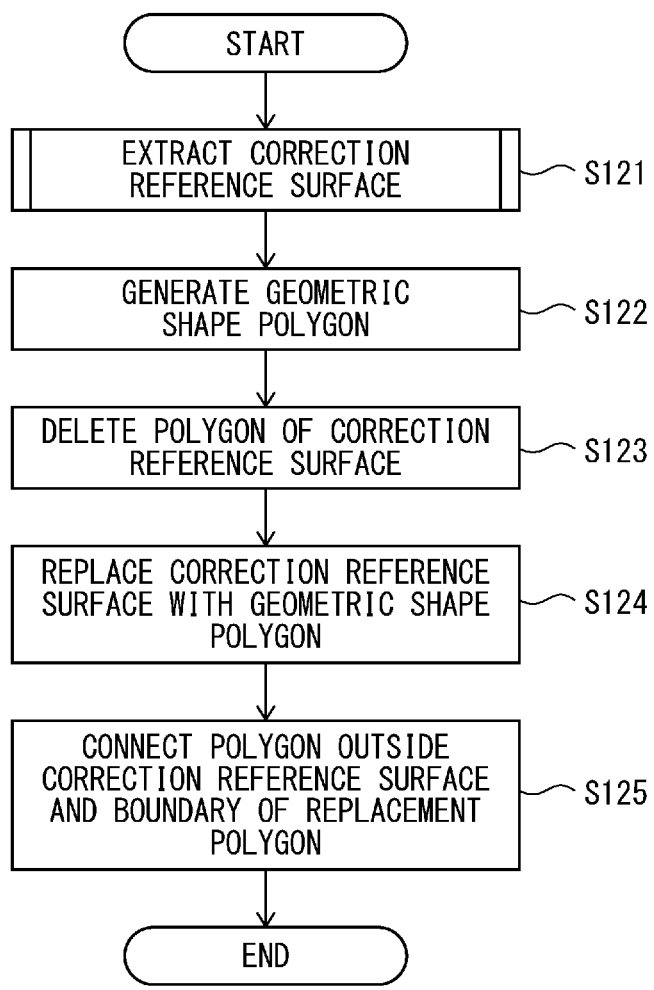
FIG. 46 is a flowchart illustrating an example of a mesh data replacement processing procedure.

FIG. 46 is a flowchart illustrating a procedure in a case where a polygon included in a correction reference surface is deleted and the deleted portion is replaced with a geometric shape polygon. In Step S121, the correction reference surface is extracted. This is similar to Step S101 in FIG. 42. In Step S122, the geometric shape polygon is generated. In Step S123, the polygon of the correction reference surface is deleted. In Step S124, the correction reference surface is replaced with the geometric shape polygon. In Step S125, processing of connecting a boundary between a polygon outside the correction reference surface and the replacement polygon replaced in Step S124 is executed.

Figure 47A:
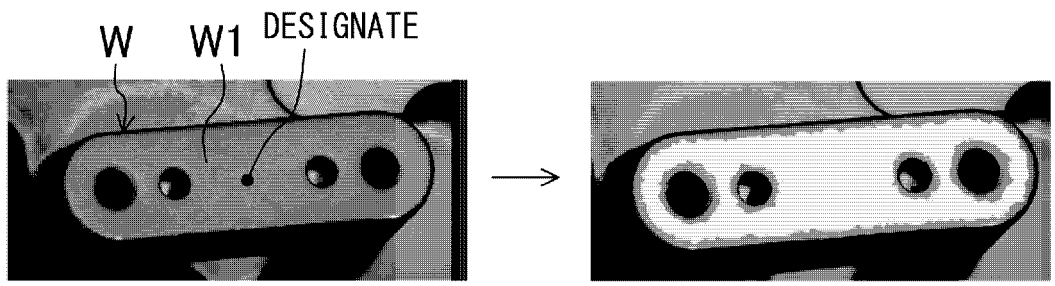
FIGS. 47A and 47B are views illustrating examples of selection of an area.
Figure 47B:
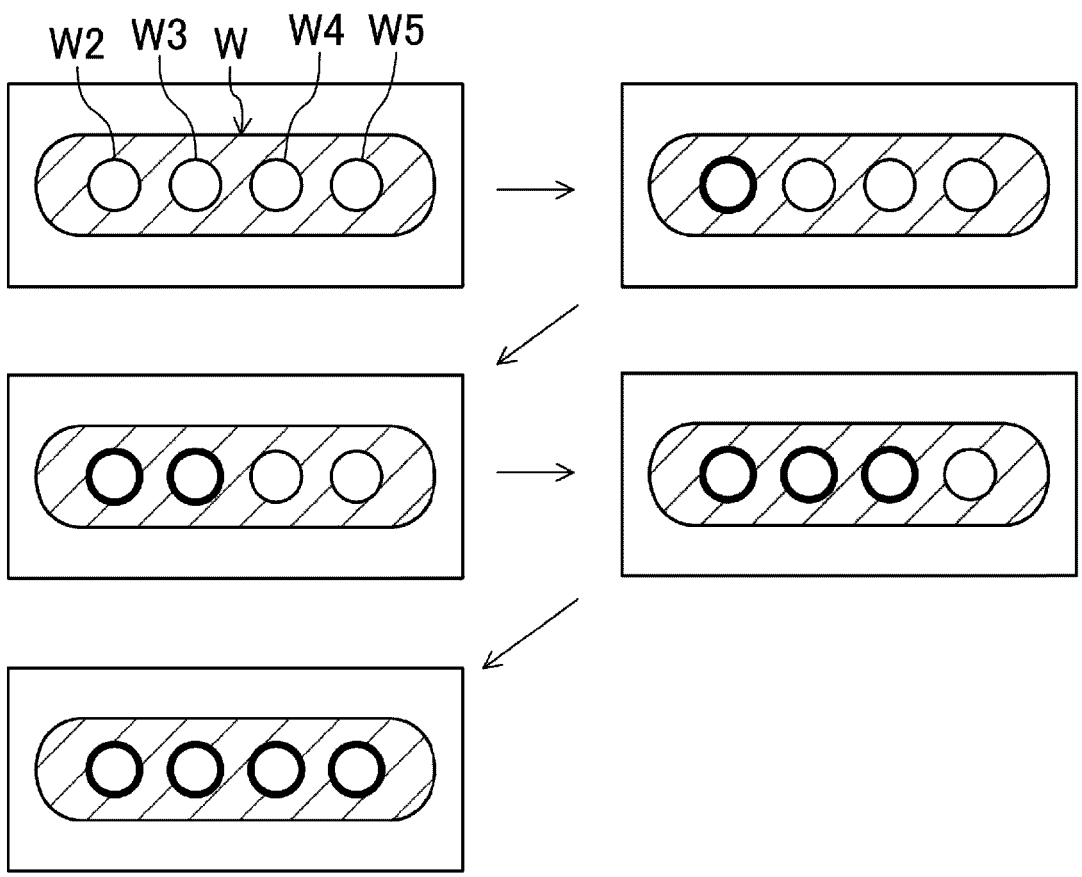

FIGS. 47A and 47B are views illustrating an area selection example, and FIG. 47A illustrates a case where a planar portion W1 of the workpiece W has been designated by the operation unit 250. When the planar portion W1 is designated by the operation unit 250, a planar area continuous from the designated spot is automatically selected and displayed on the display unit 400. Specifically, a color of the planar area is changed before and after the selection. Note that a cylindrical area, a spherical area, a conical area, and the like other than the planar area can be designated in the same manner.

FIG. 47B illustrates a case where four hole portions W2 to W5 of the workpiece W have been designated as deletion candidate areas by the operation unit 250. When the hole portion W2 is designated, the hole portion W2 is displayed on the display unit 400 in a designated state. Similarly, each time the hole portion W3, the hole portion W4, and the hole portion W5 are designated in order, the display of the display unit 400 is updated, such that the designated state can be easily understood. Specifically, a color of the selected hole portion changes before and after the designation operation. When the hole portion penetrates through the workpiece W, a hole portion that is opened on the back surface can also be automatically designated.

Figure 48A:
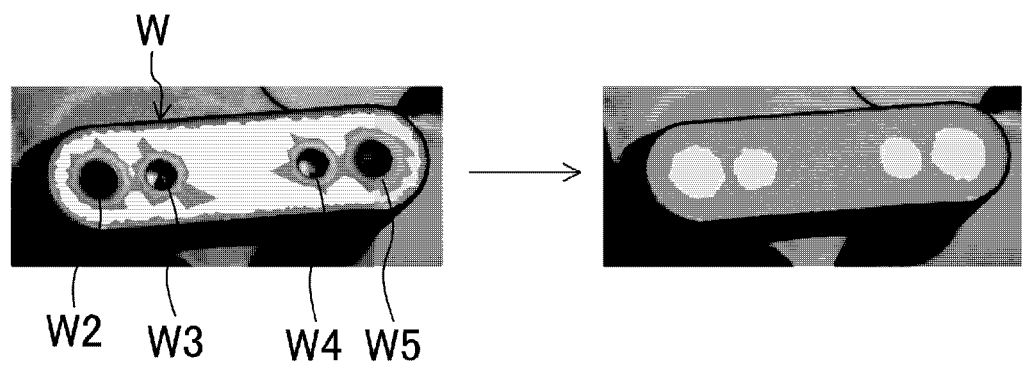
FIGS. 48A and 48B are views illustrating examples of filling.
Figure 48B:
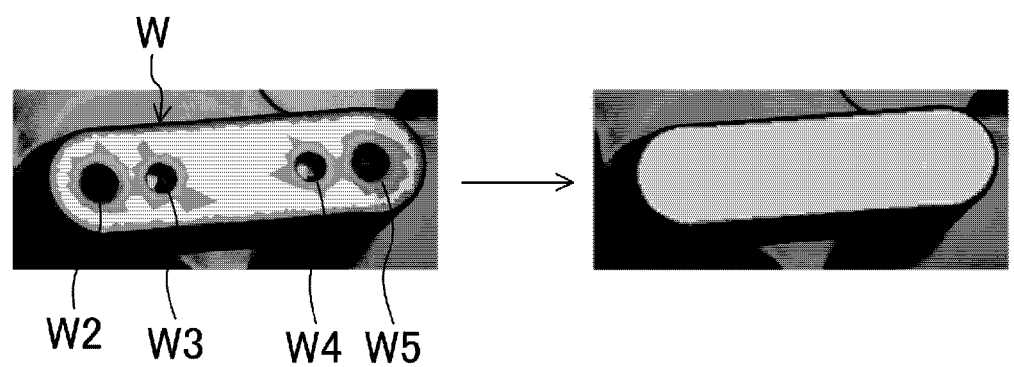

FIGS. 48A and 48B are views illustrating examples of filling. FIG. 48A illustrates a case where the hole portions W2 to W5 of the plane of the workpiece W are filled, and a state in which the hole portions W2 to W5 are filled can be displayed on the display unit 400 after the planar portion and the hole portions W2 to W5 are designated. FIG. 48B illustrates a case where the plane of the workpiece W is replaced with a planar polygon, and a state of being replaced with the planar polygon can be displayed on the display unit 400.

In addition to changing the polygon acquired by measuring the workpiece W to the amendment polygon, the polygon obtained by the measurement may be imparted with a status of "planarizing after conversion into CAD data" and replaced with a planar element after the CAD data conversion. For example, for polygon data including noise or the like, ID information of a geometric element (a plane, a cylinder, or the like) can be imparted to vertex or surface information of a selected area, and the polygon data can be amended to a complete geometric shape such as a plane or a cylinder with reference to the ID information after surface conversion.

A specific example of filling will be described. In a case where the correction reference surface is a plane, filling can be performed either by replacement with a planar polygon or by position-continuous filling, which may be designated by the user. In a case where the correction reference surface is a cylinder, filling can be performed by either replacement with a cylindrical polygon or curvature-continuous filling. In a case where the correction reference surface is a cone, filling can be performed by either replacement with a conical polygon or curvature-continuous filling. In a case where the correction reference surface is a sphere, filling can be performed by either replacement with a spherical polygon or curvature-continuous filling. In a case where the correction reference surface is a torus (annular surface), filling can be performed by either replacement with a torus polygon or curvature-continuous filling. In a case where the correction reference surface is a free curved surface, filling can be performed by any method of position-continuous filling, tangential-continuous filling, and curvature-continuous filling.

As an example of the error processing when an error has occurred, it is configured such that geometric shape extraction is canceled in a case where a geometric shape does not exist at a position designated by the user. For example, execution of cylinder extraction with respect to a plane performed by the user or the like is canceled. Further, when no polygon exists at the position designated by the user or when an orientation (normal) of a selected polygon is directed backward due to designation of a hole position, the polygon is not selected. That is, the correction unit 275 determines the orientation of the polygon present in the area where the input reception unit 271a has received the user input for extracting the correction reference surface. When determining that the orientation of the polygon of the area is directed backward, the correction unit 275 stops the correction of the mesh data acquired by the data acquisition unit 291. Here, the determination as to whether the orientation of the polygon is directed backward can be made, for example, by determining whether the orientation of the normal of the correction reference surface and the orientation of the normal of the polygon have a predetermined angle or more. Further, the correction unit 275 may cancel the geometric shape extraction based on the continuity with the inner circumferential loop. That is, when a polygon discontinuous with the inner circumferential loop is selected, no polygon is selected. As a result, it is possible to suppress the entire polygon from being selected by selecting a polygon at the back side due to a polygon defect.

In a case where another polygon protrudes from the back side after a surface polygon has been deleted at the time of filling, it is possible to issue a warning for interference with the polygon at the back side to the user such that the user can select whether to delete the polygon at the back side or cancel the polygon replacement. Further, during the polygon replacement, a problem may occur when a geometric shape polygon has been actually generated. For example, when adjacent polygons intersect with each other, healing processing of deforming the polygon at the boundary of the amendment polygon to solve the problem is executed.

That is, there is a case where it is possible to distinguish between an area that is a normal area and does not require the filling processing and an area that is an incomplete area and requires the filling processing when the user looks at mesh data. In the case of conventional filling processing or smoothing function, an incomplete area is corrected by designating the incomplete area. However, in the present aspect, the user input for extracting a correction reference surface can be performed on the normal area such that the normal area is extracted as the correction reference surface. As a result, the normal area is automatically extracted from the mesh data as the correction reference surface. When the extracted correction reference surface is used as a reference, it is possible to specify the incomplete area in the mesh data. When this incomplete area is automatically corrected by the correction unit 275 based on the normal area extracted as the correction reference surface, the filling processing with no personal characteristics and good finish quality is performed in a short time.

(CAD Conversion Function in Consideration of Coordinate System)

The reverse engineering system 1 has a function of converting data as a CAD conversion target to which a certain coordinate system has been assigned into CAD data. To give a description based on the block diagram illustrated in FIG. 5, the input reception unit 271a is configured to be capable of receiving selection of the CAD conversion target data from mesh data acquired by the data acquisition unit 291, and receiving selection of a shape of a geometric element extracted from the mesh data acquired by the data acquisition unit 291 and a point on the mesh data. Furthermore, the input reception unit 271a can receive area selection of mesh data as the CAD conversion target from the mesh data acquired by the data acquisition unit 291.

A data specifying unit 271g specifies the CAD conversion target data from the mesh data based on the data selected by the input reception unit 271a. Specifically, the data specifying unit 271g specifies a geometric element extracted based on designation of the shape of the geometric element and the point received by the input reception unit 271a as the CAD conversion target data. When the input reception unit 271a has received area selection, the data specifying unit 271g specifies the mesh data included in the area as the CAD conversion target data based on the area selection received by the input reception unit 271a. Here, in a case where the area selection is received to specify the CAD conversion target data, for example, mesh data included in a specific area may be specified as the CAD conversion target data by receiving a user input surrounding the area, or mesh data existing on one side with respect to a straight line may be specified as the CAD conversion target data based on a positional relationship between the straight line and the point by receiving user inputs of the straight line and the point.

A coordinate system assignment unit 271h assigns one coordinate system to the CAD conversion target data specified by the data specifying unit 271g. At this time, the conversion area designation user interface screen 700 having the coordinate system selection area 703 as illustrated in FIG. 13 can be displayed on the display unit 400. As a result, the user can select an area and set the coordinate system associated with the area. The image display area 701 on the conversion area designation user interface screen 700 is a mesh data display area displaying the mesh data. Further, the coordinate system selection area 703 is a coordinate system assignment area in which a coordinate system assignment operation can be performed. An area where the buttons 702a to 702e are displayed is a data extraction setting area where data extraction of the CAD conversion target can be set.

The CAD conversion unit 273 converts the CAD conversion target data to which one coordinate system has been assigned by the coordinate system assignment unit 271h into CAD data. The coordinate system assignment unit 271h is configured to assign one coordinate system, different from a coordinate system for display to be displayed on the display unit 400, to the CAD conversion target data specified by the data specifying unit 271g. The coordinate system of the CAD data output as a result of the reverse engineering does not necessarily coincide with the coordinate system of the CAD conversion target data displayed on the display unit 400. When the user designates a coordinate system before the conversion into the CAD data, it is possible to select the coordinate system suitable for a design independently of the coordinate system to be displayed on the display unit 400.

The input reception unit 271a may be configured to be capable of receiving selection of a plurality of pieces of data. That is, the input reception unit 271a can receive selection of first CAD conversion target data and selection of second CAD conversion target data. In this case, the data specifying unit 271g specifies first CAD conversion target data from the mesh data based on the first CAD conversion target data selected by the input reception unit 271a, and specifies second CAD conversion target data from the mesh data based on the second CAD conversion target data. Then, the coordinate system assignment unit 271h assigns a first coordinate system to the first CAD conversion target data specified by the data specifying unit 271g, and assigns a second coordinate system to the second CAD conversion target data specified by the data specifying unit 271g. Each of the coordinate systems of the CAD data output as results of the reverse engineering does not necessarily coincide with the coordinate system of the CAD conversion target data displayed on the display unit 400. When the user designates a coordinate system before the conversion into CAD data for each piece of the CAD conversion target data to be output as the CAD data, it is possible to select the coordinate system suitable for a design independently of the coordinate system to be displayed on the display unit 400.

The coordinate system assigned by the coordinate system assignment unit 271h is stored in the storage apparatus 240. The storage apparatus 240 stores the first coordinate system assigned to the first CAD conversion target data and relative position and attitude of the first coordinate system with respect to a global coordinate system in association with each other. Furthermore, the storage apparatus 240 stores the second coordinate system assigned to the second CAD conversion target data and relative position and attitude of the second coordinate system with respect to the global coordinate system in association with each other.

The CAD conversion unit 273 converts the first CAD conversion target data into first CAD data based on the relative position and attitude of the first coordinate system with respect to the global coordinate system. Further, the CAD conversion unit 273 converts the second CAD conversion target data into second CAD data based on the relative position and attitude of the second coordinate system with respect to the global coordinate system. Then, the CAD conversion unit 273 generates CAD data in which the first CAD data and the second CAD data are assembled. In the assembled CAD data generated here, relative positions and attitudes with respect to the global coordinate system are assigned to the first CAD data and the second CAD data included in the assembly, respectively. Therefore, the assembled CAD data is generated in a state in which the relative positions and attitudes of the first CAD conversion target data and the second CAD conversion target data selected from the mesh data acquired by the data acquisition unit 291 are held.

In a case where the relative position and attitude of the first coordinate system with respect to the global coordinate system and the relative position and attitude of the second coordinate system with respect to the global coordinate system are not associated with each other, CAD data generated by the CAD conversion unit 273 is displayed on the display unit in a state in which origins of the respective coordinate systems overlap. Therefore, the original positional relationship between the first CAD data and the second CAD data becomes unknown. However, since the relative position and attitude of the first coordinate system with respect to the global coordinate system are associated with the relative position and attitude of the second coordinate system with respect to the global coordinate system as described above, the conversion into CAD data can be performed while maintaining the original positional relationship between the first CAD data and the second CAD data.

Hereinafter, a specific example of processing will be described with reference to a flowchart. In Step S131 after the start of a flowchart illustrated in FIG. 49, the user selects a coordinate system. The coordinate system selection operation is illustrated in FIG. 50, and in Step S141, it is determined whether the coordinate system selection is automatic or manual. The flow proceeds to Step S142 in the manual case, or proceeds to Step S145 in the automatic case. In Step S142, it is determined whether or not to create a coordinate system. The flow proceeds to Step S143 in a case where a coordinate system is to be created, or proceeds to Step S144 in a case where a coordinate system is not to be created. In Step S143, a coordinate system creation unit 271i illustrated in FIG. 5 executes coordinate system creation processing in a manual mode (first mode). The coordinate system creation processing is illustrated in FIG. 51, in which geometric elements such as a plane, a cylinder, a cone, and a sphere, which serve as a source of a coordinate system, is created, and the coordinate system is created by a combination of the geometric elements.

Figure 51:
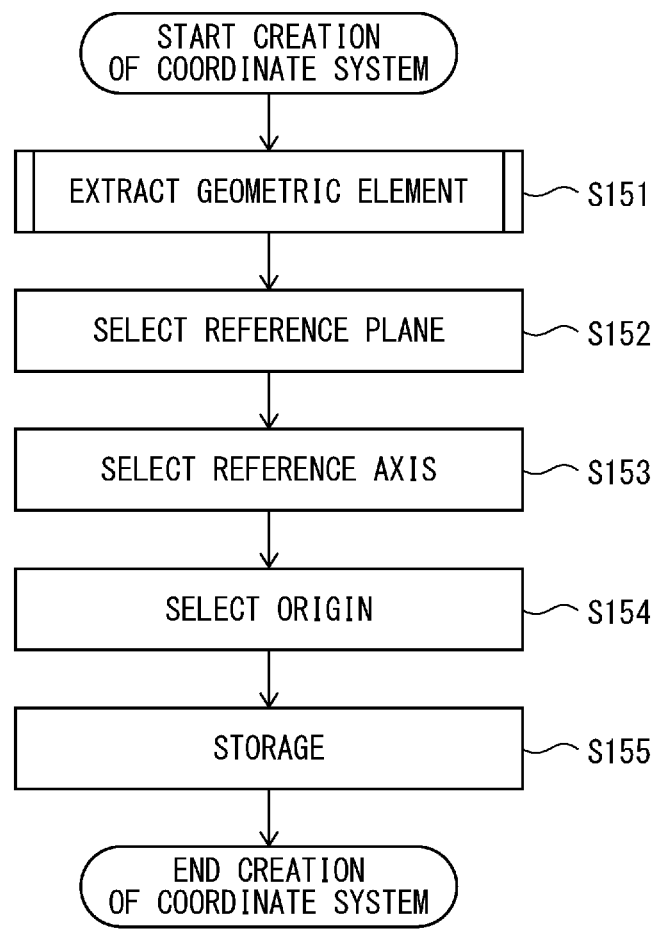
FIG. 51 is a flowchart illustrating an example of a coordinate system creation processing procedure.

That is, first, in Step S151 of FIG. 51, the geometric elements are extracted. In Step S152, the user selects a reference plane. At this time, a reference plane selection screen 780 as illustrated in FIG. 53A can be displayed on the display unit 400. Here, the reference plane selection screen 780 is an example of a coordinate system creation screen. The reference plane may be, for example, an XY plane or the like, in addition to a machining plane.

In Step S153, the user selects a reference axis. At this time, a reference axis selection screen 790 as illustrated in FIG. 53B can be displayed on the display unit 400. Here, the reference axis selection screen 790 is an example of the coordinate system creation screen. The reference axis may be, for example, an X axis or the like, in addition to a normal of a cross-sectional reference surface.

In Step S154, the user selects an origin. At this time, an origin selection screen 800 as illustrated in FIG. 53C can be displayed on the display unit 400. Here, the origin selection screen 800 is an example of the coordinate system creating screen. As the origin, for example, an arbitrarily selected point can be set as the origin, in addition to a shaft holder starting point. Then, in Step S155, the coordinate system creation unit 271i stores the created coordinate system in the storage apparatus 240.

As described above, when the creation of the coordinate system is completed by receiving the selection of the reference plane, the reference axis, and the origin on the coordinate system creation screen, the coordinate system creation unit 271i proceeds to Step S144 of FIG. 50. In Step S144, an arbitrary coordinate system is selected from the created coordinate systems stored in the storage apparatus 240, and the flow ends. When selecting a coordinate system, a user interface capable of selecting an arbitrary coordinate system from among a plurality of coordinate systems, such as the coordinate system selection area 703 of the conversion area designation user interface screen 700 illustrated in FIG. 13, is provided to the user. Then, the input reception unit 271a receives selection of the arbitrary coordinate system from among the plurality of coordinate systems. When there is no desired coordinate system in the coordinate system selection area 703, an operation input of a coordinate system creation button 705 can be received by the input reception unit 271a. When the input reception unit 271a receives the operation input of the coordinate system creation button 705, the display control unit 276 causes the display unit 400 to display the coordinate system creation screen, and the coordinate system creation unit 271i can create a new coordinate system.

In Step S145 to which the flow proceeds after it is determined to be automatic in Step S141, the coordinate system creation unit 271i executes an automatic setting of a coordinate system, and the flow ends. That is, the coordinate system creation unit 271i creates a coordinate system in an automatic mode (second mode). Here, the coordinate system creation unit 271i creates a coordinate system based on a bounding box of the CAD conversion target data. That is, when calculating a simple coordinate system, the coordinate system creation unit 271i calculates a bounding box which is a minimum rectangle or rectangular parallelepiped circumscribing the CAD conversion target data, and determines XYZ axes of the coordinate system from an attitude of the bounding box. An origin is set to the center of the bounding box or the center or a vertex of planes constituting the bounding box. Note that the origin may be settable by the user. For example, selection of one vertex from among eight vertexes of the bounding box may be received, and the vertex may be set as the origin.

Figure 49:
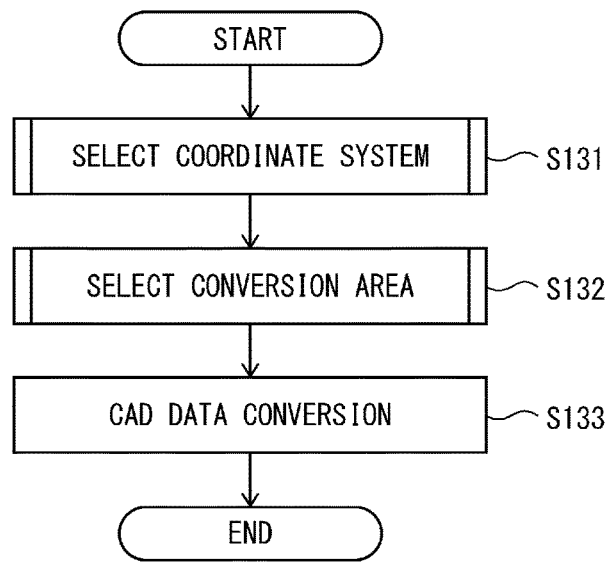
FIG. 49 is a flowchart illustrating an example of a coordinate system assignment processing procedure.
Figure 50:
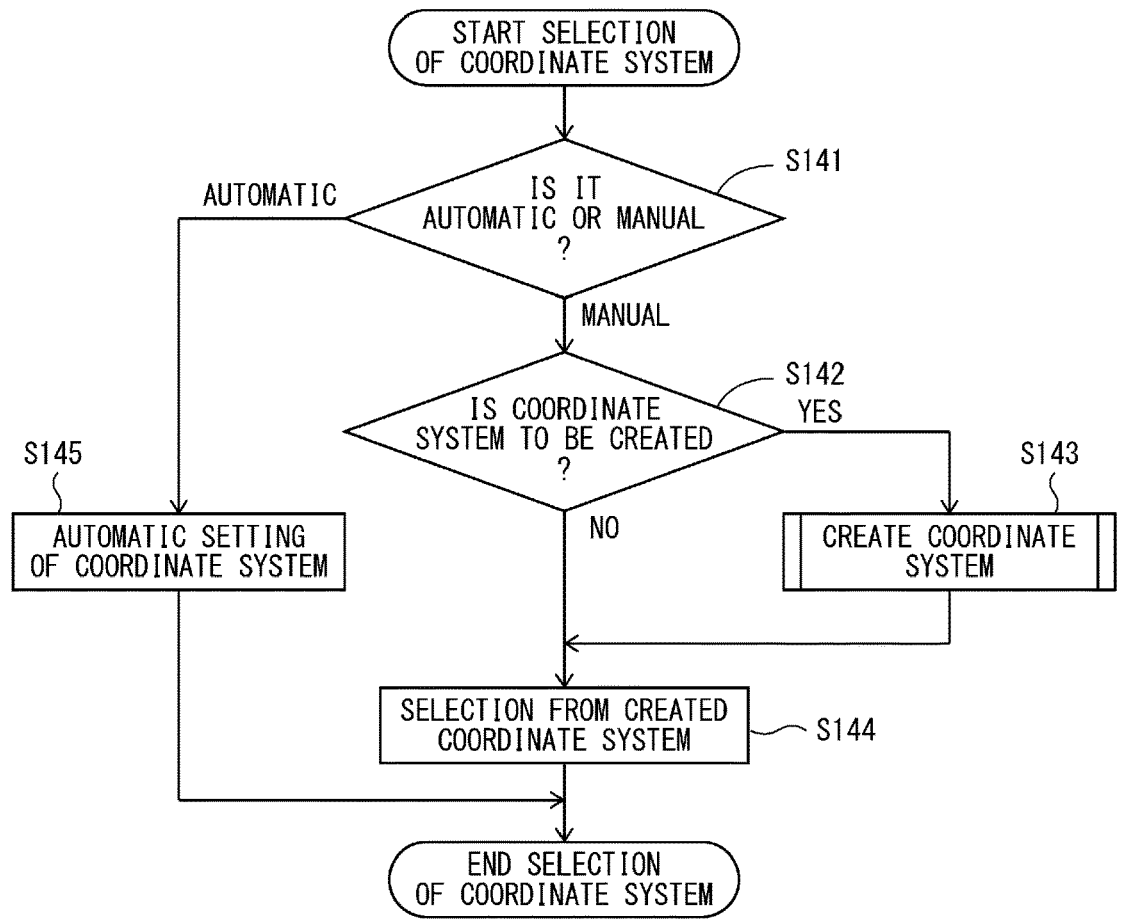
FIG. 50 is a flowchart illustrating an example of a coordinate system selection processing procedure.

Thereafter, the flow proceeds to Step S132 in FIG. 49 to select a conversion area, and then, proceeds to Step S133 to convert the conversion area into CAD data.

Figure 52:
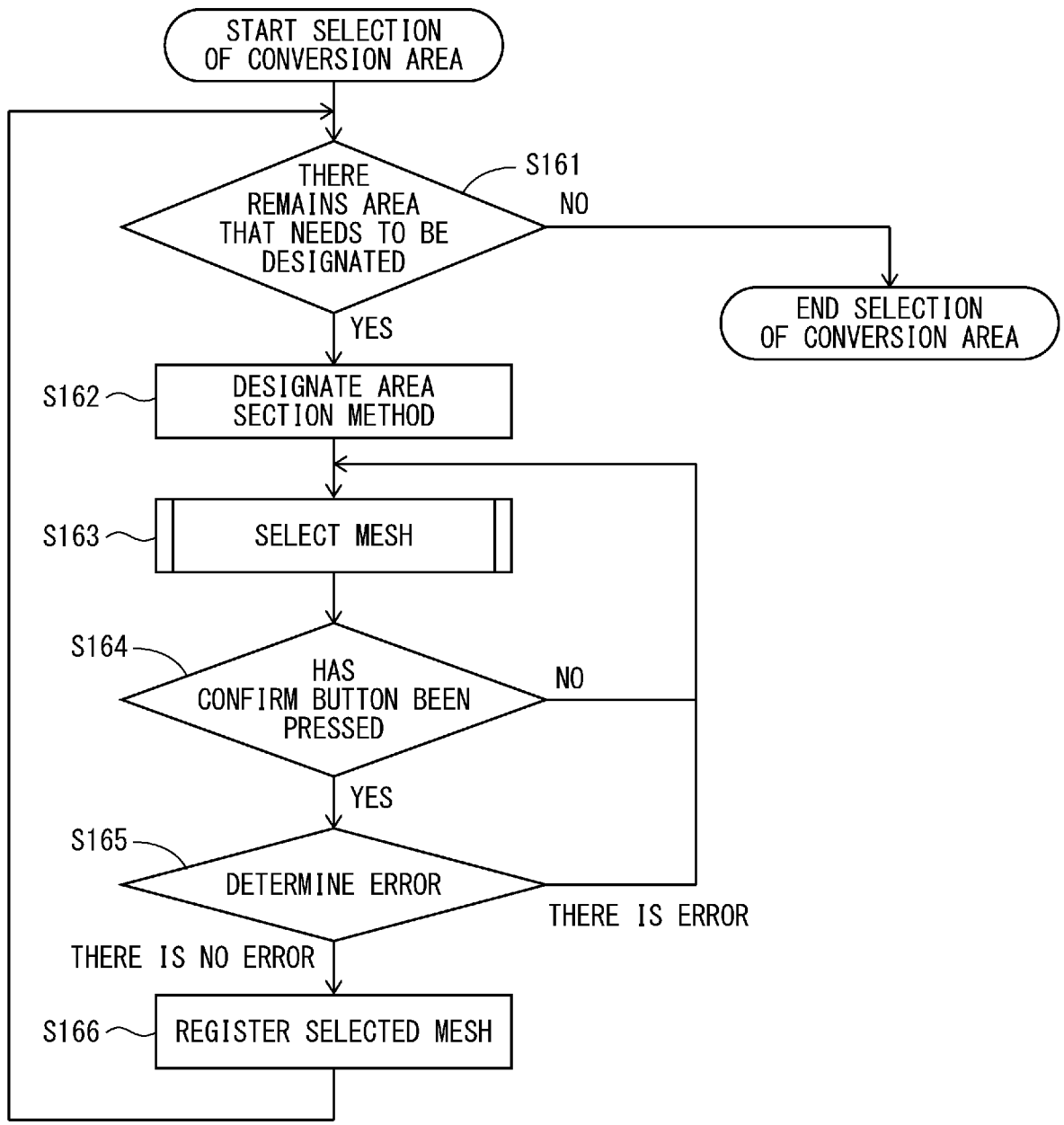
FIG. 52 is a flowchart illustrating an example of a conversion area selection processing procedure.

Further, as illustrated in FIG. 52, it may be determined whether or not there remains an area that needs to be designated in Step S161. The flow ends if there is no remaining area to be designated, or proceeds to Step S162 if there is a remaining area. In Step S162, a selection method of an area is designated. The selection method is polygon selection, a geometric shape such as a plane or a cylinder, color designation, or the like.

A mesh is selected in Step S163. Thereafter, it is determined in Step S164 whether a confirm button has been pressed. The flow returns to Step S163 in a case where the confirm button has not been pressed, or proceeds to Step S165 in a case where the confirm button has been pressed. In Step S165, an error is determined. The flow returns to Step S163 in a case where there is an error, but proceeds to Step S166 to register the selected mesh in a case where there is no error.

Figure 54:
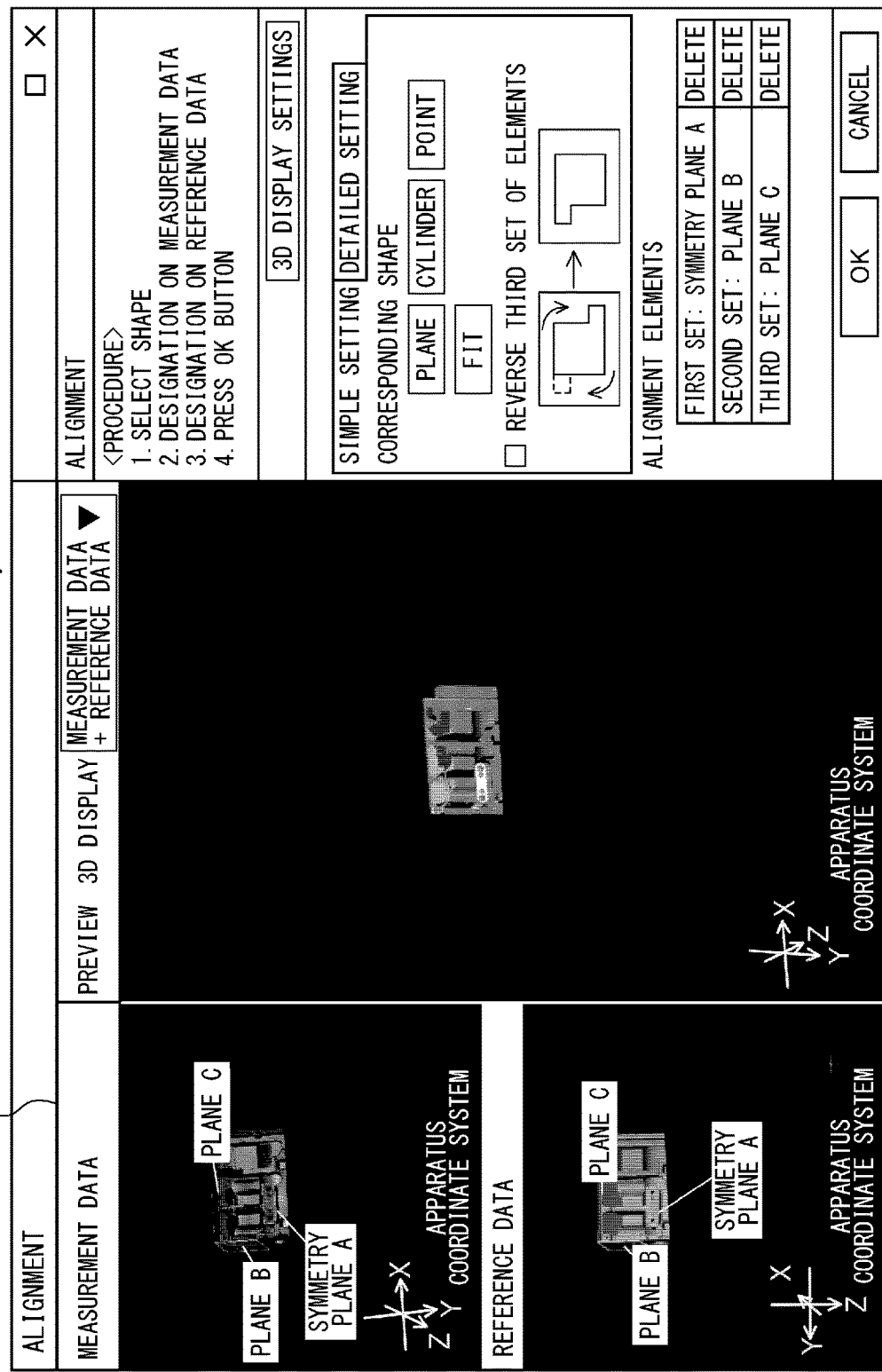
FIG. 54 is a view illustrating an example of a user interface screen that displays measurement data and reference data.

FIG. 54 illustrates a user interface screen 810 capable of displaying measurement data and reference data. The user interface screen 810 is provided with a measurement data display area 811 for displaying the measurement data, a reference data display area 812 for displaying the reference data serving as an alignment reference, and a preview area 813. At least one of the measurement data or the reference data is displayed in the preview area 813. Both the measurement data and the reference data can also be displayed in the preview area 813. In this case, the input reception unit 271a receives designation of a corresponding surface between the measurement data and the reference data. Then, the display control unit can display synthetic data obtained by executing alignment processing between the measurement data and the reference data based on a transformation matrix of a coordinate system of the measurement data and a coordinate system of the reference data calculated based on the designation of the corresponding surface received by the input reception unit 271a.

Figure 55:
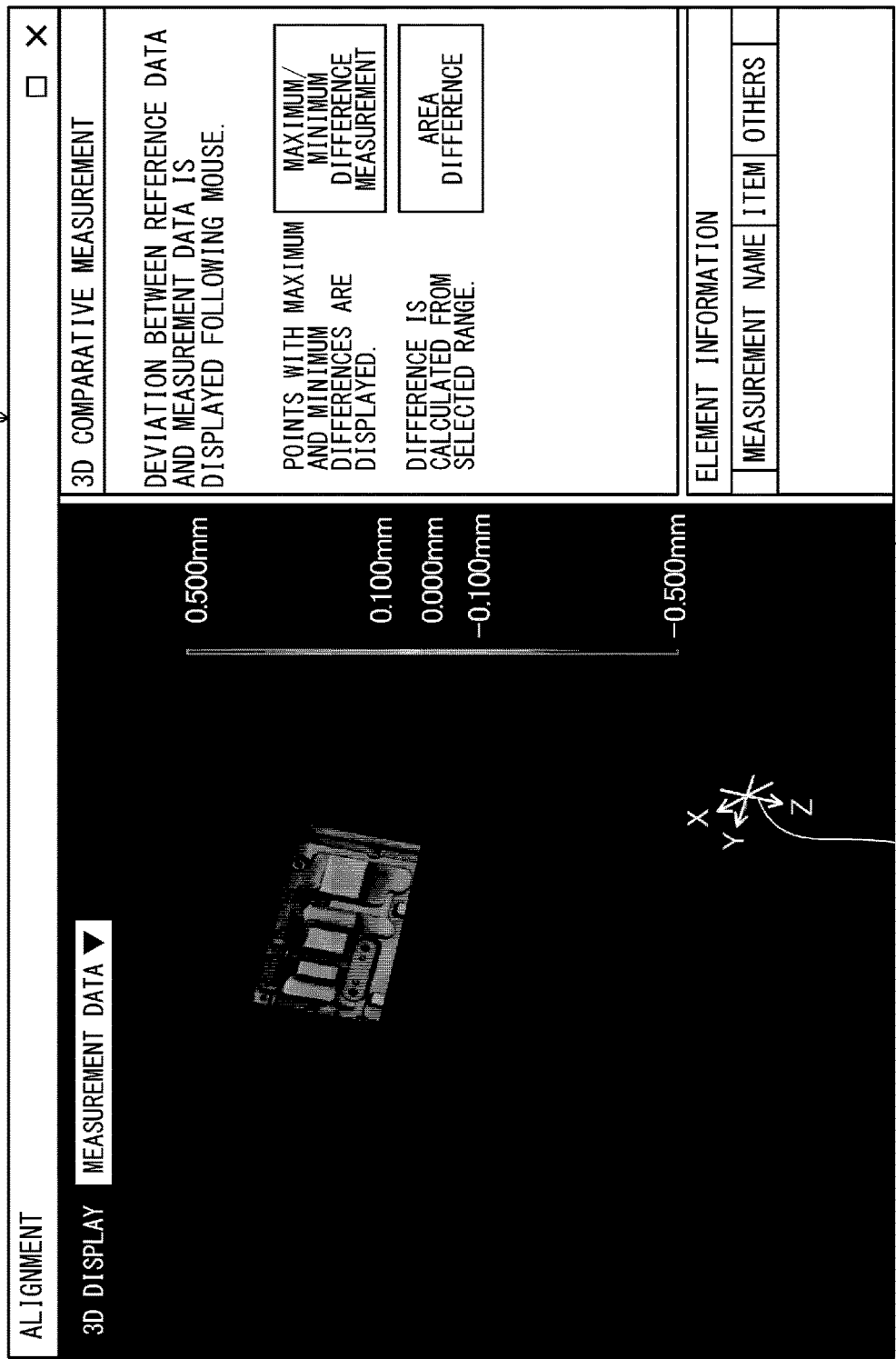
FIG. 55 is a view illustrating an example of a user interface screen illustrating a state in which alignment between the measurement data and the reference data is completed.

FIG. 55 illustrates a user interface screen 820 illustrating a state in which alignment between the measurement data and the reference data is completed. The user interface screen 820 is provided with a display area 821 in which data after alignment is displayed. In the display area 821, a coordinate system 821a of the CAD data is illustrated. Further, as illustrated in FIG. 55, 3D comparative measurement may be possible using the data after alignment.

Data for specifying a reference plane, a reference axis, and an origin is held as data of a coordinate system (transformation matrix with respect to the measurement data coordinate system). The reference plane includes a planar element (a plane, a parallel surface, or the like), the reference axis includes an axial element (a cylinder, a cone, a surface intersection line, or the like), and the origin includes a point element (a point, an intersection point between a plane and an axis, or the like). Further, information on the selected polygon and vertex as the conversion area is also held.

It is also possible to register a different local coordinate system for each conversion area and perform CAD data conversion having one global coordinate system and a plurality of local coordinate systems+selection areas. When the global coordinate system is specified as data of the CAD data conversion, a reference plane including a planar element, a reference axis including an axial element, and an origin including a point element are included. Further, Conversion Area 1 includes a local coordinate system (coordinate transformation matrix with respect to the global coordinate system) and a selection area (selected polygon or vertex), and Conversion Area 2 includes similar information. Hereinafter, the same applies to Conversion Areas 3, 4, and so on.

(Modified Example in Case where Full-Auto CAD Conversion is Enabled)

Figure 56:
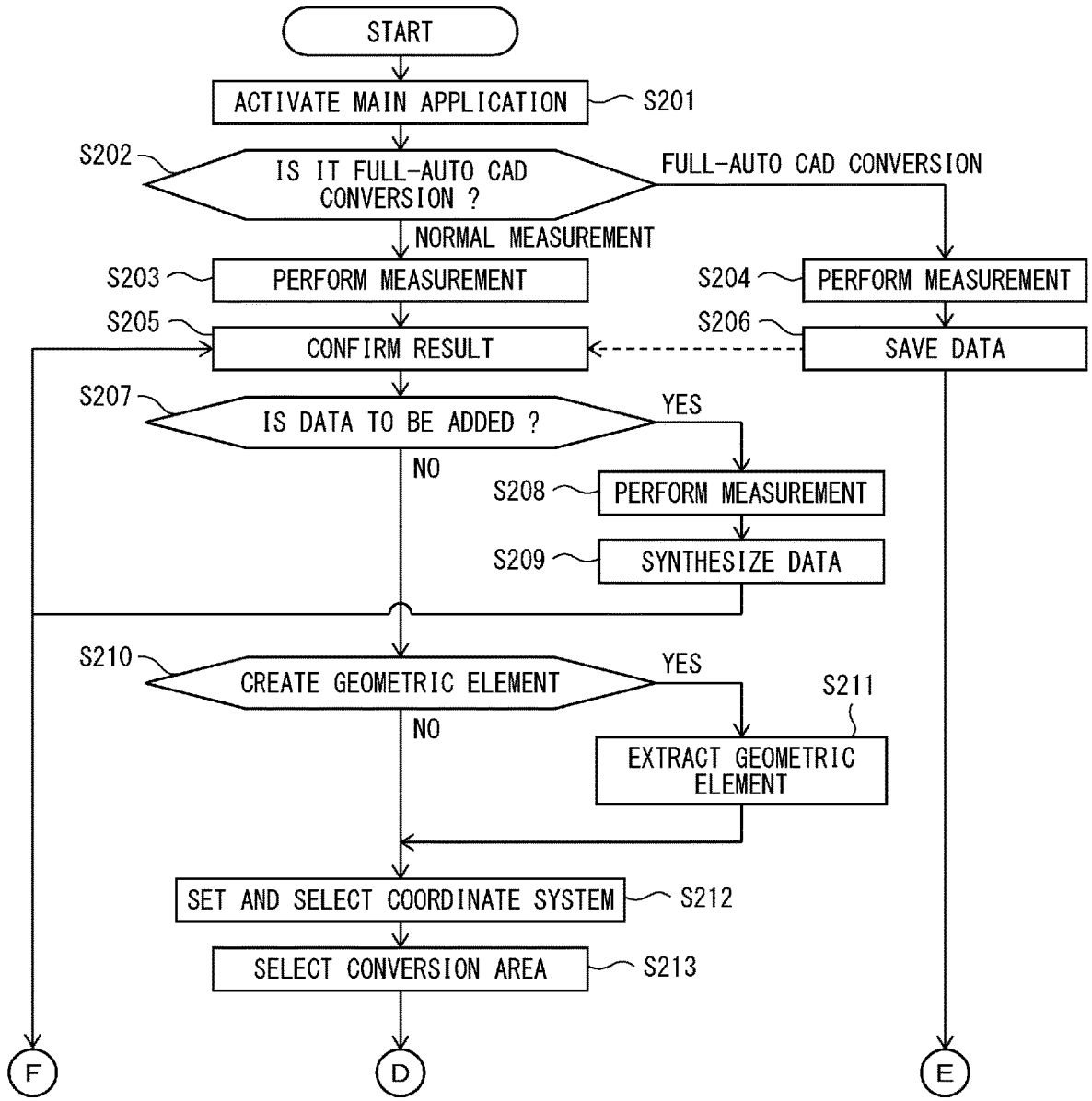
FIG. 56 is a view illustrating a first half of a flowchart illustrating an operation of a reverse engineering system according to a modification.
Figure 57:
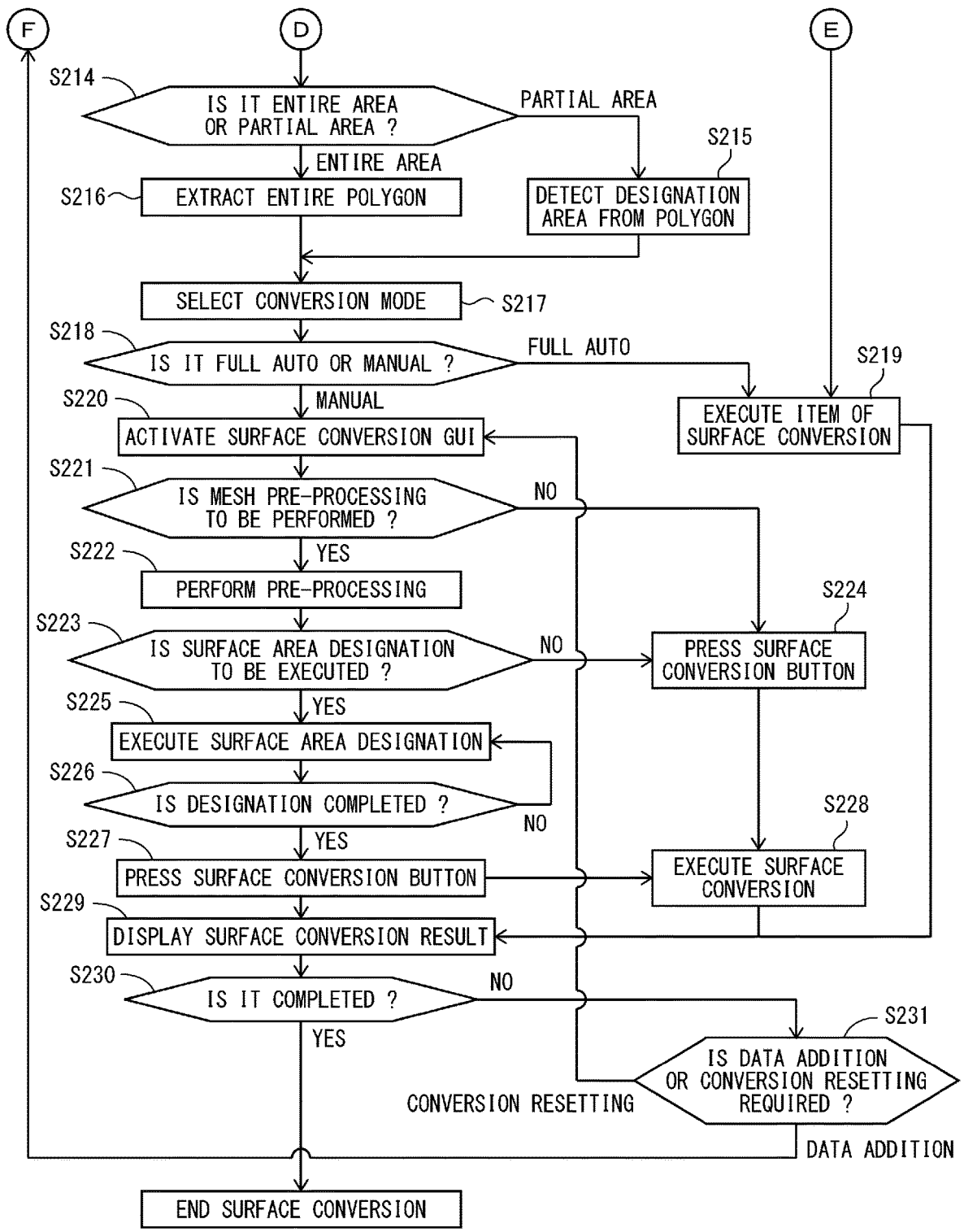
FIG. 57 is a view illustrating a second half of the flowchart illustrating the operation of the reverse engineering system according to the modification.

FIGS. 56 and 57 are flowcharts according to a modified example in a case where full-auto CAD conversion is enabled. In Step S201 after the start of FIG. 56, an analysis application as a main application is activated on the controller 200. In Step S201, it is determined whether or not to perform the full-auto CAD conversion. The flow proceeds to Step S203 as normal measurement when the full-auto CAD conversion is not to be performed, or proceeds to Step S204 when the full-auto CAD conversion is to be performed. In Steps S203 and S204, the measurement module performs measurement. In the measurement in Step S204, a plurality of pieces of measurement data obtained by performing measurement while changing a relative positional relationship between the workpiece W and the measurement unit 100 may be synthesized, and the flow may proceed to data saving in Step S206 and automatic execution of surface conversion in Step S219 after synthesizing the plurality of pieces of measurement data. In Step S205, the analysis module 290 confirms a result. In Step S206, the data is saved in the analysis module 290, and the flow proceeds to surface conversion processing in Step S219.

In Step S207, it is determined whether or not to add data. In a case where data is to be added, the flow proceeds to Step S208 to perform measurement, and then, proceeds to Step S209 to synthesize the data. In a case where data is not to be added, the flow proceeds to Step S210 to determine whether or not to create a geometric element. The flow proceeds to Step S211 to extract a geometric element in a case where a geometric element is to be created, or proceeds to Step S212 to set and select a coordinate system in a case where a geometric element is not to be created. In Step S213, a conversion area is selected.

Figure 59:
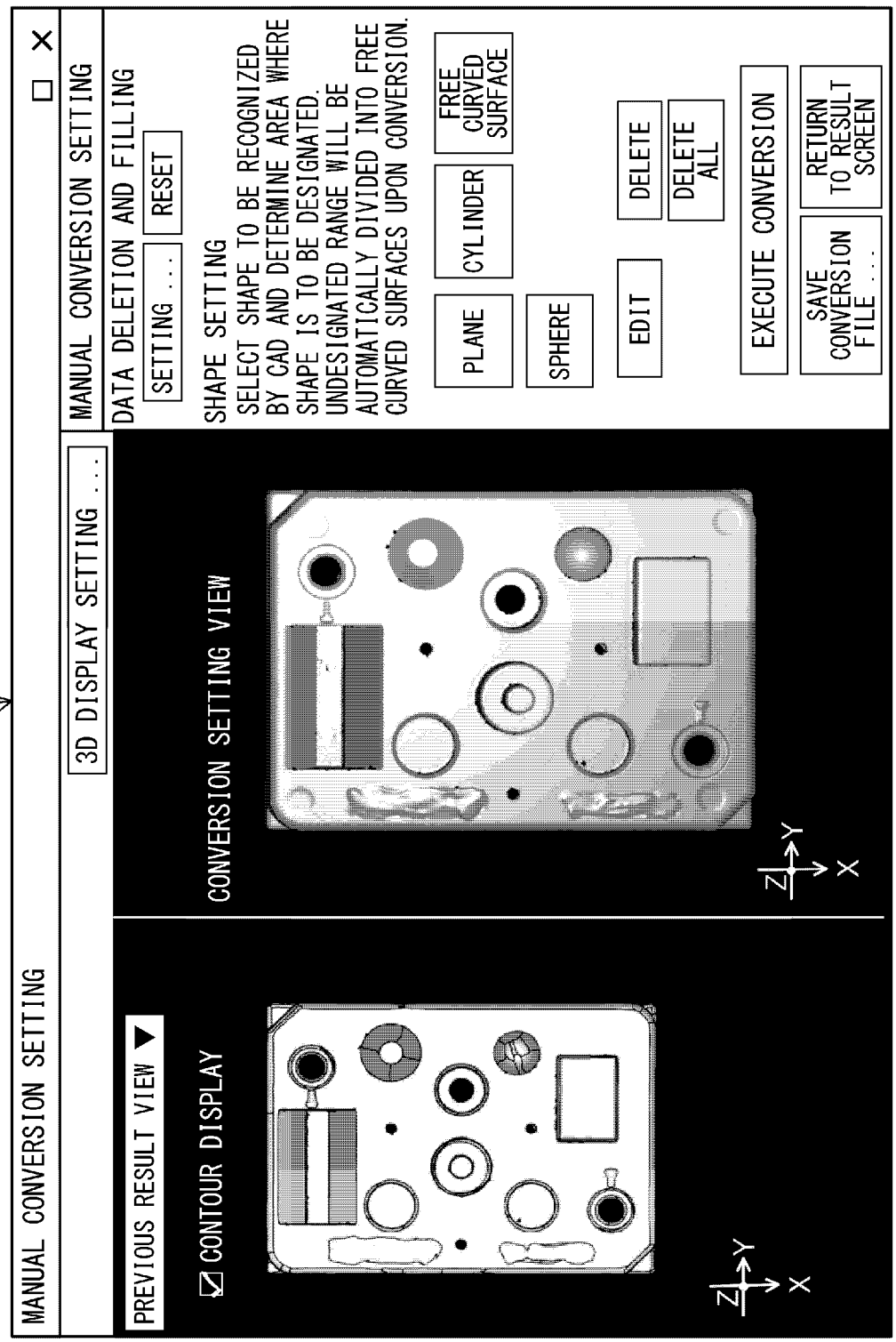
FIG. 59 is a view illustrating an example of a manual conversion setting screen.

In Step S214 of FIG. 59, it is determined whether the conversion area is the entire area or a partial area. In a case where the conversion area is the partial area, the flow proceeds to Step S215 to extract a designation area from a polygon. In a case where the conversion area is the entire area, the flow proceeds to Step S216 to extract the entire polygon.

Thereafter, the flow proceeds to Step S217, and the user selects a conversion mode. In Step S218, it is determined whether the mode selected by the user is the full auto mode or the manual mode. In the full auto mode, the flow proceeds to Step S219 to automatically execute the surface conversion. In the automatic execution of the surface conversion in Step S219, pre-processing such as filling or removal of an unnecessary portion may be executed based on unevenness included in surface data. That is, the correction unit 275 can determine whether or not the surface data includes unevenness and whether or not the mesh data received by the data input unit 271 includes a loop having no polygon, and can execute the pre-processing based on results of the determination. In the manual mode, the flow proceeds to Step S220, and the conversion module 270 causes the display unit 400 to display the surface conversion user interface screen 710 illustrated in FIG. 14.

In Step S221, it is determined whether or not to perform processing such as filling on the mesh data. In a case where the processing such as filling is to be performed, the flow proceeds to Step S222 to execute each processing, and then, proceeds to Step S223 to determine whether or not to execute surface area designation. On the other hand, in a case where mesh pre-processing is not to be performed, the flow proceeds to Step S224, and proceeds to Step S228 to execute the surface conversion when a surface conversion button is pressed.

In the case of NO in Step S223, the flow proceeds to Step S224. On the other hand, in the case of YES in Step S223, the flow proceeds to Step S225 to execute the surface area designation. In Step S226, it is determined whether or not the designation has been completed. The flow returns to Step S225 if the designation has not been completed. The flow proceeds to Step S227 if the designation has been completed, and proceeds to Step S228 to execute the surface conversion when the surface conversion button is pressed.

Figure 58:
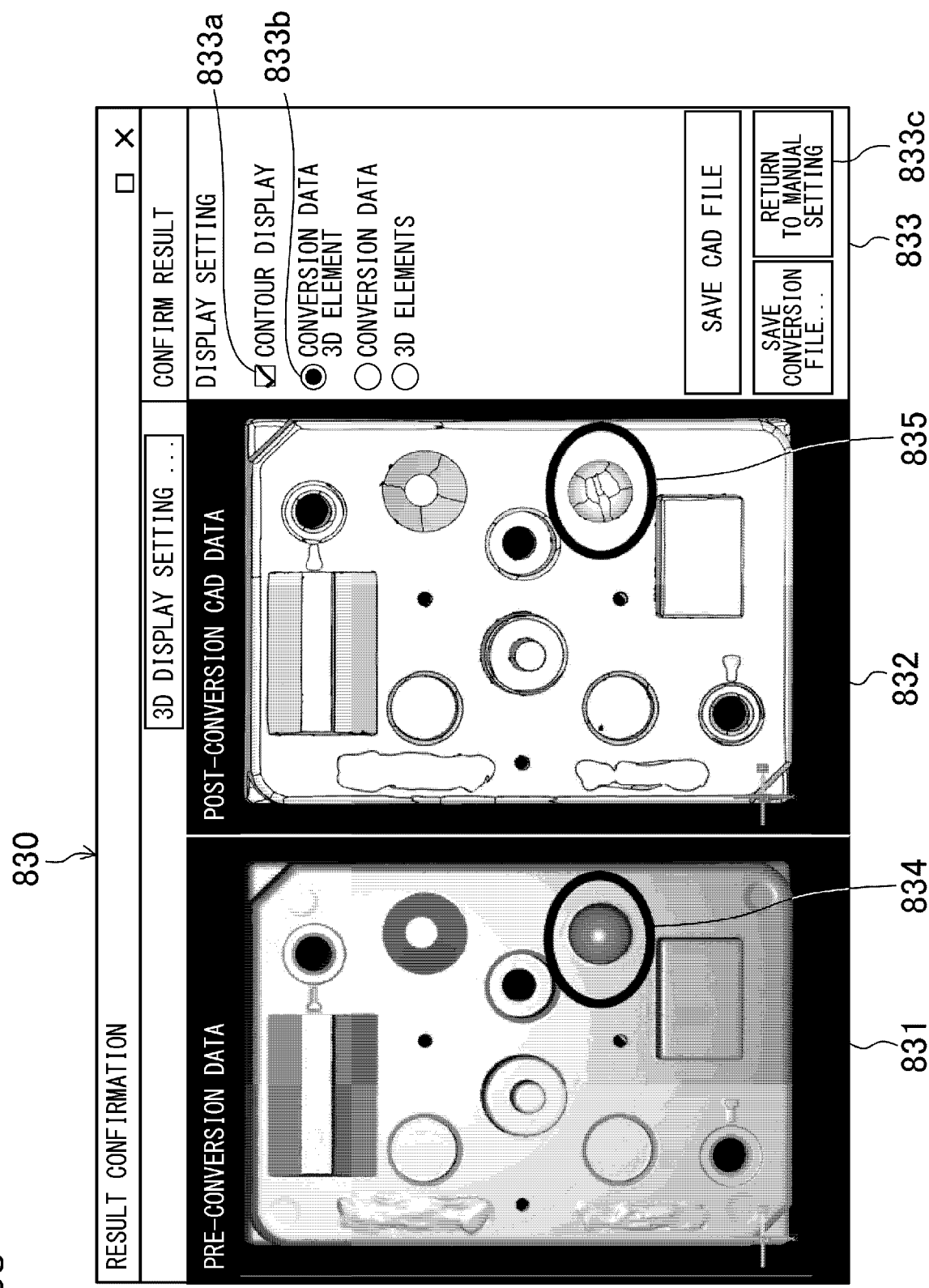
FIG. 58 is a view illustrating an example of a conversion result display user interface screen.

In Step S229, a result of the surface conversion is displayed on the display unit 400. As a result, the user can confirm the result of the surface conversion. In Step S230, it is determined whether or not the processing has been completed. In a case where the processing has not been completed, that is, when it is desired to redo CAD conversion by changing some settings, it is possible to return to a manual setting. For example, as illustrated in FIG. 58, a conversion result display user interface screen 830 is provided with a pre-conversion data display area 831 for displaying pre-conversion data, a post-conversion data display area 832 for displaying post-conversion CAD data, and a display setting area 833. When the pre-conversion data and the post-conversion CAD data are displayed side by side, the user can determine whether it is necessary to change the settings by comparing the pre-conversion data and the post-conversion CAD data.

Further, it is possible to switch whether or not to impart a contour line indicating a boundary of the surface data to the CAD data by switching a check of a check box 833*a* of the display setting area 833. When the contour line is imparted to the CAD data, it is easy to grasp whether the CAD conversion is being executed as designed. Further, in the display setting area 833, a radio button 833*b* for selecting whether to display the surface data and a 3D element in combination or to display one of the surface data and the 3D data may be displayed. Switching of a display form will be described later. In a case where it is determined in Step S230 that the processing has not been completed, the flow proceeds to Step S231 in FIG. 57, and it is determined whether data addition or conversion resetting is required. When the conversion resetting is required, the flow returns to Step S220, and it is determined in Step S221 to perform the filling processing or the like. In the case of the conversion resetting, a resetting user interface screen 840 as illustrated in FIG. 59 is displayed on the display unit 400. A post-conversion data display area 841 for displaying the post-conversion CAD data and a setting change display area 842 are provided on the resetting user interface screen 840 such that a setting can be changed after a portion desired to be amended has been searched from conversion results. In the setting change display area 842, filling, removal of an unnecessary portion, designation of a surface area, and the like can be executed.

Figure 60:
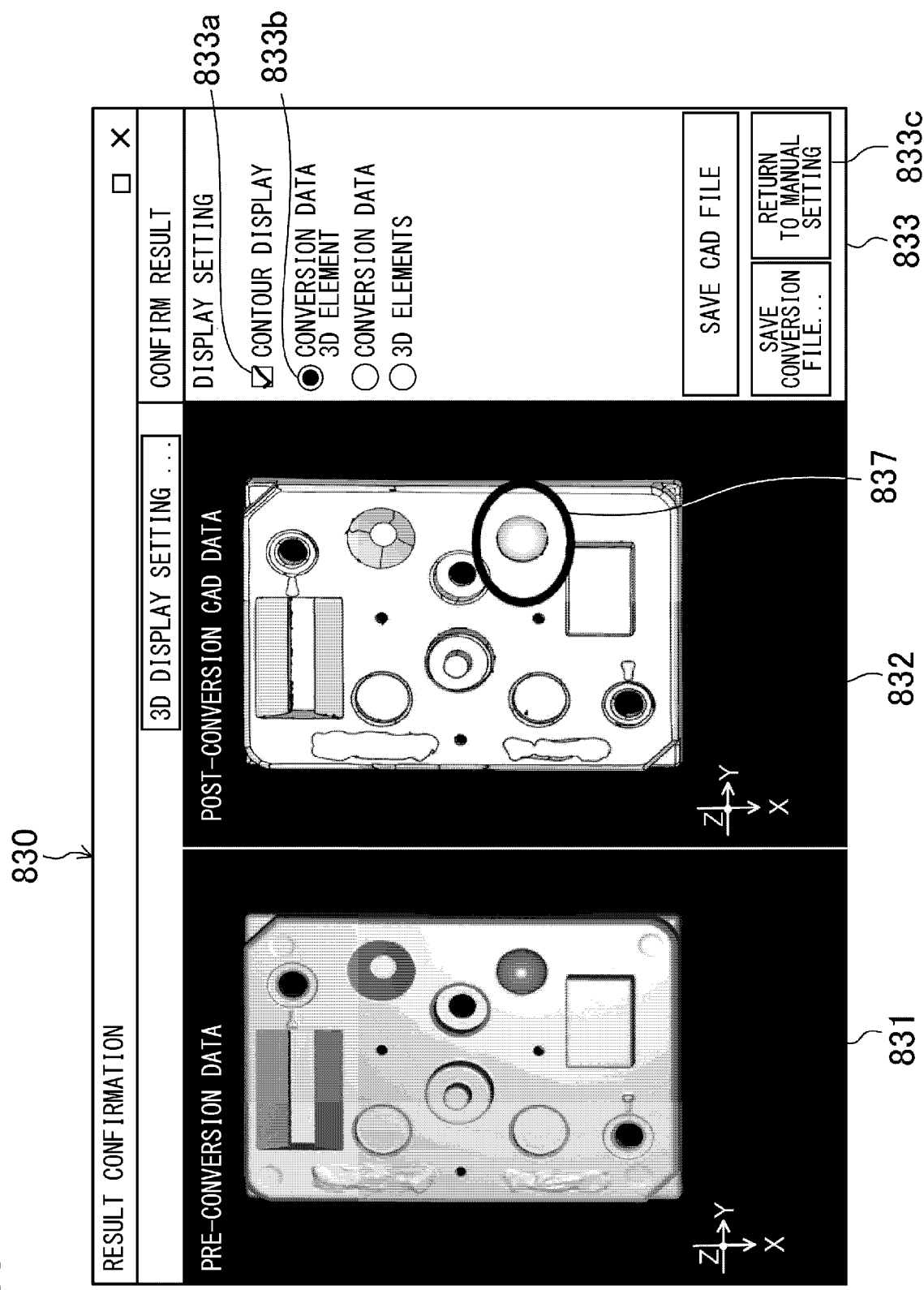
FIG. 60 is a view illustrating an example of a display screen in a case where a spherical area is converted into CAD data as one piece of surface data.

Specifically, there is a case where a design intention of the user is not reflected in a surface conversion result displayed on the display unit 400. For example, when a spherical area 834 in the pre-conversion data display area 831 in FIG. 58 is converted into CAD data, the CAD data divided into a plurality of surfaces as illustrated in a spherical area 835 in the post-conversion data display area 832 is obtained by the conversion. In such a case, when an operation input of an icon 833*c* for executing manual conversion is detected, a transition is made to a manual conversion setting screen 836 illustrated in FIG. 59. On the manual conversion setting screen 836 illustrated in FIG. 59, it is possible to set pre-processing such as data deletion and filling, to set a shape, and the like. The data deletion and the filling are similar to those in Step SB8 of FIG. 9. In the shape setting, a desired shape can be extracted from the mesh data by selecting a predetermined shape, such as a plane, a cylinder, a free curved surface, a sphere, or a cone, and designating an area on the mesh data to which the selected shape is applied. That is, the mesh data can be converted into CAD data by reflecting the design intention of the user. For example, for the spherical area 834 illustrated in FIG. 58, a shape of "sphere" is designated on the manual conversion setting screen illustrated in FIG. 59, and the surface conversion is executed again. In this case, the surface conversion illustrated in Step S228 of FIG. 57 is executed again, and a surface conversion result illustrated in FIG. 60 is displayed on the display unit 400. As illustrated in a spherical area 837 of FIG. 60, the spherical area 835 of FIG. 58 can be converted into CAD data as one piece of surface data to reflect the user's design intention by selecting the shape of "sphere" on the manual conversion setting screen.

Figure 61:
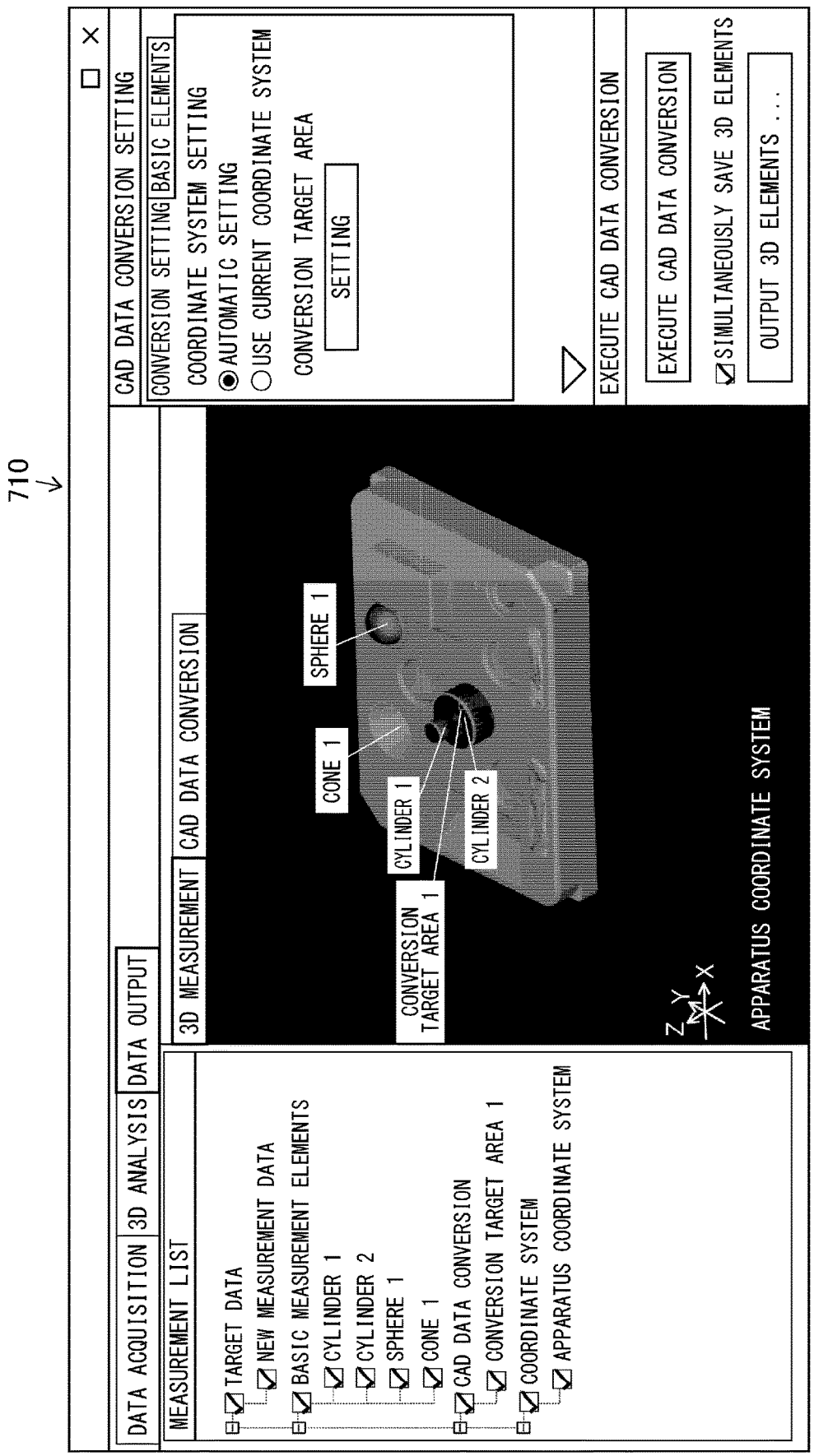
FIG. 61 is a view illustrating an example of a surface conversion user interface screen in a case where a plurality of geometric elements are selected.
Figure 62:
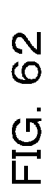
FIG. 62 is a view illustrating an example of a conversion result display user interface screen in a case where the surface data and 3D elements are displayed in combination.
Figure 63:
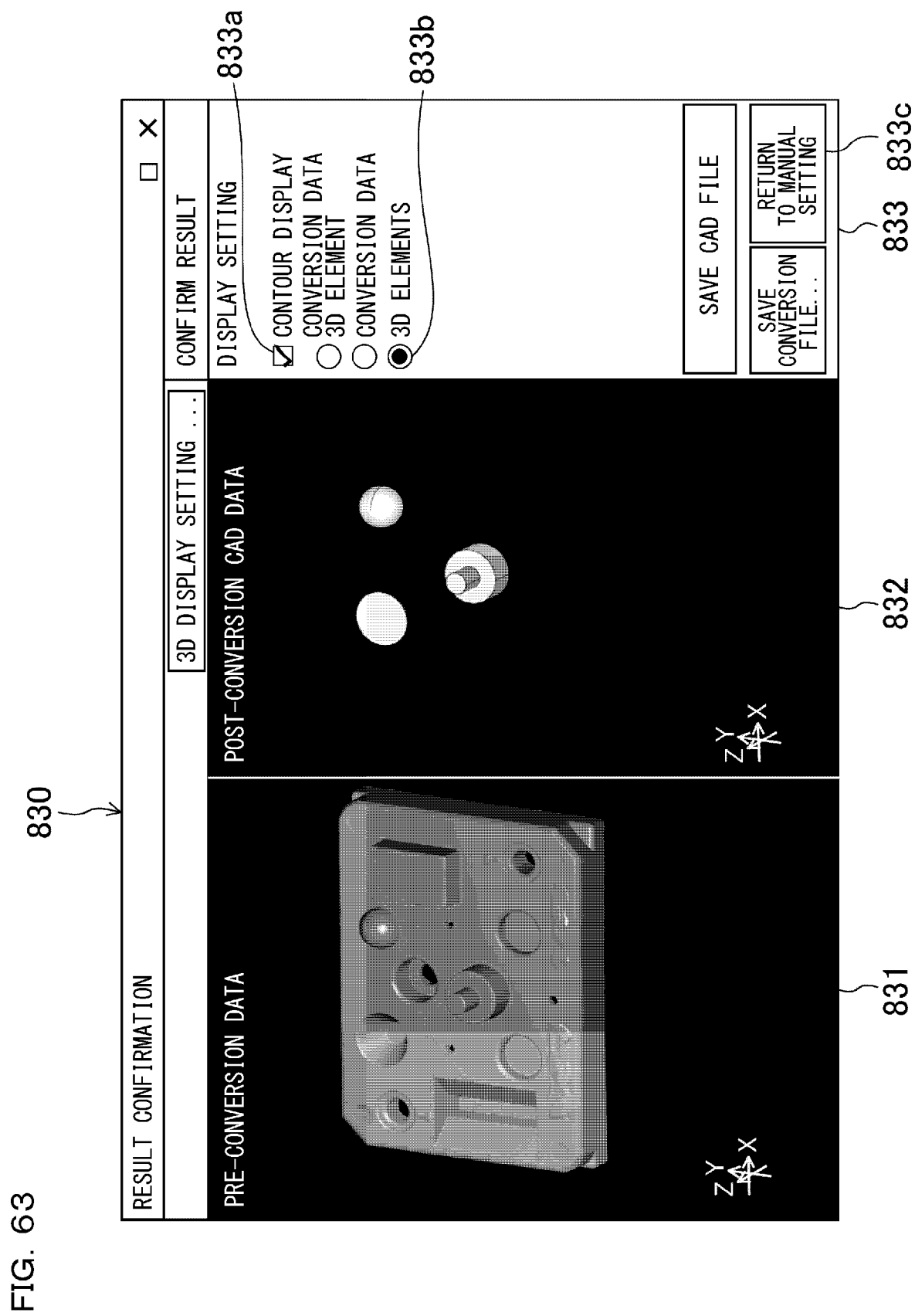
FIG. 63 is a view illustrating an example of a conversion result display user interface screen in a case where only the 3D elements are displayed.

The switching of a display form will be described with reference to FIGS. 61 to 63. FIG. 61 is an example of the surface conversion user interface screen 710 displayed on the display unit 400. In FIG. 61, two cylinders, one cone, and one sphere are selected as geometric elements. FIG. 62 illustrates CAD data converted from mesh data including the geometric elements extracted in FIG. 61. FIG. 62 is an example of the conversion result display user interface screen 830. As described above, the display setting area 833 is provided on the conversion result display user interface screen 830 in FIG. 62, and it is possible to switch whether to display the surface data and the 3D element in combination or to display one of the surface data and the 3D data by switching the selection of the radio button 833b. FIG. 62 is a view illustrating a case where the surface data and the 3D element are displayed in combination. Further, FIG. 63 is a view illustrating a case where only the 3D element is displayed. Here, the "3D element" refers to a geometric element extracted from mesh data and converted into CAD data. When the display form is switched on the display unit 400 in this manner, it is possible to take out only the 3D element to confirm and save data, or to confirm and save data obtained by combining the surface data and the 3D element. As a result, an area or a shape of a component desired by the user can be selectively saved as CAD data.

On the other hand, in a case where the data addition is required, the flow returns to Step S205, and it is determined in Step S207 as the data addition. Even after the re-conversion, the conversion result display user interface screen 830 as illustrated in FIG. 58 is displayed on the display unit 400 to enable confirmation by the user. If it is determined that the processing has been completed, the surface conversion is ended.

Figure 64:
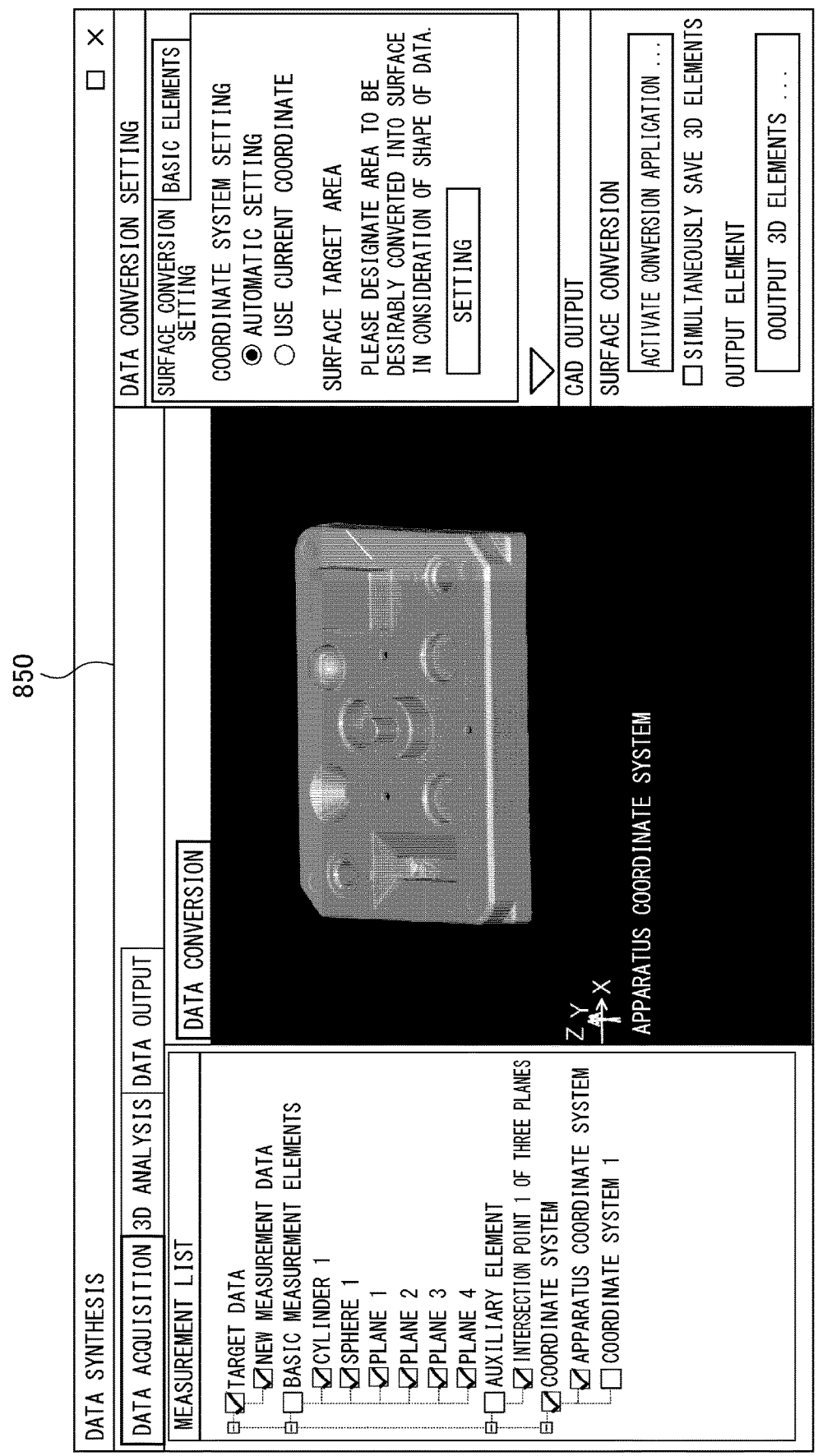
FIG. 64 is a view illustrating an example of a user interface screen in a case where data synthesis is activated.
Figure 65:
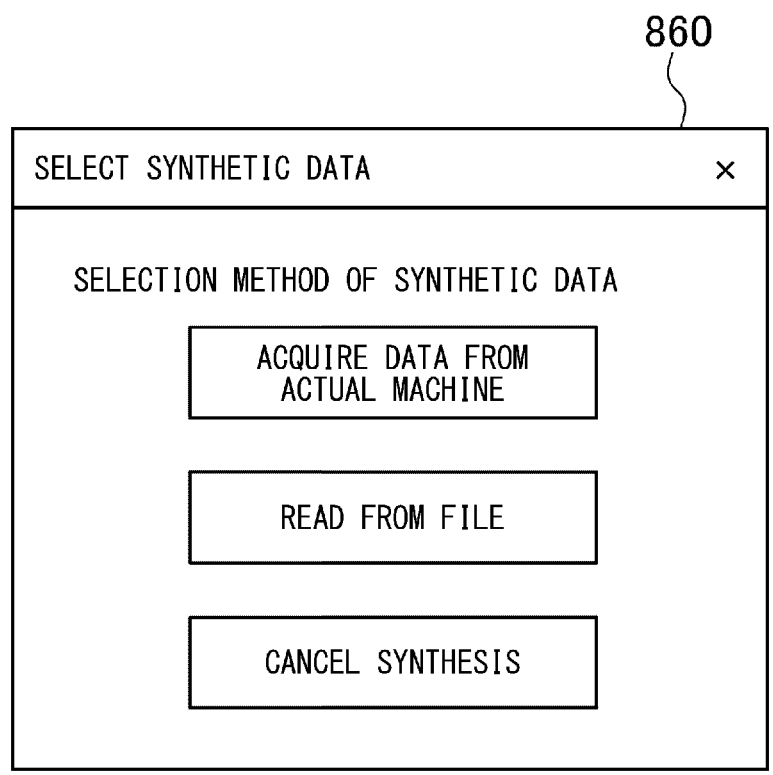
FIG. 65 is a view illustrating an example of a synthetic data selection window.

When it is desired to add data by viewing a result of the surface conversion, it is possible to return to the analysis module 290 that has already been activated. When data synthesis is activated in the analysis module 290, a user interface screen 850 for data synthesis is displayed on the display unit 400 as illustrated in FIG. 64. A synthetic data selection window 860 illustrated in FIG. 65 can be displayed from the user interface screen 850. In the synthetic data selection window 860, one of a method of acquiring data from an actual machine (the measurement unit 100) and a method of reading data from a file stored in the storage apparatus 240 or the like can be selected as a method of selecting synthetic data.

Figure 66:
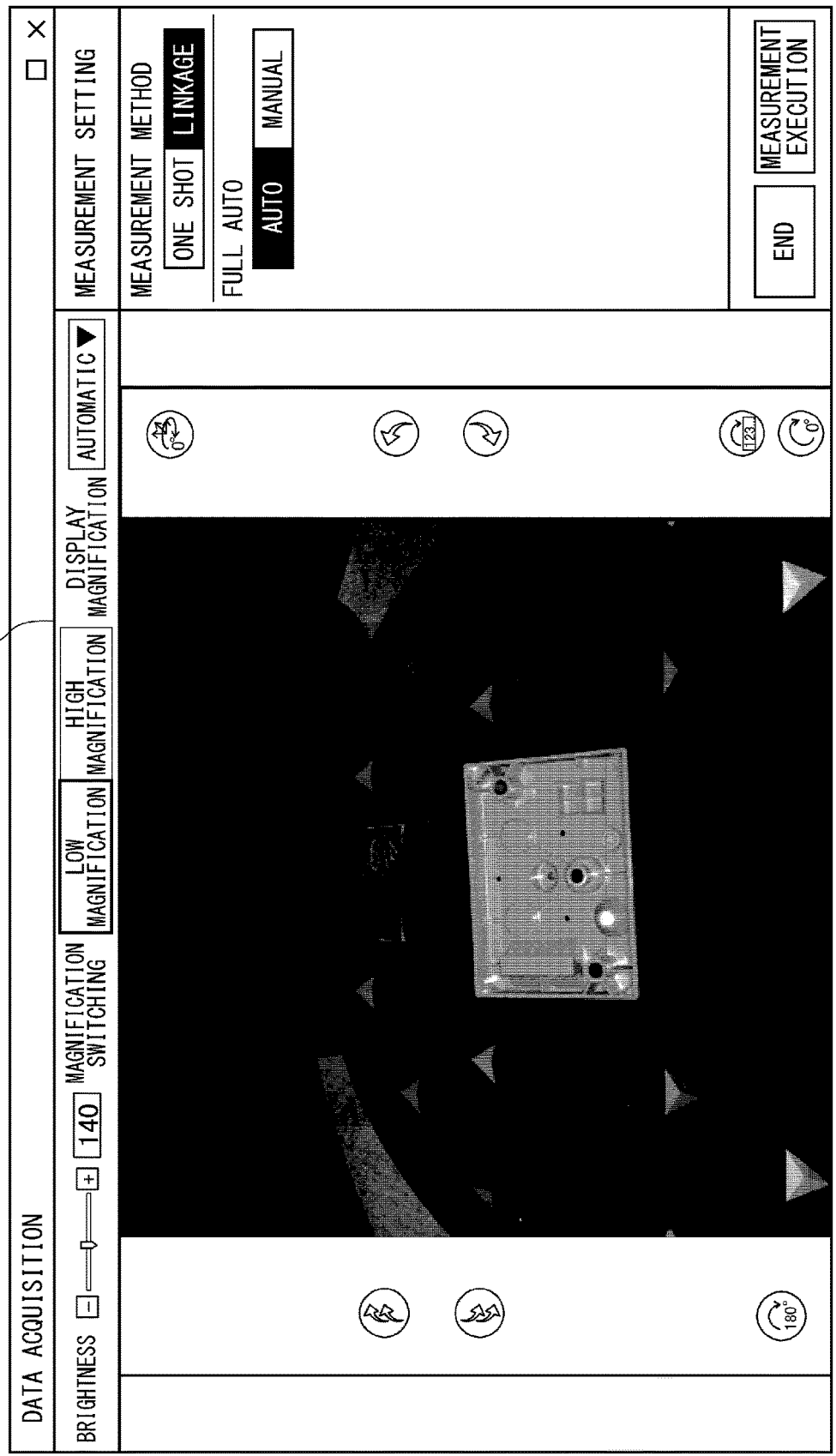
FIG. 66 is a view illustrating an example of a user interface screen for acquiring measurement data of a workpiece whose orientation has been changed.

FIG. 66 illustrates a user interface screen 870 for acquiring measurement data of the workpiece W whose orientation has been changed, and illustrates measurement data of the back side of the workpiece W in this example. In this manner, it is possible to synthesize pieces of data when the workpiece W has been measured from different directions. The orientation of the workpiece W can be freely set.

The above-described embodiment is merely an example in all respects, and should not be construed as limiting. Further, all modifications and changes belonging to the equivalent range of the claims fall within the scope of the invention.

As described above, the invention can be used for reverse engineering in which a shape of a real object is acquired and converted into design data.

What is claimed is:

1. A reverse engineering support apparatus that converts mesh data into surface data and outputs the surface data, the reverse engineering support apparatus comprising:
    a data acquisition unit that acquires mesh data including a plurality of polygons;
    a shape attribute setting unit that sets a shape attribute to the polygons included in the mesh data acquired by the data acquisition unit;
    a region specifying unit that specifies a region included in the mesh data acquired by the data acquisition unit and having the shape attribute set by the shape attribute setting unit;
    a segment processing unit that divides the mesh data acquired by the data acquisition unit into a plurality of segments based on the shape attribute set by the shape attribute setting unit and the region specified by the region specifying unit;
    a data conversion unit that converts a polygon included in the region specified by the region specifying unit among the polygons included in mesh data acquired by the data acquisition unit into surface data based on the shape attribute set by the shape attribute setting unit, and converts a polygon excluding the polygon included in the region specified by the region specifying unit among the polygons included in mesh data acquired by the data acquisition unit into surface data of a free curved surface by generating trimmed surface based on the mesh data acquired by the data acquisition unit and the plurality of segments divided by the segment processing unit, and generating boundary representation data based on the trimmed surface; and
    an output unit that outputs the surface data converted based on the shape attribute by the data conversion unit and the surface data of the free curved surface converted by the data conversion unit as CAD data.

2. The reverse engineering support apparatus according to claim 1, wherein
    the data conversion unit converts the polygon included in the region specified by the region specifying unit into surface data of an analytic curved surface based on the shape attribute, and
    the output unit is configured to output data including the surface data of the analytic curved surface and the surface data of the free curved surface created by the data conversion unit together as CAD data.

3. The reverse engineering support apparatus according to claim 1, further comprising
    an input reception unit that receives an operation by a user for specifying a region using the region specifying unit, wherein the region specifying unit is configured to specify the region based on the operation received by the input reception unit.

4. The reverse engineering support apparatus according to claim 3, wherein
    the input reception unit receives designation of a point performed by the user as the operation, and
    the region specifying unit is configured to specify a region based on a feature of a surface including the point received by the input reception unit.

5. The reverse engineering support apparatus according to claim 4, wherein
    the input reception unit further receives an input of the shape attribute from the user, and
    the region specifying unit is configured to specify the region based on the designation of the point received by the input reception unit and the shape attribute.

6. The reverse engineering support apparatus according to claim 3, wherein
    the input reception unit receives designation of surrounding a specific area as the operation, and
    the region specifying unit specifies a polygon included in the specific area received by the input reception unit as a region.

7. The reverse engineering support apparatus according to claim 6, wherein the region specifying unit calculates an approximate plane based on a plurality of the polygons included in the specific area, and determines whether or not it is possible to approximate the specific area as a plane based on a normal of the calculated approximate plane and positions and normals of the polygons included in the specific area.

8. The reverse engineering support apparatus according to claim 1, wherein
the shape attribute setting unit calculates curvature radii of the polygons based on curvatures of the polygons, calculates center points of curvature circles of the polygons based on the calculated curvature radii of the polygons and orientations of normals of the polygons, and sets the shape attribute to the polygons included in the mesh data acquired by the data acquisition unit based on a positional relationship between the center points of the curvature circles calculated for the plurality of polygons forming the mesh data.

9. The reverse engineering support apparatus according to claim 1, further comprising:
an association unit that creates association data in which a shape attribute of a region specified by the region specifying unit is associated with a polygon included in the region; and
a storage unit that stores the association data created by the association unit,
wherein the data conversion unit specifies a plurality of polygons assigned with one shape attribute based on the association data stored in the storage unit from the mesh data acquired by the data acquisition unit, and converts the plurality of specified polygons into one surface data based on the shape attribute associated with the polygons.

10. The reverse engineering support apparatus according to claim 9,
wherein the segment processing unit is configured to
specify whether or not the shape attribute is associated with the plurality of polygons included in the mesh data acquired by the data acquisition unit, and
segment the mesh data to extract a geometric element corresponding to the shape attribute from a plurality of polygons specified to be associated with the shape attribute, and segment a plurality of polygons specified not to be associated with the shape attribute into a plurality of segments based on geometric feature values of the polygons, respectively, and
the data conversion unit converts each of the segments segmented by the segment processing unit into surface data.

11. The reverse engineering support apparatus according to claim 9, wherein
the region specifying unit is configured to be capable of sequentially specifying a first region and a second region from the mesh data acquired by the data acquisition unit, and the association unit associates a first shape attribute with a polygon included in the first region, determines whether or not an overlapping area exists between the first region and the second region, and associates a second shape attribute with the overlapping area when determining that the overlapping area exists to change the first shape attribute already associated with the overlapping area to the second shape attribute.

12. The reverse engineering support apparatus according to claim 9, wherein
the region specifying unit sequentially specifies a first region and a second region from the mesh data acquired by the data acquisition unit, and
the association unit associates a first shape attribute with a polygon included in the first region, determines whether or not an overlapping area exists between the first region and the second region, and associates a second shape attribute with an area other than the overlapping area in the second region when determining that the overlapping area exists to hold the first shape attribute already associated with the overlapping area.

13. The reverse engineering support apparatus according to claim 1, further comprising:
a display control unit configured to display the mesh data on a display unit;
a display condition setting unit that receives a setting of a display condition when the mesh data is to be displayed on the display unit; and
a storage unit that stores the display condition set by the display condition setting unit,
wherein the display condition setting unit is configured to be capable of setting a coordinate system as the display condition, and
the display control unit displays mesh data newly acquired by the data acquisition unit on the display unit by specifying a coordinate system when the newly acquired mesh data is to be displayed on the display unit based on the display condition stored in the storage unit to reproduce a display state set by the display condition setting unit.

14. The reverse engineering support apparatus according to claim 13, wherein
the storage unit further stores coordinate information of a point or a specific area in association with the display condition in a case where the point or the specific area has been designated as an operation by a user for specifying a region using the region specifying unit, and
the region specifying unit specifies the region based on the mesh data for which the display state has been reproduced and the coordinate information stored in the storage unit.

* * * * *